US012798955B2

(12) United States Patent
Getman

(10) Patent No.: US 12,798,955 B2
(45) Date of Patent: Nov. 17, 2026

(54) PIEZOELECTRIC ADAPTIVE MESH

(71) Applicant: Anya L. Getman, Sandy, OR (US)

(72) Inventor: Anya L. Getman, Sandy, OR (US)

(73) Assignee: Anya Getman, Sandy, OR (US)

(*) Notice: Subject to any disclaimer, the term of this patent is extended or adjusted under 35 U.S.C. 154(b) by 408 days.

(21) Appl. No.: 18/482,833

(22) Filed: Oct. 6, 2023

(65) Prior Publication Data

US 2024/0051815 A1 Feb. 15, 2024

Related U.S. Application Data

(63) Continuation-in-part of application No. 17/585,266, filed on Jan. 26, 2022, now Pat. No. 11,948,703,
(Continued)

(51) Int. Cl.
*B68C 1/04* (2006.01)
*A01K 29/00* (2006.01)

(52) U.S. Cl.
CPC .............. *B68C 1/04* (2013.01); *A01K 29/005* (2013.01); *B68C 2001/042* (2013.01)

(58) Field of Classification Search
CPC .... B68C 1/04; B68C 1/02; B68C 1/00; B68C 2001/042; A01K 29/005; A61G 7/057; A61G 2203/44; A61H 2201/0146; A61H 2201/0157; A61H 2201/0207; A61H 2201/165; A61H 2201/5007; A61H 2201/5061; A61H 2201/5064;
(Continued)

(56) References Cited

U.S. PATENT DOCUMENTS 4,033,097 A * 7/1977 Petit .......................... B68C 1/08 54/44.6
4,988,300 A * 1/1991 Yamaguchi ............ A63B 69/04 472/99

(Continued)

FOREIGN PATENT DOCUMENTS

DE 202014100084 U1 3/2014
EP 3275369 A1 * 1/2018 ............ A61B 5/112

(Continued)

OTHER PUBLICATIONS

"These clothes can wirelessly charge your phone", Parija, (Jun. 28, 2016), retrieved Sep. 30, 2021 from https://money.cnn.com/2016/06/28/technology/baubax-wireless-charging-clothing-kickstarter/, pp. 5.

(Continued)

*Primary Examiner* — Brandy S Lee
*Assistant Examiner* — Tyler A Raubenstraw
(74) *Attorney, Agent, or Firm* — Aurora Consulting LLC; Albert Du; Ashley Sloat

(57) ABSTRACT

A piezoelectric adaptive mesh includes multiple piezoelectric fibers that include piezoelectric structures that can act as sensor and/or actuators to enhance a person's comfort. The piezoelectric structures communicate with a controller and/or a software processing system and may identify the position of a user and make adjustments through the actuators to increase user comfort by providing support, assistance, treatment, and/or temperature adjustment.

31 Claims, 11 Drawing Sheets

Related U.S. Application Data which is a continuation-in-part of application No. 16/994,618, filed on Aug. 16, 2020, now abandoned, and a continuation-in-part of application No. 16/837,071, filed on Apr. 1, 2020, now Pat. No. 11,818,956, application No. 18/482,833 is a continuation-in-part of application No. 16/837,071, filed on Apr. 1, 2020, now Pat. No. 11,818,956, which is a continuation-in-part of application No. 16/836,704, filed on Mar. 31, 2020, now abandoned, said application No. 17/585,266 is a continuation of application No. PCT/US2021/021588, filed on Mar. 9, 2021.

(60) Provisional application No. 63/133,069, filed on Dec. 31, 2020, provisional application No. 62/988,914, filed on Mar. 13, 2020, provisional application No. 62/827,195, filed on Apr. 1, 2019, provisional application No. 62/827,193, filed on Apr. 1, 2019, provisional application No. 62/827,215, filed on Apr. 1, 2019, provisional application No. 61/887,893, filed on Aug. 16, 2019.

(58) Field of Classification Search

CPC .... A61H 2201/5071; A61H 2201/5074; A61H 2201/5097; A61H 23/00; A61H 23/02; A61H 23/0218; A61H 23/0236; A61H 23/0245; A61H 2201/0138; A61H 2201/0149; A61H 2201/0142; H10N 30/101; H10N 30/60; H10N 30/00; H10N 30/1061; A47C 23/002; A47C 27/002; A47C 3/0251; A47C 7/748

See application file for complete search history.

(56) References Cited

U.S. PATENT DOCUMENTS

| | | | | |
|---|---|---|---|---|
| 5,375,397 | A * | 12/1994 | Ferrand | G01G 19/00 600/595 |
| 6,392,332 | B1 | 5/2002 | Sung | |
| 6,601,054 | B1 | 7/2003 | Lo et al. | |
| 6,615,568 | B1 * | 9/2003 | Roskies | B68C 1/12 54/66 |
| 7,550,896 | B1 | 6/2009 | Su | |
| 8,888,035 | B2 | 11/2014 | Lind, Jr. et al. | |
| 9,636,431 | B2 | 5/2017 | Teeling et al. | |
| 9,999,392 | B1 * | 6/2018 | Wordham | A61B 5/02438 |
| 10,013,058 | B2 | 7/2018 | Pushkarich et al. | |
| 10,347,815 | B1 | 7/2019 | Sleator | |
| 10,762,751 | B2 | 9/2020 | Kessler et al. | |
| 11,723,279 | B2 * | 8/2023 | Yoshida | H10N 30/08 |
| 2003/0163287 | A1 * | 8/2003 | Vock | A61B 5/1112 702/187 |
| 2006/0122544 | A1 | 6/2006 | Ciluffo | |
| 2010/0045463 | A1 * | 2/2010 | Bradley | A01K 29/005 119/702 |
| 2013/0075484 | A1 | 3/2013 | Rhee et al. | |
| 2013/0280683 | A1 * | 10/2013 | Smith | A63B 69/00 434/247 |
| 2016/0114233 | A1 * | 4/2016 | Marsh | A61B 5/1036 434/247 |
| 2017/0029985 | A1 | 2/2017 | Tajitsu et al. | |
| 2017/0164876 | A1 * | 6/2017 | Hyde | A61B 5/1118 |
| 2017/0367923 | A1 * | 12/2017 | Bergbacka | A01K 13/00 |
| 2018/0113217 | A1 * | 4/2018 | Ruetenik | B68C 1/025 |
| 2018/0142951 | A1 | 5/2018 | Momem et al. | |
| 2018/0258561 | A1 | 9/2018 | Khoshkava et al. | |
| 2018/0315917 | A1 * | 11/2018 | Tanimoto | D03D 15/46 |
| 2019/0003905 | A1 * | 1/2019 | Yoshida | H10N 30/857 |
| 2019/0077653 | A1 * | 3/2019 | Fenaroli | B68C 1/025 |
| 2019/0252596 | A1 | 8/2019 | Akimoto | |
| 2019/0374161 | A1 * | 12/2019 | Ly | A61F 2/68 |
| 2020/0221667 | A1 * | 7/2020 | Duff | A01K 13/006 |
| 2020/0313066 | A1 * | 10/2020 | Getman | A61H 23/0245 |
| 2020/0323730 | A1 * | 10/2020 | Ruetenik | A61H 9/0078 |
| 2021/0345926 | A1 | 11/2021 | Son | |
| 2021/0386614 | A1 * | 12/2021 | Doraiswamy | A61H 9/0092 |
| 2022/0014120 | A1 * | 1/2022 | Andosca | A43B 13/125 |
| 2022/0346351 | A1 * | 11/2022 | Shigo | A01K 29/005 |
| 2023/0008236 | A1 * | 1/2023 | Goguet | A01K 29/005 |
| 2023/0404462 | A1 * | 12/2023 | Komatsu | A61B 5/352 |
| 2024/0049688 | A1 * | 2/2024 | Estrada | A01K 15/02 |
| 2024/0059553 | A1 * | 2/2024 | Rasalingam | B68C 1/12 |
| 2024/0107980 | A1 * | 4/2024 | Dahl | H04W 4/029 |
| 2025/0275880 | A1 * | 9/2025 | Banez | A63B 21/005 |
| 2025/0295186 | A1 * | 9/2025 | Dubourg | A41D 1/04 |

FOREIGN PATENT DOCUMENTS

| | | |
|---|---|---|
| KR | 201300929 | 8/2013 |
| WO | 201617532 X | 11/2016 |

OTHER PUBLICATIONS

"Wireless Charging Apparel", (Aug. 10, 2016), retrieved Sep. 30, 2021 from https://www.kickstarter.com/projects/baubax/worlds-smartest-wireless-charging-apparel-baubax?token=4b43c783, pp. 2.

"This travel jacket does 15 things at once", Parija, (Aug. 27, 2015), retrieved Sep. 30, 2021 from https://money.cnn.com/2015/07/07/smallbusiness/baubax-travel-jacket-15-features/?iid=EL, pp. 6.

"Phone-charging boots", Leslle, (Jun. 18, 2010), retrieved Sep. 30, 2021 from https://www.cnet.com/news/phone-charging-boots-walk-a-lot-to-talk/, pp. 3.

"The World's First Phone-Charging Pants Are Here", Daniel, (2014), retrieved Sep. 30, 2021 from https://www.businessinsider.com/fashion-designer-adrien-sauvage-and-microsoft-create-first-wireless-phone-charging- pants-2014-6, pp. 8.

"Belmint Back Stretching Electric Mat", retrieved Sep. 30, 2021 from https://www.amazon.com/dp/B07NK7Z46Z, pp. 11.

"Ultrasound Cavitation Machines", retrieved Sep. 30, 2021 from https://www.bestreviews.guide/cavitation-machines, pp. 4.

"DigiKey", retrieved Sep. 30, 2021 from https://www.digikey.com/product-detail/en/te-connectivity-measurement-specialties/1004308-2/223-1872-ND/279650, pp. 4.

"Piezo Cables", retrieved Sep. 30, 2021 from https://www.te.com/usa-en/product-CAT-PFS0001.html, pp. 3.

"Artificial synesthesia via sonification: A wearable augmented sensory system", Foner, (Mar. 1999), retrieved Sep. 30, 2021 from https://link.springer.com/article/10.1023/A:1019178210975, pp. 4.

"Fundamentals of Wearable Computers and Augmented Reality", retrieved Sep. 30, 2021 from https://www.amazon.com/s?k=9781482243512, pp. 2.

"The wearable robot that helps people walk again", Arjun, retrieved Sep. 30, 2021 from https://www.cnbc.com/2015/04/29/the-bionic-suit-that-helps-paralyzed-people-walk-again.html, pp. 4.

"Piezoelectric Actuators", Carter et al., retrieved Sep. 30, 2021 from https://piezo.com/pages/piezoelectric-actuators, pp. 27.

"PHT Magnetics", retrieved Sep. 30, 2021 from http://phtmagnetics.com/, p. 1.

"Veredus Magnetik Rug", retrieved Sep. 30, 2021 from https://www.smartpakequine.com/pt/veredus-magnetik-rug-10755, p. 1.

"Faraday Blanket With Pocket EMF Protective 40GHz Tested", retrieved Sep. 30, 2021 from https://www.smart-safe.com/products/electromagnetic-radiation-protective-blanket, pp. 5.

"Blackhawk Under the Radar Cell Phone Pouch Black", retrieved Sep. 30, 2021 from https://www.walmart.com/ip/Blackhawk-Under-the-Radar-Cell-Phone-Pouch-Black/39989685, p. 1.

"GoDark Faraday Bags", retrieved Sep. 30, 2021 from https://godarkbags.com/products/godark-faraday-bags-stop-hacking-and-location-tracking-of-your-cell-phone-and-tablet, pp. 11.

"Compex Edge 3.0 Muscle Stimulator With Tens Kit", retrieved Sep. 30, 2021 from https://www.compex.com/compex-edge-2-0-muscle-stimulator-kit-with-tens, pp. 6.

"EMG ECG Foam Solid Gel Electrodes", retrieved Sep. 30, 2021 from https://shop.openbci.com/products/skintact-f301-pediatric-foam-solid-gel-electrodes-30-pack?variant=29467659395, p. 1.

(56) References Cited

OTHER PUBLICATIONS

"Octopus Suction Cups", Greg, retrieved Sep. 30, 2021 from https://pixels.com/featured/octopus-suction-cups-greg-ochocki.html, pp. 3.
"TENS Unit Pad Placement", retrieved Sep. 30, 2021 from https://omronhealthcare.com/2014/01/10-tips-for-tens-pad-placement/, pp. 2.
"Pain Management", retrieved Sep. 30, 2021 from https://omronhealthcare.com/tens-units/, pp. 5.
"Pad Placement Guide", retrieved Sep. 30, 2021 from https://ib0k33wyb0z22kedo19bkqd1-wpengine.netdna-ssl.com/wp-content/uploads/PM3030-PAD-GUIDE-08062012.pdf, p. 1.
"Patient Aid Full Body Mesh Patient Lift Sling", retrieved Sep. 30, 2021 from https://www.amazon.com/Patient-Sling-Weight-Capacity-Medium/dp/B0757DZRJB, pp. 7.
"Cabaret Stretch Mesh Fabric", retrieved Sep. 30, 2021 from https://www.fabricwholesaledirect.com/products/cabaret-stretch-mesh-fabric?variant=15499387462, pp. 5.
"Ottertex Solution Dyed Acrylic Waterproof Fabric", retrieved Sep. 30, 2021 from https://www.fabricwholesaledirect.com/products/ottertex-solution-dyed-acrylic-waterproof-fabric, pp. 9.
"Danish Modern Chair Repair Danish Rubber Strap Steel Loop", retrieved Sep. 30, 2021 from https://www.etsy.com/listing/682691165/danish-modern-chair-repair-danish-rubber, pp. 3.
"MIT Engineers Create a Programmable Digital Fiber" https://scitechdaily.com/mit-engineers-create-a-programmable-digital-fiber-with-memory-sensors-and-ai/, pp. 5.
NPL1-"These clothes can wirelessly charge your phone", Parija, (Jun. 28, 2016), retrieved Sep. 30, 2021 from https://money.cnn.com/2016/06/28/technology/baubax-wireless-charging-clothing-kickstarter/, pp. 5.
NPL2-"Wireless Charging Apparel", (Aug. 10, 2016), retrieved Sep. 30, 2021 from https://www.kickstarter.com/projects/baubax/worlds-smartest-wireless-charging-apparel-baubax?token=4b43c783, pp. 2.
NPL3-"This travel jacket does 15 things at once", Parija, (Aug. 27, 2015), retrieved Sep. 30, 2021 from https://money.cnn.com/2015/07/07/smallbusiness/baubax-travel-jacket-15-features/?iid=EL, pp. 6.
NPL4-Phone-charging boots, Leslle, (Jun. 18, 2010), retrieved Sep. 30, 2021 from https://www.cnet.com/news/phone-charging-boots-walk-a-lot-to-talk/, pp. 3.
NPL5-"The World's First Phone-Charging Pants Are Here", Daniel, (2014), retrieved Sep. 30, 2021 from https://www.businessinsider.com/fashion-designer-adrien-sauvage-and-microsoft-create-first-wireless-phone-charging-pants-2014-6, pp. 8.
NP6-"Belmint Back Stretching Electric Mat", retrieved Sep. 30, 2021 from https://www.amazon.com/dp/B07NK7Z46Z, pp. 11.
NP7-"Ultrasound Cavitation Machines", retrieved Sep. 30, 2021 from https://www.bestreviews.guide/cavitation-machines, pp. 4.
NPL8-"DigiKey", retrieved Sep. 30, 2021 from https://www.digikey.com/product-detail/en/te-connectivity-measurement-specialties/1004308-2/223-1872-ND/279650, pp. 4.
NPL9-"Piezo Cables", retrieved Sep. 30, 2021 from https://www.te.com/usa-en/product-CAT-PFS0001.html, pp. 3.
NPL10-"Artificial synesthesia via sonification: A wearable augmented sensory system", Foner, (Mar. 1999), retrieved Sep. 30, 2021 from https://link.springer.com/article/10.1023/A:1019178210975, pp. 4.
NPL11-"Fundamentals of Wearable Computers and Augmented Reality", retrieved Sep. 30, 2021 from https://www.amazon.com/s?k=9781482243512, pp. 2.
NPL12-"The wearable robot that helps people walk again", Arjun, retrieved Sep. 30, 2021 from https://www.cnbc.com/2015/04/29/the-bionic-suit-that-helps-paralyzed-people-walk-again.html, pp. 4.
NPL13-"Piezoelectric Actuators", Carter et al., retrieved Sep. 30, 2021 from https://piezo.com/pages/piezoelectric-actuators, pp. 27.
NPL14-"PHT Magnetics", retrieved Sep. 30, 2021 from http://phtmagnetics.com/, p. 1.
NPL15-"Veredus Magnetik Rug", retrieved Sep. 30, 2021 from https://www.smartpakequine.com/pt/veredus-magnetik-rug-10755, p. 1.
NPL16-"Faraday Blanket With Pocket EMF Protective 40GHz Tested", retrieved Sep. 30, 2021 from https://www.smart-safe.com/products/electromagnetic-radiation-protective-blanket, pp. 5.
NPL17-"Blackhawk Under the Radar Cell Phone Pouch Black", retrieved Sep. 30, 2021 from https://www.walmart.com/ip/Blackhawk-Under-the-Radar-Cell-Phone-Pouch-Black/39989685, p. 1.
NPL18-"GoDark Faraday Bags", retrieved Sep. 30, 2021 from https://godarkbags.com/products/godark-faraday-bags-stop-hacking-and-location-tracking-of-your-cell-phone-and-tablet, pp. 11.
NPL19-"COMPEX Edge 3.0 Muscle Stimulator With Tens Kit", retrieved Sep. 30, 2021 from https://www.compex.com/compex-edge-2-0-muscle-stimulator-kit-with-tens, pp. 6.
NPL20-"EMG ECG Foam Solid Gel Electrodes", retrieved Sep. 30, 2021 from https://shop.openbci.com/products/skintact-f301-pediatric-foam-solid-gel-electrodes-30-pack?variant=29467659395, p. 1.
NPL21-"Octopus Suction Cups", Greg, retrieved Sep. 30, 2021 from https://pixels.com/featured/octopus-suction-cups-greg-ochocki.html, pp. 3.
NPL22-"TENS Unit Pad Placement", retrieved Sep. 30, 2021 from https://omronhealthcare.com/2014/01/10-tips-for-tens-pad-placement/, pp. 2.
NPL23-"Pain Management", retrieved Sep. 30, 2021 from https://omronhealthcare.com/tens-units/, pp. 5.
NPL24-"Pad Placement Guide", retrieved Sep. 30, 2021 from https://ib0k33wyb0z22kedo19bkqd1-wpengine.netdna-ssl.com/wp-content/uploads/PM3030-PAD-GUIDE-08062012.pdf, p. 1.
NPL25-"Patient Aid Full Body Mesh Patient Lift Sling", retrieved Sep. 30, 2021 from https://www.amazon.com/Patient-Sling-Weight-Capacity-Medium/dp/B0757DZRJB, pp. 7.
NPL26-"CABARET Stretch Mesh Fabric", retrieved Sep. 30, 2021 from https://www.fabricwholesaledirect.com/products/cabaret-stretch-mesh-fabric?variant=15499387462, pp. 5.
NPL27-"OTTERTEX Solution Dyed Acrylic Waterproof Fabric", retrieved Sep. 30, 2021 from https://www.fabricwholesaledirect.com/products/ottertex-solution-dyed-acrylic-waterproof-fabric, pp. 9.
NPL28-"Danish Modern Chair Repair Danish Rubber Strap Steel Loop", retrieved Sep. 30, 2021 from https://www.etsy.com/listing/682691165/danish-modern-chair-repair-danish-rubber, pp. 3.
NPL29-"MIT Engineers Create a Programmable Digital Fiber" https://scitechdaily.com/mit-engineers-create-a-programmable-digital-fiber-with-memory-sensors-and-ai/, pp. 5.
NPL-30: "A new drone can change its shape to fly through a narrow gap" retrieved Sep. 21, 2021 from https://robohub.org/a-new-drone-can-change-its-shape-to-fly-through-a-narrow-gap/, pp. 5.
NPL-31: "A tether-less legged piezoelectric miniature robot for bidirectional motion" retrieved Sep. 21, 2021 from https://www.youtube.com/watch?v=i4hORCb2sfs, pp. 3.
NPL-32: "Detection of Mobile Machine Damage Using Accelerometer Data and Prognostic Health Monitoring Techniques," Getman et al., (2009), Paper #15026 in Computational Intelligence in Vehicles and Vehicular Systems, IEEE Workshop on CIVVS/SSCI '09, retrieved Sep. 21, 2021 from https://ieeexplore.ieee.org/document/4938730, pp. 2.
NPL-33: "DGPS/INS integration using neural network methodology" retrieved Sep. 20, 2021 from "DGPS/INS integration using neural network methodology," Ibrahim, et al., ICTAI 2000: 114-121 [-] 1990-1999, pp. 8.
NPL-34: "DroneMobile" retrieved Sep. 18, 2021 from https://www.dronemobile.com, pp. 4.
NPL-35: "Energy Harvesting 'Piezo-tree' Concept" retrieved Sep. 18, 2021 from https://www.alternative-energy-news.info/energy-harvesting-piezo-tree-concept/, pp. 9.
NPL-36: "Expert System" retrieved Sep. 20, 2021 from https://en.wikipedia.org/wiki/Expert_system, pp. 12.
NPL-37: "Generating Ultrasound with Piezo Components" retrieved Sep. 21, 2021 from https://www.piceramic.com/en/piezo-technology/generating-ultrasound-with-piezo-components/, pp. 7.

(56) References Cited

OTHER PUBLICATIONS

NPL-38: "Giant Superelastic Piezoelectricity in Flexible Ferroelectric BaTiO3 Membranes" retrieved Sep. 21, 2021 from https://arxiv.org/ftp/arxiv/papers/2002/2002.08166.pdf, pp. 24.
NPL-39: "High-Speed Deformable Mirror for Laser Beam Focus Control in Cutting & Welding Applications" retrieved Sep. 21, 2021 from https://www.pi-usa.us/en/tech-blog/laser-beam-focus-control-in-cutting-welding-applications-with-high-speed-deformable-mirror/, pp. 7.
NPL-40: "How does the Piezoelectric Effect Work for Motion" retrieved Sep. 21, 2021 from https://www.youtube.com/watch?v=fHp95e-CwWQ, pp. 3.
NPL-41: "Inference Engine" retrieved Sep. 20, 2021 from https://en.wikipedia.org/wiki/Inference_engine, pp. 3.
NPL-42: "Lego Mindstorms NXT Robot controlled by Android Bluetooth" retrieved Sep. 18, 2021 from https://www.bing.com/videos/search?q=cell+phone+navigate+lego+robot+ap&view=detail&mid=7E15053A83A4839063FE7E15053A83A4839063FE&FORM=VIRE, pp. 3.
NPL-43: "NASA Is Working on Origami Solar Arrays That Unfurl in Space" retrieved Sep. 21, 2021 from https://gizmodo.com/nasa-is-working-on-origami-solar-arrays-that-unfurl-in-1622328583, pp. 5.
NPL-44: "Piezo-actuated mouse intracytoplasmic sperm injection" retrieved Sep. 21, 2021 from https://www.ncbi.nlm.nih.gov/pubmed/17406589, p. 9.
NPL-45: "Piezo Buzzers" retrieved Sep. 21, 2021 from https://www.americanpiezo.com/standard-products/buzzers.html, pp. 4.
NPL-46: "Piezoelectric driver finds buzzer's resonant frequency" retrieved Sep. 21, 2021 from https://www.edn.com/piezoelectric-driver-finds-buzzers-resonant-frequency/, pp. 6.
NPL-47: "Piezoelectric Materials in RF Applications" retrieved Sep. 21, 2021 from https://www.intechopen.com/books/piezoelectric-materials/piezoelectric-materials-in-rf-applications, pp. 34.
NPL-48: "Polymer Nanocomposites" retrieved Sep. 21, 2021 from https://www.mri.psu.edu/mri/research-capabilities/traditional-research/polymeric-systems/polymer-nanocomposites, pp. 2.
NPL-49: "Resonance-Driven Passive FoldingUnfolding Flapping Wing Actuator" retrieved Sep. 21, 2021 from https://www.mdpi.com/2076-3417/10/11/3771/htm, pp. 13.
NPL-50: "Resonance mode and sound pressure produced by circular diaphragms of electrostatic and piezoelectric speakers" retrieved Sep. 21, 2021 from https://www.sciencedirect.com/science/article/abs/pii/S0003682X17302712, pp. 2.
"NPL-51: Robotic Piece picking gets more flexible with AI-enabled adaptive tooling" retrieved Sep. 21, 2021 from https://www.therobotreport.com/robotic-piece-picking-more-flexible-ai-enabled-adaptive-tooling/, pp. 15.
NPL-52: "The usefulness of a piezo-micromanipulator in intracytoplasmic sperm injection in humans" retrieved Sep. 21, 2021 from https://www.ncbi.nlm.nih.gov/pubmed/10099992, pp. 6.
NPL-53: "This wind turbine generates power without blades" retrieved Sep. 18, 2021 from https://qz.com/406984/this-wind-turbine-generates-power-without-blades/, pp. 2.
NPL-54: "University Scientists Unveil Device That Uses Proteins to Generate Electricity 'Out of Thin Air'" retrieved Sep. 18, 2021 from https://www.goodnewsnetwork.org/device-uses-protein-to-generate-electricity-from-thin-air/, pp. 5.
"NPL-55: Velodyne Powers New NavVis VLX Mapping System" retrieved Sep. 18, 2021 from https://velodynelidar.com/press-release/velodyne-lidar-puck-lite-navvis-vlx-mapping-system/, pp. 15.
NPL-56: "Notification of Transmittal or Search Report and Written Opinion of the ISA, or the Declaration" published on Aug. 12, 2021 in Internation Search Report for PCT/US2021/021588, pp. 17.
NPL57: "Robot Trajectory Control Employing A Novel Neural Architecture," Getman, Anna L., Engineering Master's Thesis: Rensselaer Polytechnic Institute, Troy, NY, Dec. 1992.
NPL58: "Multifunctional Piezoelectric Energy Harvesting Concepts," Anton, Steven R. (Apr. 25, 2011).
NPL59-DE202014100184U1-Machine translation into English (Mar. 13, 2014).
NPL60-KR20130092911-Machine translation into English (Aug. 21, 2013).
NPL61-WO201617532-Machine translation into English (Nov. 3, 2016).
NPL62: "Multifunctional Piezoelectric Energy Harvesting Concepts," Anton, Virginia Polytechnic and State University (Apr. 25, 2011).
"Datex Ohmeda Compatible Disposable Temperature Probe-LA003," retrieved Oct. 31, 2020, Cables and Sensors, sales@cablesandsensors.com (3 pages).
Akhbanbetova et al. "A Surgical Cryoprobe for Targeted Transcomeal Freezing and Endothelial Cell Removal," epublished May 16, 2017, Journal of Ophthalmology, vol. 2017, Article ID 5614089, https://doi.org/10.1155/2017/5614089 (11 pages).

* cited by examiner

PIEZOELECTRIC ADAPTIVE MESH

CROSS REFERENCE TO RELATED APPLICATION

This application is a continuation-in-part of U.S. patent application Ser. No. 16/837,071, which was filed on Apr. 1, 2020, which is non-provisional application of U.S. Provisional Application No. 62/827,215, which was filed on Apr. 1, 2019; this application is also a continuation-in-part of U.S. patent application Ser. No. 16/836,704, which was filed on Mar. 31, 2020, which is a non-provisional application of U.S. Provisional Application No. 62/827,193, which was filed on Apr. 1, 2019; U.S. patent application Ser. No. 16/836,704 is also a non-provisional application of U.S. Provisional Application No. 62/827,195, which was filed on Apr. 1, 2019; this application is also a continuation-in-part of U.S. patent application Ser. No. 17/585,266, which was filed on Jan. 26, 2022, which is a continuation of International Application No. PCT/US2021/021588, which was filed on Mar. 9, 2021, which claims priority from and is a non-provisional application of U.S. Provisional Application No. 63/133,069, which was filed on Dec. 31, 2020; International Application No. PCT/US2021/021588 claims priority from and is a continuation-in-part application of U.S. patent application Ser. No. 16/994,618, which was filed on Aug. 16, 2020, which claims priority from U.S. Provisional Application No. 62/988,914, which was filed on Mar. 13, 2020; International Application No. PCT/US2021/021588 also claims priority directly from U.S. Provisional Application No. 62/988,914, which was filed on Mar. 13, 2020. The contents of all these applications are herein incorporated by reference in their entirety for all purposes.

TECHNICAL FIELD

The field of this disclosure relates generally to piezoelectric material and, in particular, to a piezoelectric adaptive mesh.

BACKGROUND INFORMATION

Piezoelectric materials create electrical charge when mechanically stressed, and they can cause mechanical movement in response to electrical stimulation. Moreover, a piezoelectric material can also be used to measure changes in pressure, acceleration, temperature, strain, or force by converting them to an electrical charge. Piezo-electric actuators may convey a variety of types of movement. Piezoelectric cells can change dimensions when an electric potential is applied. They are commercially available in stacks of thin layers that extend when voltage is applied to them. They can provide a variety of types of motion, including lateral motion or bending motion.

OVERVIEW OF DISCLOSURE

One aspect of this disclosure relates to a piezoelectric adaptive mesh that can act as a sensor or an actuator to enhance a person's comfort.

In one embodiment, an adaptive piezoelectric mesh system comprises: multiple piezoelectric fibers, constituting a piezoelectric mesh, operable to act as sensors and/or actuators; and a controller in communication with the multiple piezoelectric fibers and operable to receive sensor input from the multiple piezoelectric fibers and operable to direct power to the multiple piezoelectric fibers.

In some additional, alternative, or selectively cumulative embodiments, a reactive piece of furniture comprises: an adaptive piezoelectric mesh system having multiple piezoelectric fibers configured as a piezoelectric mesh, including first multiple piezoelectric fibers having first piezoelectric structures operable to function as sensors and second multiple piezoelectric fibers having second piezoelectric structures operable to function as actuators; and a controller responsive to a software processing system that is operable to directly or indirectly receive sensor input from the first piezoelectric structures and operable to cause the controller to direct power to one or more of the second piezoelectric structures in response to the sensor input.

In some additional, alternative, or selectively cumulative embodiments, an adaptive piezoelectric mesh system for furniture comprises: multiple piezoelectric fibers configured as a piezoelectric mesh, including first multiple piezoelectric fibers having first piezoelectric structures operable to function as sensors and second multiple piezoelectric fibers having second piezoelectric structures operable to function as actuators; and a controller responsive to a software processing system that is operable to directly or indirectly receive sensor input from the first piezoelectric structures and operable to cause the controller to direct power to one or more of the second piezoelectric structures in response to the sensor input.

In some additional, alternative, or selectively cumulative embodiments, an adaptive piezoelectric mesh system for modifying relative interaction between a rider and an animal comprises: first multiple piezoelectric fibers having first piezoelectric structures operable to function as sensors to sense received force from the rider or from the animal or from both the rider and the animal with the first multiple piezoelectric fibers; second multiple piezoelectric fibers having second piezoelectric structures operable to function as actuators operable to apply force from the second multiple piezoelectric fibers toward the rider or toward the animal or toward both the rider and the animal; and a controller responsive to a software processing system that is operable to directly or indirectly receive sensor input from the first piezoelectric structures and operable to cause the controller to direct power to one or more of the second piezoelectric structures in response to the sensor input to modify the relative interaction between the rider and the animal.

In some additional, alternative, or selectively cumulative embodiments, an adaptive piezoelectric mesh system for modifying relative interaction between a rider and an animal comprises: first multiple piezoelectric fibers having first piezoelectric structures operable to function as sensors to sense received force from the rider; second multiple piezoelectric fibers having second piezoelectric structures operable to function as actuators operable to apply force from the second multiple piezoelectric fibers toward the animal; and a controller responsive to a software processing system that is operable to directly or indirectly receive sensor input from the first piezoelectric structures and operable to cause the controller to direct power to one or more of the second piezoelectric structures in response to the sensor input to modify the relative interaction between the rider and the animal.

In some additional, alternative, or selectively cumulative embodiments, an adaptive piezoelectric mesh system for modifying relative interaction between a rider and an animal comprises: first multiple piezoelectric fibers having first piezoelectric structures operable to function as sensors to sense received force from the animal; second multiple piezoelectric fibers having second piezoelectric structures operable to function as actuators operable to apply force from the second multiple piezoelectric fibers toward the rider; and a controller responsive to a software processing system that is operable to directly or indirectly receive sensor input from the first piezoelectric structures and operable to cause the controller to direct power to one or more of the second piezoelectric structures in response to the sensor input to modify the relative interaction between the rider and the animal.

In some additional, alternative, or selectively cumulative embodiments, an adaptive mesh system for modifying relative interaction between a rider and an animal comprises: a rider-side mesh having rider-side sensors positioned to detect force received from the rider, and wherein the rider-side mesh includes rider-side actuators positioned to apply force to the rider; an animal-side mesh positioned in proximity to the rider-side sensors, wherein the animal-side mesh has animal-side sensors positioned to detect force received from the animal, and wherein the animal-side mesh includes animal-side actuators positioned to apply force to the animal; a software processing system configured to determine rider sensor data including amounts and timing of changes perceived by the rider-side sensors at respective rider-side sensor locations based on rider-side sensor signals from the respective rider-side sensors at the respective rider-side sensor locations in response to force received by the respective rider-side sensors, wherein the software processing system is configured to determine animal sensor data including amounts and timing of changes perceived by the animal-side sensors at respective animal-side sensor locations based on animal side sensor signals from the respective animal-side sensors at the respective animal-side sensor locations in response to changes perceived by the respective animal-side sensors, and wherein the software processing system, in response to rider sensor data or animal sensor data, is configured to determine respective timing and amounts of force for respective rider-side actuators to apply toward the rider at specific ones of rider-side actuator locations or determine respective timing and amounts of force for respective animal-side actuators to apply toward the animal at specific ones of animal-side actuator locations; and a controller configured to be responsive to the software processing system to direct power to rider-side actuators at specific ones of rider-side actuator locations at specific times or direct power to animal-side actuators at specific ones of animal-side actuator locations at specific times to modify the relative interaction between the rider and the animal.

In some additional, alternative, or selectively cumulative embodiments, an adaptive piezoelectric mesh system for modifying relative interaction between a rider and an animal comprises: a rider-side mesh having rider-side piezoelectric structures, wherein the rider-side piezoelectric structures are configured to operate as rider-side piezoelectric sensors positioned to detect changes perceived by the rider-side piezoelectric structures caused by the rider, and wherein the rider-side mesh includes rider-side actuators positioned to apply force to the rider; an animal-side mesh positioned in proximity to the rider-side piezoelectric structures, wherein the animal-side piezoelectric structures are configured to operate as animal-side piezoelectric sensors positioned to detect changes perceived by the animal-side piezoelectric structures caused by the animal, and wherein the animal-side mesh includes animal-side actuators positioned to apply force to the animal; a software processing system configured to determine rider sensor data including amounts and timing of changes perceived by the rider-side piezoelectric sensors at respective rider-side sensor locations based on rider-side sensor signals from the respective rider-side piezoelectric sensors at the respective rider-side sensor locations in response to force received by the respective rider-side sensors, wherein the software processing system is configured to determine animal sensor data including amounts and timing of changes perceived by the animal-side piezoelectric sensors at respective animal-side sensor locations based on animal side sensor signals from the respective animal-side piezoelectric sensors at the respective animal-side sensor locations in response to changes perceived by the respective animal-side sensors, and wherein the software processing system, in response to rider sensor data or animal sensor data, is configured to determine respective timing and amounts of force for respective rider-side actuators to apply toward the rider at specific ones of rider-side actuator locations or determine respective timing and amounts of force for respective animal-side actuators to apply toward the animal at specific ones of animal-side actuator locations; and a controller configured to be responsive to the software processing system to direct power to rider-side actuators at specific ones of rider-side actuator locations at specific times or direct power to animal-side actuators at specific ones of animal-side actuator locations at specific times to modify the relative interaction between the rider and the animal.

In some additional, alternative, or selectively cumulative embodiments, an adaptive piezoelectric mesh system for modifying relative interaction between a rider and an animal comprises: a rider-side mesh having rider-side piezoelectric structures, wherein the rider-side piezoelectric structures include rider-side piezoelectric sensors positioned to detect force received from the rider, and wherein the rider-side piezoelectric structures include rider-side piezoelectric actuators positioned to apply force to the rider; an animal-side mesh positioned in proximity to the rider-side mesh, wherein the animal-side mesh has the animal-side piezoelectric structures that include animal-side piezoelectric sensors positioned to detect force received from the animal, and wherein the animal-side piezoelectric structures include animal-side piezoelectric actuators positioned to apply force to the animal; a software processing system configured to determine rider sensor data including amounts and timing of force received by the rider-side piezoelectric sensors at respective rider-side sensor locations based on rider side sensor signals from the respective rider-side piezoelectric sensors at the respective rider-side sensor locations in response to force received by the respective rider-side sensors, wherein the software processing system is configured to determine animal sensor data including amounts and timing of force received by the animal-side piezoelectric sensors at respective animal-side sensor locations based on animal side sensor signals from the respective animal-side piezoelectric sensors at the respective animal-side sensor locations in response to force received by the respective animal-side sensors, and wherein the software processing system, in response to rider sensor data or animal sensor data, is configured to determine respective timing and amounts of force for respective rider-side piezoelectric actuators to apply toward the rider at specific ones of rider-side actuator locations or determine respective timing and amounts of force for respective animal-side piezoelectric actuators to apply toward the animal at specific ones of animal-side actuator locations; and a controller configured to be responsive to the software processing system to direct power to rider-side piezoelectric actuators at specific ones of rider-side actuator locations at specific times or direct power to animal-side piezoelectric actuators at specific ones of animal-side actuator locations at specific times to modify the relative interaction between the rider and the animal.

In some additional, alternative, or selectively cumulative embodiments, a method for responding to human movement on a piece of furniture comprises: providing a fabric including piezoelectric structures including sensors and actuators at specific locations in the fabric; employing the sensors to sense human interaction with the fabric; conveying data regarding the human interaction with the fabric at affected ones of the sensors at the specific locations to a software processing system; employing the software processing system to interpret the data regarding the human interaction with the fabric at the affected ones of the sensors at the specific locations; and directing a controller to cause actuators at one or more of the specific locations to respond to an interpretation of the data by the software processing system.

In some additional, alternative, or selectively cumulative embodiments, a method employing an adaptive mesh system for modifying relative interaction between a rider and an animal comprises: employing a rider-side mesh having rider-side sensors positioned to detect force received from the rider, and wherein the rider-side mesh includes rider-side actuators positioned to apply force to the rider; employing an animal-side mesh in proximity to the rider-side mesh, wherein the animal-side mesh has animal-side sensors positioned to detect force received from the animal, and wherein the animal-side mesh includes animal-side actuators positioned to apply force to the animal; employing a software processing system to determine rider sensor data including amounts and timing of changes perceived by the rider-side sensors at respective rider-side sensor locations based on rider-side sensor signals from the respective rider-side sensors at the respective rider-side sensor locations in response to changes perceived by the respective rider-side sensors; employing the software processing system to determine animal sensor data including amounts and timing of changes perceived by the animal-side sensors at respective animal-side sensor locations based on animal-side sensor signals from the respective animal-side sensors at the respective animal-side sensor locations in response to changes perceived by the respective animal-side sensors; employing the software processing system to determine a responsive action protocol in response to the rider sensor data or the animal sensor data, wherein the responsive action protocol includes respective timing and amounts of force for respective rider-side actuators to apply toward the rider at specific ones of rider-side actuator locations or determine respective timing and amounts of force for respective animal-side actuators to apply toward the animal at specific ones of animal-side actuator locations; and employing a controller responsive to the software processing system to implement the responsive action protocol by directing power to rider-side actuators at specific ones of rider-side actuator locations at specific times or directing power to animal-side actuators at specific ones of animal-side actuator locations at specific times to modify the relative interaction between the rider and the animal.

In some additional, alternative, or selectively cumulative embodiments, a method for employing an adaptive piezoelectric mesh system for modifying relative interaction between a rider and an animal comprises: employing a rider-side mesh having rider-side piezoelectric structures, wherein the rider-side piezoelectric structures are configured to operate at rider-side piezoelectric sensors positioned to detect changes perceived by the rider-side piezoelectric structures caused by the rider, and wherein the rider-side mesh includes rider-side actuators positioned to apply force to the rider; employing an animal-side mesh in proximity to the rider-side mesh, wherein the animal-side mesh has animal-side piezoelectric structures that are configured to operate as animal-side piezoelectric sensors positioned to detect changes perceived by the animal-side piezoelectric structures caused by the animal, and wherein the animal-side mesh includes animal-side actuators positioned to apply force to the animal; employing a software processing system to determine rider sensor data including amounts and timing of changes perceived by the rider-side piezoelectric sensors at respective rider-side sensor locations based on rider-side sensor signals from the respective rider-side piezoelectric sensors at the respective rider-side sensor locations in response to changes perceived by the respective rider-side sensors; employing the software processing system to determine animal sensor data including amounts and timing of changes perceived by the animal-side piezoelectric sensors at respective animal-side sensor locations based on animal-side sensor signals from the respective animal-side piezoelectric sensors at the respective animal-side sensor locations in response to changes perceived by the respective animal-side sensors; employing the software processing system to determine a responsive action protocol in response to the rider sensor data or the animal sensor data, wherein the responsive action protocol includes respective timing and amounts of force for respective rider-side actuators to apply toward the rider at specific ones of rider-side actuator locations or determine respective timing and amounts of force for respective animal-side actuators to apply toward the animal at specific ones of animal-side actuator locations; and employing a controller responsive to the software processing system to implement the responsive action protocol by directing power to rider-side actuators at specific ones of rider-side actuator locations at specific times or directing power to animal-side actuators at specific ones of animal-side actuator locations at specific times to modify the relative interaction between the rider and the animal.

In some additional, alternative, or selectively cumulative embodiments, a method for employing an adaptive piezoelectric mesh system for modifying relative interaction between a rider and an animal comprises: employing a rider-side mesh having rider-side piezoelectric structures, wherein the rider-side piezoelectric structures include rider-side piezoelectric sensors positioned to detect force received from the rider, and wherein the rider-side piezoelectric structures include rider-side piezoelectric actuators positioned to apply force to the rider; employing an animal-side mesh in proximity to the rider-side mesh, wherein the animal-side mesh has animal-side piezoelectric structures that include animal-side piezoelectric sensors positioned to detect force received from the animal, and wherein the animal-side piezoelectric structures include animal-side piezoelectric actuators positioned to apply force to the animal; employing a software processing system to determine rider sensor data including amounts and timing of force received by the rider-side piezoelectric sensors at respective rider-side sensor locations based on rider-side sensor signals from the respective rider-side piezoelectric sensors at the respective rider-side sensor locations in response to force received by the respective rider-side sensors; employing the software processing system to determine animal sensor data including amounts and timing of force received by the animal-side piezoelectric sensors at respective animal-side sensor locations based on animal-side sensor signals from the respective animal-side piezoelectric sensors at the respective animal-side sensor locations in response to force received by the respective animal-side sensors; employing the software processing system to determine a responsive action protocol in response to rider sensor data or animal sensor data, wherein the responsive action protocol includes respective timing and amounts of force for respective rider-side piezoelectric actuators to apply toward the rider at specific ones of rider-side actuator locations or determine respective timing and amounts of force for respective animal-side piezoelectric actuators to apply toward the animal at specific ones of animal-side actuator locations; and employing a controller responsive to the software processing system to implement the responsive action protocol by directing power to rider-side piezoelectric actuators at specific ones of rider-side actuator locations at specific times or directing power to animal-side piezoelectric actuators at specific ones of animal-side actuator locations at specific times to modify the relative interaction between the rider and the animal.

In some additional, alternative, or selectively cumulative embodiments, the controller may operatively communicate with a software processing system.

In some additional, alternative, or selectively cumulative embodiments, the controller may form part of a software processing system.

In some additional, alternative, or selectively cumulative embodiments, the software processing system may include or communicate with trainable artificial intelligence (AI) system.

In some additional, alternative, or selectively cumulative embodiments, the controller may operatively communicate with a trainable AI system.

In some additional, alternative, or selectively cumulative embodiments, the trainable AI system comprises one or more of a neural network, a probabilistic technique such as Bayes or Markov algorithm, a kernel method (like SVM, decision trees/random forest, Gaussians, PCA, can-cor . . . ), reinforcement learning that can have nothing to do with artificial neural networks, artificial reasoning a.k.a. “good old fashioned AI,” many path-planning and intelligent control-systems methods that correspond to “classical AI” (not the same as GOFAI), alife (swarms, cellular automata . . . ), agents and chaos systems, and/or any algorithm or group of algorithms that optimize a value function (reinforcement learning and linear dynamic programming).

In some additional, alternative, or selectively cumulative embodiments, the adaptive piezoelectric mesh system is adapted to determine a position of an object, such as a body, interacting with the multiple piezoelectric fibers.

In some additional, alternative, or selectively cumulative embodiments, the adaptive piezoelectric mesh system is adapted to apply a specified amount of force to specific mesh locations in response to weight of a body.

In some additional, alternative, or selectively cumulative embodiments, the adaptive piezoelectric mesh system is implemented as a seat, a bed, a sofa, or any other furniture upon which a person can sit, lie, or recline.

In some additional, alternative, or selectively cumulative embodiments, the adaptive piezoelectric mesh system is implemented as an office chair, a car seat, or a child seat.

In some additional, alternative, or selectively cumulative embodiments, the adaptive piezoelectric mesh system is implemented as a residential bed, a hotel bed, or a hospital bed.

In some additional, alternative, or selectively cumulative embodiments, the adaptive piezoelectric mesh system is implemented as furniture cover, such as a seat cover or a mattress cover.

In some additional, alternative, or selectively cumulative embodiments, the controller operatively communicates to a user interface through a hardwired connection.

In some additional, alternative, or selectively cumulative embodiments, the controller operatively communicates to a user interface through a wireless connection.

In some additional, alternative, or selectively cumulative embodiments, the user interface includes a smart phone or other electronic device with or without a virtual assistant.

In some additional, alternative, or selectively cumulative embodiments, the trainable AI system is operable to make constant adjustments to provide increased comfort for a user in real time with or without user input.

In some additional, alternative, or selectively cumulative embodiments, a user can choose settings through the controller and the trainable AI system can readily respond to user movement, and in some cases provide predictive instructions to the piezoelectric mesh.

In some additional, alternative, or selectively cumulative embodiments, the piezoelectric adaptive mesh is operable to slowly rock a person to sleep.

In some additional, alternative, or selectively cumulative embodiments, the piezoelectric adaptive mesh is operable to slowly rock a person a few degrees to one side, then the other, to avoid bedsores.

In some additional, alternative, or selectively cumulative embodiments, the piezoelectric adaptive mesh is operable to provide an adjustable massage mode.

In some additional, alternative, or selectively cumulative embodiments, the piezoelectric adaptive mesh is operable to provide safety enhancements for the elderly or people who are drunk to help with balance, so they don’t fall out of bed.

In some additional, alternative, or selectively cumulative embodiments, the piezoelectric adaptive mesh is operable to lean a person toward center as an optional default.

In some additional, alternative, or selectively cumulative embodiments, the piezoelectric adaptive mesh is operable to detect whether a person starts snoring and operable to raise the person’s head in response.

In some additional, alternative, or selectively cumulative embodiments, the piezoelectric adaptive mesh is operable to raise the person’s head in response to measurements made by an oxygen sensor.

In some additional, alternative, or selectively cumulative embodiments, the piezoelectric adaptive mesh is operable to raise a low spot.

In some additional, alternative, or selectively cumulative embodiments, the piezoelectric adaptive mesh is operable to accommodate sleeping arrangements between two people.

In some additional, alternative, or selectively cumulative embodiments, the piezoelectric adaptive mesh is operable to reduce incidence of limbs going numb during sleep.

In some additional, alternative, or selectively cumulative embodiments, the piezoelectric adaptive mesh is operable to simulate the movement of a waterbed.

In some additional, alternative, or selectively cumulative embodiments, the piezoelectric adaptive mesh is operable to automatically adjust characteristics of a wave to enhance user experience.

In some additional, alternative, or selectively cumulative embodiments, the piezoelectric adaptive mesh is operable to charge up its resonant massage or adjustment modes by capturing human movement and body heat.

In some additional, alternative, or selectively cumulative embodiments, the piezoelectric adaptive mesh is operable to function as a heating pad.

In some additional, alternative, or selectively cumulative embodiments, the piezoelectric adaptive mesh is operable to heat and potentially cool specific locations.

In some additional, alternative, or selectively cumulative embodiments, the piezoelectric adaptive mesh is operable to capture heat from a warmer person in one location and supply heat to a cooler person in another location.

In some additional, alternative, or selectively cumulative embodiments, the piezoelectric adaptive mesh comprises a single layer mesh.

In some additional, alternative, or selectively cumulative embodiments, the piezoelectric adaptive mesh comprises a multiple layer mesh.

In some additional, alternative, or selectively cumulative embodiments, each piezoelectric fiber can act as both a sensor and an actuator.

In some additional, alternative, or selectively cumulative embodiments, the piezoelectric adaptive mesh can be controlled so that the weft acts as sensors and the warp acts as actuators or vice versa.

In some additional, alternative, or selectively cumulative embodiments, the fibers acting as sensors and actuators are equally distributed between weft and warp.

In some additional, alternative, or selectively cumulative embodiments, each mesh layer is operable to act as either a sensor layer or an actuator layer.

In some additional, alternative, or selectively cumulative embodiments, the trainable AI system can modify the location and distribution between sensor and actuator at any time.

In some additional, alternative, or selectively cumulative embodiments, the piezoelectric adaptive mesh includes piezoelectric fibers that form a warp and a weft that are transverse to each other.

In some additional, alternative, or selectively cumulative embodiments, the piezoelectric fibers include multiple discrete, spaced-apart piezoelectric structures.

In some additional, alternative, or selectively cumulative embodiments, the piezoelectric fibers have continuous or partly continuous piezoelectric structures and capabilities.

In some additional, alternative, or selectively cumulative embodiments, the piezoelectric structures are operable to act as sensors and/or actuators.

In some additional, alternative, or selectively cumulative embodiments, all of the piezoelectric structures on a piezoelectric fiber have the same composition.

In some additional, alternative, or selectively cumulative embodiments, the piezoelectric fiber may include two or more piezoelectric structures having different compositions.

In some additional, alternative, or selectively cumulative embodiments, all of the piezoelectric structures on a piezoelectric fiber function as both sensors and actuators.

In some additional, alternative, or selectively cumulative embodiments, some of the piezoelectric structures on a piezoelectric fiber function as dedicated sensors and some of the piezoelectric structures on a piezoelectric fiber function as dedicated actuators.

In some additional, alternative, or selectively cumulative embodiments, the piezoelectric structures are disproportionally distributed between the weft and the warp.

In some additional, alternative, or selectively cumulative embodiments, the sensors and actuators are equally distributed between the weft and warp.

In some additional, alternative, or selectively cumulative embodiments, the sensors and actuators are disproportionally distributed between the weft and warp.

In some additional, alternative, or selectively cumulative embodiments, the piezoelectric fiber may include alternating sensors and actuators as dedicated piezoelectric structures.

In some additional, alternative, or selectively cumulative embodiments, two or more piezoelectric fibers are partnered, such as by being twined together or laid side by side, to form a single line of the weft or the warp.

In some additional, alternative, or selectively cumulative embodiments, partnered piezoelectric fibers are based on different polymers.

In some additional, alternative, or selectively cumulative embodiments, the piezoelectric mesh includes optical fibers.

In some additional, alternative, or selectively cumulative embodiments, the software processing system is configured to determine amounts of force applied to the sensors at respective sensor locations along the first multiple piezoelectric fibers based on sensor signals from respective sensors at the respective sensor locations in response to received force applied against the respective sensors, and wherein the software operating system is configured to formulate an exertion force for the actuators at respective actuator locations along the second multiple piezoelectric fibers and direct the controller to apply actuator signals to respective actuators at the respective actuator locations in response to the received force applied against the respective sensors.

In some additional, alternative, or selectively cumulative embodiments, the adaptive mesh system comprises an adaptive mesh including the first multiple piezoelectric fibers and the second multiple piezoelectric fibers, wherein the adaptive mesh is configured as a bareback pad.

In some additional, alternative, or selectively cumulative embodiments, the adaptive mesh system is configured to form part of a saddle or is configured for employment with a saddle.

In some additional, alternative, or selectively cumulative embodiments, the adaptive mesh system comprises an adaptive mesh including the first multiple piezoelectric fibers and the second multiple piezoelectric fibers, wherein the adaptive mesh is configured as a saddle cover.

In some additional, alternative, or selectively cumulative embodiments, the rider is a human.

In some additional, alternative, or selectively cumulative embodiments, the rider is one of a primate, a monkey, a chimpanzee, a cat, or a dog.

In some additional, alternative, or selectively cumulative embodiments, the animal is an animal that has been domesticated for riding by a human.

In some additional, alternative, or selectively cumulative embodiments, the animal is a horse.

In some additional, alternative, or selectively cumulative embodiments, the animal is one of a caribou, a camel, a large cat, a cow, a large dog, a donkey, an elephant, an elk, a mule, an ox, or a zebra.

In some additional, alternative, or selectively cumulative embodiments, the animal is a human.

In some additional, alternative, or selectively cumulative embodiments, the animal is a non-human animal.

In some additional, alternative, or selectively cumulative embodiments, the sensors include primary sensors and secondary sensors, wherein the primary sensors are configured to sense contact of the human with the first multiple piezoelectric fibers, and wherein the secondary sensors are configured to sense contact of the animal with the first multiple piezoelectric fibers.

In some additional, alternative, or selectively cumulative embodiments, the first multiple piezoelectric fibers include first primary piezoelectric fibers and first secondary piezoelectric fibers, wherein the first primary piezoelectric fibers include the primary sensors, wherein the first secondary piezoelectric fibers include the secondary sensors, wherein the first primary piezoelectric fibers are in proximity to a first external surface of an article, wherein the first secondary piezoelectric fibers are in proximity to a second external surface of the article such that the first primary piezoelectric fibers are closer to the first external surface than they are to the second external surface, and wherein the first secondary piezoelectric fibers are closer to the second external surface than they are to the first external surface.

In some additional, alternative, or selectively cumulative embodiments, the actuators include primary sensors and secondary actuators, wherein the primary actuators are configured to apply force against the rider from the second multiple piezoelectric fibers, and wherein the secondary actuators are configured to apply force against the animal from the second multiple piezoelectric fibers.

In some additional, alternative, or selectively cumulative embodiments, the second multiple piezoelectric fibers include second primary piezoelectric fibers and second secondary piezoelectric fibers, wherein the second primary piezoelectric fibers include the primary actuators, wherein the second secondary piezoelectric fibers include the secondary sensors, wherein the second primary piezoelectric fibers are in proximity to a first external surface of an article, wherein the second secondary piezoelectric fibers are in proximity to a second external surface of the article such that the second primary piezoelectric fibers are closer to the first external surface than they are to the second external surface, and wherein the second secondary piezoelectric fibers are closer to the second external surface than they are to the first external surface.

In some additional, alternative, or selectively cumulative embodiments, the actuators include primary sensors and secondary actuators, wherein the primary actuators are configured to apply force against the rider from the second multiple piezoelectric fibers, wherein the secondary actuators are configured to apply force against the animal from the second multiple piezoelectric fibers, wherein the second multiple piezoelectric fibers include second primary piezoelectric fibers and second secondary piezoelectric fibers, wherein the second primary piezoelectric fibers include the primary actuators, wherein the second secondary piezoelectric fibers include the secondary sensors, wherein the second primary piezoelectric fibers are in proximity to the first external surface of the article, wherein the second secondary piezoelectric fibers are in proximity to the second external surface of the article such that the second primary piezoelectric fibers are closer to the first external surface than they are to the second external surface, and wherein the second secondary piezoelectric fibers are closer to the second external surface than they are to the first external surface.

In some additional, alternative, or selectively cumulative embodiments, the controller or software processing system is configured to cause the second piezoelectric structures to apply force toward the rider in response to received force from the animal by the first piezoelectric structures.

In some additional, alternative, or selectively cumulative embodiments, the controller or software processing system is configured to cause the second piezoelectric structures to apply force toward the animal in response to received force from the rider by the first piezoelectric structures.

In some additional, alternative, or selectively cumulative embodiments, the controller or software processing system is configured to cause the second piezoelectric structures to apply force toward the rider in response to unequal symmetrical received force from the rider by the first piezoelectric structures.

In some additional, alternative, or selectively cumulative embodiments, the controller or software processing system is configured to cause the second piezoelectric structures to apply force toward the animal in response to unequal symmetrical received force from the animal by the first piezoelectric structures.

In some additional, alternative, or selectively cumulative embodiments, the software processing system is configured to keep track of sensor inputs from respective idiosyncratic weight shifts of a first rider intended to convey respective movement instructions to a first animal.

In some additional, alternative, or selectively cumulative embodiments, the software processing system is configured to develop a first instruction signature of the first rider in relation to the first animal.

In some additional, alternative, or selectively cumulative embodiments, the software processing system is configured to convert the sensor inputs from the respective idiosyncratic weight shifts of the first rider into respective piezo instructions to the second piezoelectric structures to apply force toward the animal associated with the first instruction signature.

In some additional, alternative, or selectively cumulative embodiments, the software processing system identifies differences in intended movement instructions between the force received from a second rider and the force received from the first rider, and wherein the software processing system compensates for the force received from a second rider to provide respective piezo instructions to the second piezoelectric structures to apply force toward the animal associated with the first instruction signature.

In some additional, alternative, or selectively cumulative embodiments, the software processing system identifies differences in intended movement instructions between the force received from a second rider and the force received from the first rider, and wherein the software processing system is configured to cause stimulation to the second rider to encourage the second rider to generate force more similar to force associated with the first instruction signature.

In some additional, alternative, or selectively cumulative embodiments, the software processing system determines whether the rider-sensor data is indicative of a weight-imbalanced rider, and wherein software processing system implements the responsive action protocol to facilitate balance correction of the rider.

In some additional, alternative, or selectively cumulative embodiments, the software processing system determines whether the rider-sensor data is indicative of a rider with weight shifted forward or backward.

In some additional, alternative, or selectively cumulative embodiments, the software processing system determines whether the rider-sensor data is indicative of a rider with weight shifted leftward or rightward.

In some additional, alternative, or selectively cumulative embodiments, the software processing system determines whether the rider-sensor data is indicative of a rider command.

In some additional, alternative, or selectively cumulative embodiments, the software processing system determines whether the rider-sensor data is indicative of a specific rider command from a group of predetermined rider commands.

In some additional, alternative, or selectively cumulative embodiments, the software processing system determines whether the animal-sensor data is indicative of an animal response to a rider command.

In some additional, alternative, or selectively cumulative embodiments, the software processing system determines whether the animal-sensor data is indicative of a specific animal response from a group of predetermined animal responses.

In some additional, alternative, or selectively cumulative embodiments, the software processing system maps the animal-side actuator locations relative to the rider-side sensor locations.

In some additional, alternative, or selectively cumulative embodiments, the software processing system provides a responsive action protocol to the controller that instructs the animal-side actuators to exert force toward the animal that correlates with detected force received from the rider-side sensors.

In some additional, alternative, or selectively cumulative embodiments, the software processing system determines a responsive action protocol to instruct the controller to direct the animal-side actuators to exert force toward the animal that correlates with detected force received from the rider-side sensors, wherein the software processing system determines that the rider-sensor data is indicative of a weight-imbalanced rider, and wherein software processing system adjusts the responsive action protocol to correct for imbalanced weight of the rider and to instruct the controller to direct the animal-side actuators to exert corrected force toward the animal correlating with force received from the rider-side sensors corrected for weight imbalance of the rider.

In some additional, alternative, or selectively cumulative embodiments, the rider-side mesh and animal-side mesh are configured together as a bareback pad.

In some additional, alternative, or selectively cumulative embodiments, the rider-side mesh and animal-side mesh are configured to form part of a saddle or are configured for employment with a saddle.

In some additional, alternative, or selectively cumulative embodiments, the animal-side mesh is configured as an animal riding blanket.

In some additional, alternative, or selectively cumulative embodiments, the rider-side mesh and animal-side mesh are configured as a saddle case or as a saddle wrap.

In some additional, alternative, or selectively cumulative embodiments, the rider-side actuators are rider-side piezoelectric actuators and/or the animal-side actuators are animal-side piezoelectric actuators.

In some additional, alternative, or selectively cumulative embodiments, the rider-side piezoelectric structures are the rider-side actuators.

In some additional, alternative, or selectively cumulative embodiments, the animal-side piezoelectric structures are the animal-side actuators.

In some additional, alternative, or selectively cumulative embodiments, the rider-side actuators or the animal-side actuators comprise eccentric rotating mass vibration motors.

In some additional, alternative, or selectively cumulative embodiments, the rider-side actuators are rider-side piezoelectric actuators and/or the animal-side actuators are animal-side piezoelectric actuators, and wherein the rider-side actuators and/or the animal-side actuators are configured to trigger eccentric rotating mass vibration motors.

In some additional, alternative, or selectively cumulative embodiments, the rider-side mesh is physically integrated with the animal-side mesh.

In some additional, alternative, or selectively cumulative embodiments, the rider-side mesh is weaved with the animal-side mesh.

In some additional, alternative, or selectively cumulative embodiments, the rider-side piezoelectric structures and/or the animal-side piezoelectric structures comprise disks.

In some additional, alternative, or selectively cumulative embodiments, rider-side piezoelectric structures and the animal-side piezoelectric structures have different characteristics.

In some additional, alternative, or selectively cumulative embodiments, the rider-side piezoelectric structures have a rider-piezo major axis, wherein the animal-side piezoelectric structures have an animal-piezo major axis, and wherein the animal-piezo major axis is greater than or equal to the rider-piezo major axis.

In some additional, alternative, or selectively cumulative embodiments, the rider-side actuators have a rider-actuator major axis, wherein the animal-side actuators have an animal-actuator major axis, and wherein the animal-actuator major axis is greater than or equal to the rider-actuator major axis.

In some additional, alternative, or selectively cumulative embodiments, the software processing system is configured to establish a rider-specific profile of rider-side sensor data for multiple ones of rider commands executed by an identified rider.

In some additional, alternative, or selectively cumulative embodiments, the software processing system is configured to establish a rider-specific profile of animal-side sensor data for multiple ones of rider commands executed by an identified rider.

In some additional, alternative, or selectively cumulative embodiments, the software processing system is configured to establish an animal-specific profile of animal-side sensor data for responses to multiple ones of rider commands executed by an individual rider.

In some additional, alternative, or selectively cumulative embodiments, the adaptive mesh system is configured is configured to alert the rider of a rider issue.

In some additional, alternative, or selectively cumulative embodiments, the adaptive mesh system is configured to alert the rider of an animal issue.

In some additional, alternative, or selectively cumulative embodiments, the adaptive mesh system is configured to cause the rider to move in response to a detected rider issue.

In some additional, alternative, or selectively cumulative embodiments, the adaptive mesh system employs carbon fibers.

In some additional, alternative, or selectively cumulative embodiments, the adaptive mesh system employs fleece.

In some additional, alternative, or selectively cumulative embodiments, the adaptive mesh system employs gel padding.

In some additional, alternative, or selectively cumulative embodiments, the adaptive mesh system employs memory foam.

In some additional, alternative, or selectively cumulative embodiments, the adaptive mesh system employs voice coils.

In some additional, alternative, or selectively cumulative embodiments, the rider-side actuators or the animal-side actuators comprise voice coils.

In some additional, alternative, or selectively cumulative embodiments, the adaptive mesh system employs optical fibers.

In some additional, alternative, or selectively cumulative embodiments, the software processing system is configured to convey to an animal, without a rider, a rider-specific profile of rider-side sensor data for multiple ones of rider commands executed by an identified rider and/or a rider-specific profile of animal-side sensor data for multiple ones of rider commands executed by the identified rider.

In some additional, alternative, or selectively cumulative embodiments, the software processing system is configured to convey to an animal, having a first identified rider, a rider-specific profile of rider-side sensor data for multiple ones of rider commands executed by a second identified rider and/or a rider-specific profile of animal-side sensor data for multiple ones of rider commands executed by the second identified rider.

In some additional, alternative, or selectively cumulative embodiments, the software processing system employs different responsive action protocols associated with respective animal maneuvers to cause the animal-side actuators to exert force toward the animal that correlates with the respective animal maneuvers.

In some additional, alternative, or selectively cumulative embodiments, the software processing system employs different respective responsive action protocols associated with respective animal maneuvers to cause the animal-side actuators to exert force toward the animal that correlates with the respective animal maneuvers, wherein the software processing system synchronizes one or more of the respective responsive action protocols to aspects of a musical composition.

In some additional, alternative, or selectively cumulative embodiments, the software processing system is configured for facilitating a music-maneuver routine including multiple respective responsive action protocols to cause the animal-side actuators to exert respective forces toward the animal that correlate with the respective animal maneuvers, wherein the music-maneuver routine synchronizes the respective responsive animal maneuvers to a sequence of aspects of a musical composition.

In some additional, alternative, or selectively cumulative embodiments, the software processing system is configured for facilitating a team-maneuver routine including multiple respective responsive action protocols to cause the animal-side actuators to exert respective forces toward the animal that correlate with the respective animal maneuvers, wherein the team-maneuver routine is synchronized with a second software processing system of a second adaptive mesh system on a second animal such that the multiple respective responsive action protocols of the team-maneuver routine are executed substantially simultaneously by the adaptive mesh system on the animal and the second adaptive mesh system on second animal.

In some additional, alternative, or selectively cumulative embodiments, a rider garment is employed, wherein the rider garment has garment devices that are configured to interact with the adaptive mesh system.

In some additional, alternative, or selectively cumulative embodiments, the garment devices are configured to magnetically interact with the adaptive mesh system.

In some additional, alternative, or selectively cumulative embodiments, a rider garment operatively communicates with the software processing system, wherein the garment devices detect rider characteristics, and wherein rider garment data concerning rider characteristics is conveyed to the software processing system.

In some additional, alternative, or selectively cumulative embodiments, a rider helmet operatively communicates with the software processing system; helmet sensors detect rider characteristics or environmental conditions; rider helmet data concerning rider characteristics or environmental conditions is conveyed to the software processing system; a helmet responsive action protocol is determined; and the responsive action protocol is implemented by directing power to rider-side actuators at specific ones of rider-side actuator locations at specific times or directing power to animal-side actuators at specific ones of animal-side actuator locations at specific times to modify the relative interaction between the rider and the animal.

In some additional, alternative, or selectively cumulative embodiments, the animal is an animal that has been domesticated for riding by a rider.

In some additional, alternative, or selectively cumulative embodiments, the animal is one of a caribou, a camel, a large cat, a cow, a large dog, a donkey, an elephant, an elk, a mule, an ox, or a zebra.

In some additional, alternative, or selectively cumulative embodiments, the animal is a horse.

In some additional, alternative, or selectively cumulative embodiments, the animal is a human.

In some additional, alternative, or selectively cumulative embodiments, the animal is a non-human animal.

In some additional, alternative, or selectively cumulative embodiments, the rider is a human.

In some additional, alternative, or selectively cumulative embodiments, the rider is one of a primate, a monkey, a chimpanzee, a cat, or a dog.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

DETAILED DESCRIPTION OF EMBODIMENTS

Figure 1:
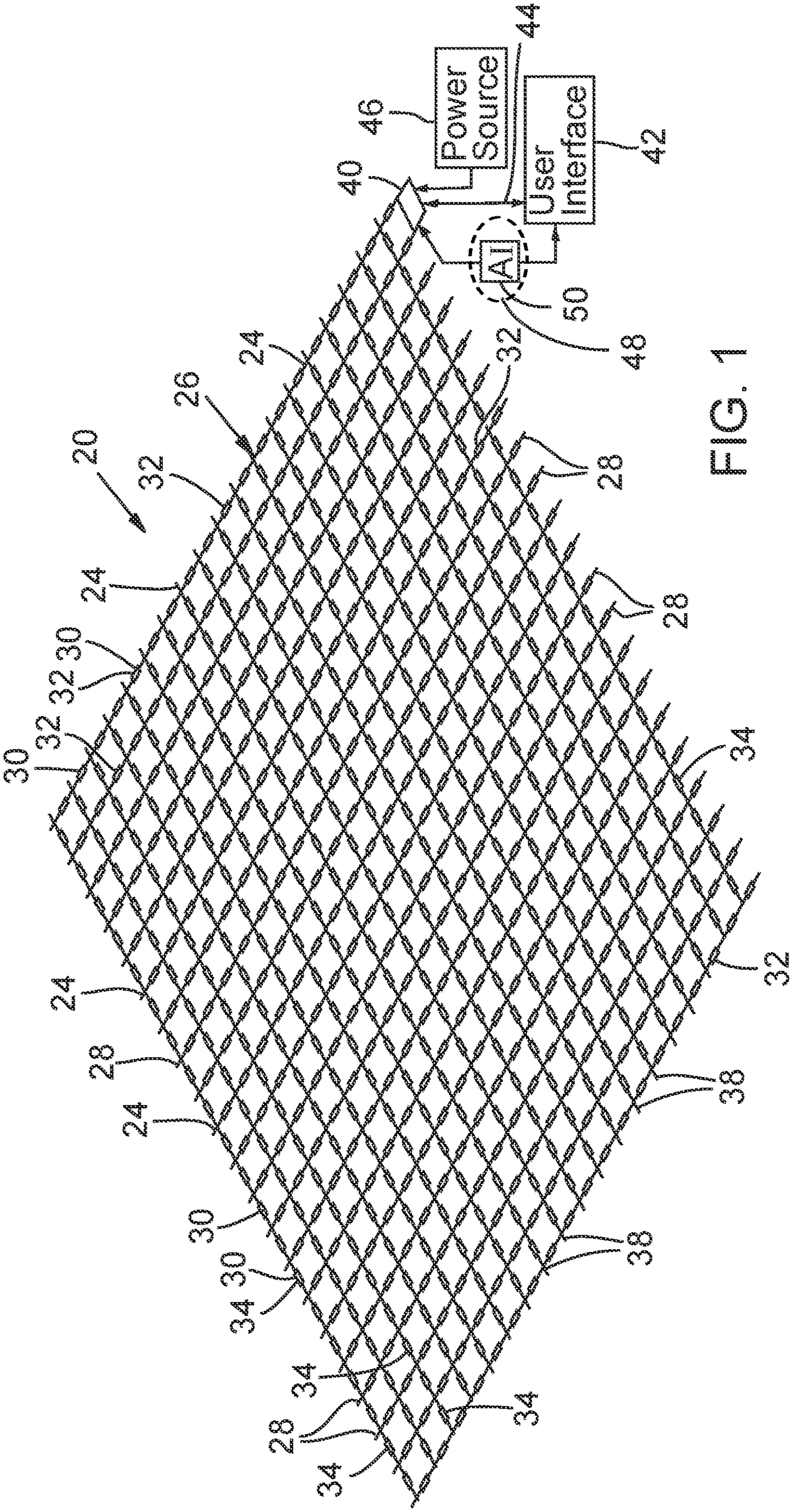
FIG. 1 illustrates a piezoelectric adaptive mesh system.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein.

Piezoelectric material has been used in shoes to charge electronic devices simply by converting the motion of walking; and textiles woven with piezoelectric wires can generate power when pressed or twisted. See https://www.instructables.com/id/Piezoelectric-Shoes-Charge-Your-Mobile-Device-by-W/and http://theconversation.com/dead-battery-charge-it-with-your-clothes-26097. Piezoelectric units can provide a variety of types of motion, including lateral motion or bending motion, for example. See https://www.youtube.com/watch?v=fHp95e-CwWQ.

Moreover, a piezoelectric material can also be used to measure changes in pressure, acceleration, temperature, strain, or force by converting them to an electrical charge. Because piezoelectric fibers can generate an electric charge when placed under mechanical stress, a piezoelectric mesh made up of an array of piezoelectric fibers can be used to sense the force. If the locations from where the electrical charges originate are known, then the sensed force can indicate the position of an object, such as a body, interacting with the piezoelectric mesh.

Conversely, an electrical charge can be sent to specific locations within a piezoelectric mesh to apply mechanical force at those locations. By determining the position and force applied by a body, a piezoelectric mesh can provide an adaptive response to the body. For example, an adaptive controller can apply a specified amount of force to specific piezoelectric mesh locations in response to weight of a body. The force can be applied to satisfy a number of criteria including, but not limited to, adjustment, adaptive movement, and massage. The force applied by piezoelectric actuators may constitute pulsing in place, promulgating waves in one direction, building waves back and forth across the same path to build resonance, and/or vibrating to stimulate a secondary action, such as vibration in a stiffer material (e.g., a core material 134 or saddle tree) or such as vibration to engage a secondary actuator that is mechanically resonated or switched on or off by the primary vibration.

There are several ways to utilize resonance in a piezoelectric structure as a sensor. See for example https://iopscience.iop.org/article/10.1149/1945-7111/ab6cf7/pdf, which offers several ways to sense with resonance, but does not suggest using resonance for actuation. However, piezoelectric structures can act reversibly, bending in causes electricity out and electricity in causes bending out. There is some advantages for using resonance in piezoelectric actuators in a mesh because they permit control over exactly how and what shape can be propagated in a resonance wave (not unlike how a water wave generator works), including optional dead zones or enhancement zones, to use to prod someone to flip over, rub an itch, press on or relieve pressure on a sore spot, massage a spot for better circulation or simply to reduce stress. Then the piezo sensing mode to measure body stats after the patient is more relaxed. Many papers and articles see piezo resonance as undesirable and want to suppress it. See https://www.sciencedirect.com/science/article/pii/50924424721007639, https://www.motioncontroltips.com/resonant-frequency-important-in-piezo-applications/, and https://en.wikipedia.org/wiki/Negative_feedback. They identify piezoelectric resonances in order to dampen them such as by using negative feedback.

However, in many embodiments, these resonances can be encouraged in a piezoelectric mesh such as by using positive feedback.

Figure 2:
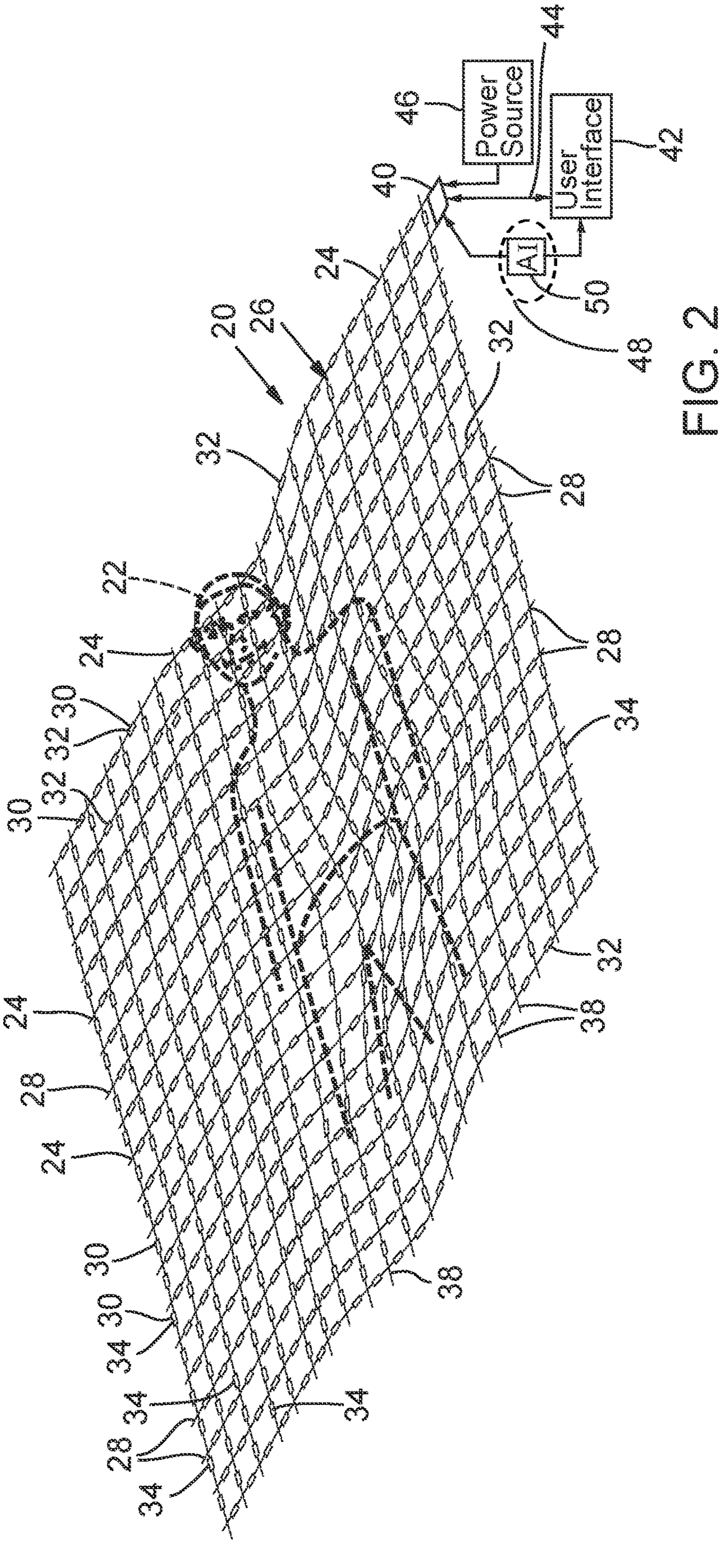
FIG. 2 illustrates a person supported by a piezoelectric adaptive mesh.

FIG. 1 illustrates an adaptive mesh system 20 (also referred to as a piezoelectric adaptive mesh system 20) and FIG. 2 illustrates a person or user 22 supported by an adaptive mesh 26 (also referred to as piezoelectric mesh 26 or piezoelectric adaptive 26). The user 22 is shown in broken lines because in some embodiments the piezoelectric mesh 26 can alternatively be used as a cover or blanket instead of as a supporting surface.

With reference to FIGS. 1 and 2, the piezoelectric adaptive mesh 26 may include multiple adaptive fibers 24 (also referred to as piezoelectric fibers 24) that may be configured as a piezoelectric mesh 26. One will appreciate that the spacing in the figures may not be to scale. Depending on the desired sensing resolution, parallel piezoelectric fibers 24 may be positioned to be substantially adjacent to each other or they may be spaced apart. The piezoelectric fibers 24 may be of any suitable diameter and the spacing may be any suitable distance based on desired function. The piezoelectric fibers 24 may range from near nano scale to about 0.3 inches or greater in diameter depending on the construction and the desired function. Thicker piezoelectric fibers 24 may range from about 0.1 inches to about 0.3 inches, medium-sized piezoelectric fibers 24 may range from about 0.03 inches to about 0.1 inches, and smaller piezoelectric fibers 24 may range from about 0.0075 inches to about 0.03 inches. In some embodiments, structural grid members 60, as later described, may be positioned between some or all of the piezoelectric fibers 24.

A piezoelectric fiber 24 may include a long continuous adaptive structure 30 (also referred to as a piezoelectric structure 30) such that the entire fiber 24 can sense and/or actuate at any point or node along the fiber 24. A piezoelectric fiber 24 may alternatively or additionally include discrete spaced apart sensors 32 (also referred to as piezoelectric sensors 32) and/or actuators 34 (also referred to as piezoelectric actuators 34) positioned along a length of wire. A piezoelectric fiber 24 may alternatively or additionally include discrete spaced apart piezoelectric sensors 32 and/or actuators 34 attached to wireless transmitters and receivers.

The piezoelectric fibers 24 may be made from any suitable piezoelectric material. Suitable piezoelectric fibers 24 can be made from grown or wet-extruded from piezoelectric ceramic materials including, but not limited to, $Pb(Zr_{0.52}Ti_{0.48})O_3$ (PZT) nanowires, ZnO nanorods or nanowires, and $BaTiO_3$ (BTO) nanostructures. Some these piezoelectric fibers 24 include discrete, spaced-apart piezoelectric structures 30, such as piezoelectric actuators 32 and piezoelectric sensors 34.

Suitable piezoelectric fibers 24 may be made from melt-spinning or extruding piezoelectric polymers including, but not limited to, poly(vinylidene fluoride) (PVDF), poly (vinylidene fluoride-co-trifluoroethylene) (PVDF-TrFE), and polylactic acid (PLA) fiber- and carbon-fiber-based material (in particular a piezoelectric poly-L-lactic acid (PLLA) and carbon fiber electrode.) These fibers 24 can be easy to produce and may exhibit good piezoelectric performance coupled with good flexibility and chemical resistance. Some of these piezoelectric fibers 24 have a conductive filament core and a piezoelectric polymer layer sheath. Some include an additional conductive layer that may be coated on the fiber as an external electrode. These piezoelectric fibers 24 may provide continuous (or near continuous) piezoelectric capability along the length of the fibers 24.

Suitable piezoelectric polymer fibers 24 may also be made by a thermal drawing technique. For example, a PVDF-TrFE layer can be sandwiched between two carbon-loaded polycarbonate layers and assembled with Tin microfilaments as the electrodes and covered with polycarbonate shell for the protective cladding. Alternatively, a PVDF may be impregnated with piezoelectric ceramics such as BTO and PZT. For more details about these fabrication techniques, see https://www.designnews.corn/materials-assembly/fiexibIe-piezo-electric-fabric-turns-kinetic-energy-electricity/173999414358512 and https://www.nature.comlarticles/s41598-017-01738-9 and the references cited therein.

Some of the piezoelectric fiber materials may be suitable for use in 3D printers, such as materials used in fused deposition modeling (FDM), digital light processing (DLP), or stereolithography (SLA) printers. Conventional consumer FDM printers can provide a layer thickness as small as 0.2 or 0.3 mm. Some better desktop models even claim a vertical resolution as small as 0.02 mm. Readily available SLA printers such can provide layers as thin as 0.025 mm. More advanced SLA printers can offer a 25-micron XY resolution and 25-300 microns (user selectable) in the Z, using an 85-micron laser. The actual accuracy may depend on many factors such as the print performance of a particular material. While 3D printing is an example of another manufacturing method, any other suitable manufacturing method may be employed. Other manufacturing techniques may include injection molding or casting.

Some of larger sized piezoelectric fibers 24 may constitute a piezoelectric spiral-wrapped coaxial cable that utilize a standard core wrapped by a PVDF piezoelectric film tape that is enclosed within a copper braid and covered by a polyethylene outer jacket. The shielding makes these piezoelectric fibers 24 resistant to electromagnetic interference and, particularly, to radio frequency interference. These piezoelectric fibers 24 may perform well as a large-deflection sensing grid and can be effective to three feet or longer (so they can be controlled with two or fewer controllers 40). An example of a piezoelectric spiral-wrapped coaxial cable includes TE™, model #CAT-PSFS00001.

The piezoelectric mesh 26 may include piezoelectric fibers 24 that form a warp 28 and a weft 38 that may be transverse to each other. The piezoelectric fibers 24 may be continuous or discontinuous. Each fiber row may be continuous or include segments. Each fiber column may be continuous or include segments. All of the fiber rows may be formed from one continuous piezoelectric fiber 24, and/or all of the fiber columns may be formed from one continuous piezoelectric fiber 24. The piezoelectric mesh 26 may also be formed as an interconnected grid, either as one large grid or as separate grids that are subsequently connected.

Each piezoelectric fiber 24 may include multiple discrete, spaced-apart piezoelectric structures 30, or the piezoelectric fiber 24 itself may have continuous or partly continuous piezoelectric structures 30 and capabilities. The piezoelectric structures 30 may be operable to act as sensors 32 and/or actuators 34. All of the piezoelectric structures 30 on a piezoelectric fiber 24 may have the same construction or composition, or a piezoelectric fiber 24 may include two or more piezoelectric structures 30 having different constructions or compositions.

All of the piezoelectric structures 30 on a piezoelectric fiber 24 may function as both sensors 32 and actuators 34, or some of the piezoelectric structures 30 on a piezoelectric fiber 24 may function as sensors 32 and some of the piezoelectric structures 30 on a piezoelectric fiber 24 may function as actuators 34. The piezoelectric structures 30 may be equally distributed between the weft 28 and the warp 38, or the piezoelectric structures 30 may be disproportionally distributed between the weft 28 and the warp 38, e.g., the weft 28 may have more piezoelectric structures 30 than the warp 38 or vice versa. Similarly, the sensors 32 and actuators 34 may be equally distributed between the weft 28 and warp 38, or the sensors 32 and actuators 34 may be disproportionally distributed between the weft 28 and the warp 38, e.g., the weft 28 may have more sensors 32 than the warp 38 or vice versa or the weft 28 may have more actuators 34 than the warp 38 or vice versa. In one example of the piezoelectric mesh 26, a piezoelectric fiber 24 may include alternating sensors 32 and actuators 34 as dedicated piezoelectric structures 30. Also, the piezoelectric mesh 26 may include more sensors 32 than actuators 34 or may include more actuators 34 than sensors 32.

Some piezoelectric fibers 24 may include some dedicated piezoelectric structures 30 as sensors 32 or actuators 34 and include some bifunctional piezoelectric structures 30 that are operable as both a sensor 32 and an actuator 34. Alternatively, a piezoelectric fiber 24 may include dedicated piezoelectric structures 30 that act as sensors 32 or include dedicated piezoelectric structures 30 that act as actuators 34. In one example of the piezoelectric adaptive mesh 26, a piezoelectric fiber 24 having ceramic-based piezoelectric structures 30 may include only actuators 34. In another example of the piezoelectric adaptive mesh 26, the warp 28 may include dedicated piezoelectric structures 30 that act as sensors 32 and the weft 38 may include dedicated piezoelectric structures 30 that act as actuators 34.

One will also appreciate that two or more piezoelectric fibers 24 can be twined together (or laid side by side) to form a single line of the weft 28 or the warp 38. These partnered piezoelectric fibers 24 can be of the same or different compositions and functions of piezoelectric structures 30. For example, one of the partnered piezoelectric fibers 24 may include sensors 32 while another includes actuators 34. Alternatively, or additionally, the partnered piezoelectric fibers 24 may be based on different polymers.

The piezoelectric adaptive mesh system 20 can include a single layer piezoelectric mesh 26 or include multiple layers of a piezoelectric mesh 26. These piezoelectric mesh layers may include any of the aforementioned combinations of piezoelectric structures 30, and these piezoelectric mesh layers may be substantially identical or intentionally different. For example, a first layer piezoelectric mesh 26 may be operable to act as sensor layer and second layer of piezoelectric mesh 26 may act as an actuator layer.

Applications that utilize larger and coarser piezoelectric fibers 24 may be used to form a piezoelectric adaptive mesh 26 having a single layer. Applications that benefit from a high-precision (or high-resolution) piezoelectric adaptive mesh 26 having finer and smaller piezoelectric fibers 24 may benefit from a second layer. A piezoelectric adaptive mesh 26 having ultrasonic applications may perform well on a farther side of gel padding 64. In some embodiments, the sensing layers of a piezoelectric adaptive mesh 26 may perform better right next to the user 22. Buzzer-type piezoelectric structures 30 may perform better with a hole 66 in their housing 68 to allow for greater resonance magnitude. The hole 66 may be pointed away from contact with the user in order to actuate and sense better.

Figure 3:
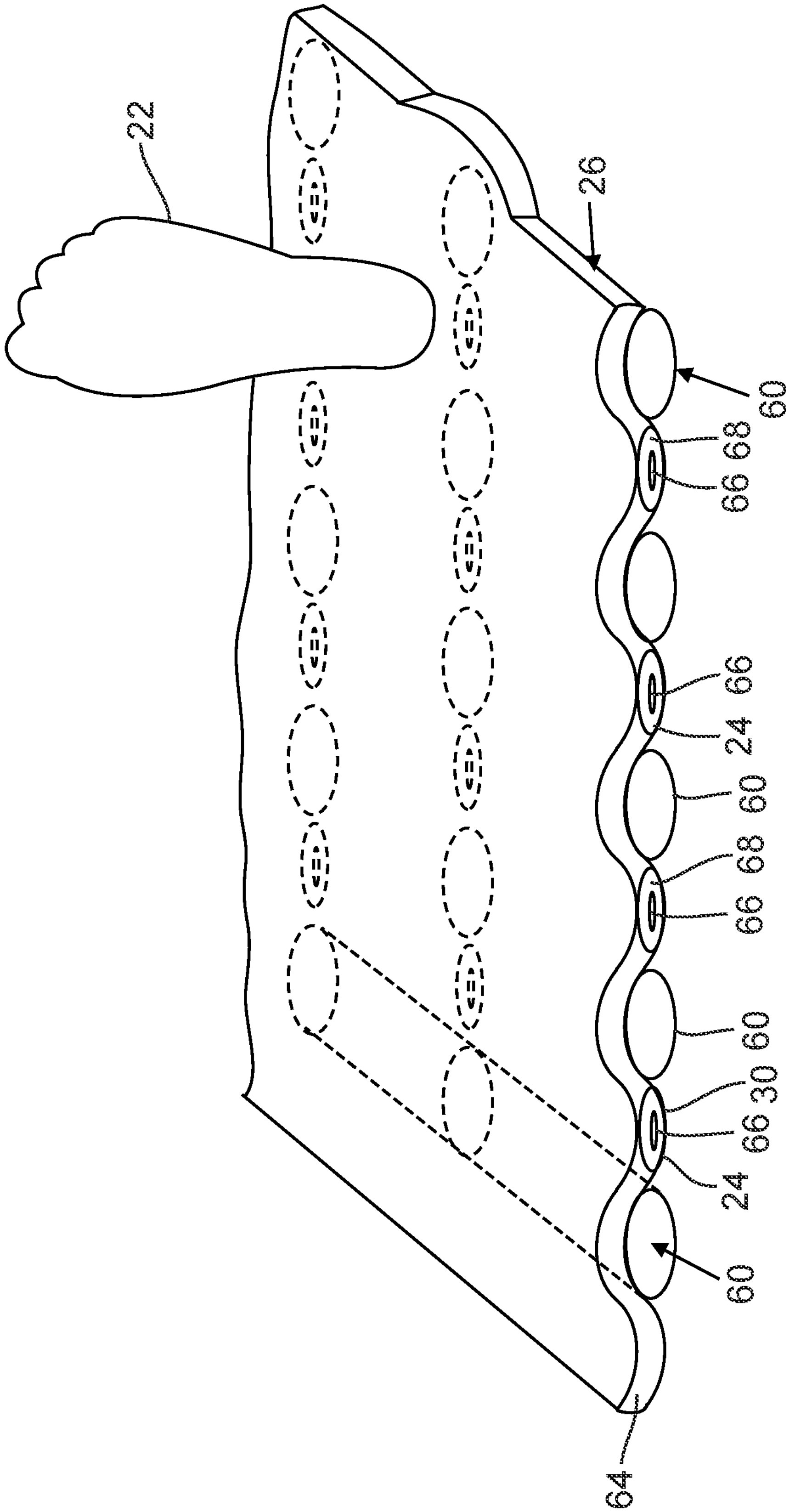
FIG. 3 illustrates an end view of piezoelectric adaptive mesh incorporating structural grid members.

Depending on the size (such as diameter), spacing, and material of the piezoelectric fibers 24 and the piezoelectric structures 30, some of these fibers 24 and structures 30 may not adequately support average human weight all by themselves, or they may be so compressed that they may not be able to reliably send impulses. In some embodiment, the piezoelectric adaptive mesh 26 incorporates spaced apart structural grid members 60. FIG. 3 illustrates an end view of an embodiment of a piezoelectric adaptive mesh 26 incorporating structural grid members 60.

In many embodiments, the structural grid and the structural grid members 60 can vary in construction and design, as long as the entirety of the grid can support the weight of a human standing on any one section with one foot, and the actuators 34 can be attached to it, interlocked through holes in it, and/or run in tunnels through the middle of its cabling/tubing. In one example, structural grid members 60 may contain carbon fibers.

In another example, the structural grid may contain a woven polyester mesh. A medium-sized woven polyester body mesh may support 6001*b* s. See https://www.amazon.com/Patient-Sling-Weight-Capacity-Medium/dp/B0757DZRJB. In another example, the structural grid may contain a 75% polyester, 17% nylon, and 8% spandex fishnet. This embodiment would have holes large enough to fit suction cups or pads through as later described. See https://www.fabricwholesaledirect.com/products/cabaret-stretch-mesh-fabric?variant=15499387462 for an example. In another example, the structural grid may contain a waterproof acrylic canvas. See https://www.fabricwholesaledirect.com/products/ottertex-solution-dyed-acrylic-water-proof-fabric for an example.

In some embodiments, the structural grid members 60 may contain polyurethane elastic fiber seat gel pads, which would be well-suited for ultrasonic applications as later described. See https://beststoreforever.com/products/motorcycle-seat-cushion-gel-pad-polyurethane-elastic-fiber-seat-gel-pads-25×25×1 cm for an example. In other embodiments, the structural grid members 60 may contain hollow rubber coated steel loop support coils. See https://www.etsy.com/listing/682691165/danish-modern-chair-repair-danish-rubber for an example.

In some embodiments, optical fibers may additionally be run inside of the gel padding 64, attached to a fabric/net structural grid, or inside of hollow tubing functioning as a structural grid member 60. A light source of a known wavelength and temperature may be propagated through one end of the fiber, and the light emitted at the other end of the fiber may be read by a sensor to determine the extent of change in that wavelength or temperature. These changes from a baseline may potentially be caused by bending of the optic fiber by the human (or other animal) user 22, and/or may be caused by heat added to, or drawn from, that optic fiber by that user 22. This data may be sensor fused with other data to provide an even more accurate map of the position and state of the user. An infrared light source may combine the tasks of bending and heat transfer. In order to recalibrate a system that has aged and/or stretched inelastically, a sequence of varying wavelengths may be sent down each optic fiber, and results compared to those of an earlier date.

A software processing system 48, as later described, may utilize the fiber optic data in conjunction with the piezoelectric data to perform a variety of applications. In some examples, the fiber optic bending light feedback, piezoelectric voltage feedback, and/or strain gauges embedded into a structural grid or furniture frame may be compared with other nodes to anticipate the compensation necessary to keep a user 22 upright and/or not fall/tip over from a standing, sitting, or leaning position. These feedback embodiments may apply to instrumented furniture, an instrumented clothing item, or a combination of the two that are cooperating.

Applications that utilize larger and coarser piezoelectric fibers 24 may be used to form a piezoelectric adaptive mesh 26 having a single layer. Applications that benefit from a high-precision (or high-resolution) piezoelectric adaptive mesh 26 having finer and smaller piezoelectric fibers 24 may benefit from a second layer. A piezoelectric adaptive mesh 26 having ultrasonic applications may perform well on a farther side of gel padding 64. In some embodiments, the sensing layers of a piezoelectric adaptive mesh 26 may perform better right next to the user 22. Buzzer-type piezoelectric structures 30 may perform better with a hole 66 in their housing 68 to allow for greater resonance magnitude. The hole 66 may be pointed away from contact with the user in order to actuate and sense better.

The actuators 34, which convert electrical energy to mechanical energy, are available in a variety of shapes, sizes, force-displacement capabilities. Some actuators 34 may provide tremendous force but tiny motion, and some may provide substantial motion but small force. For example, these configurations may provide simple bending, cantilever bending, transverse contraction, longitudinal extension, and shear motion. A tutorial on piezoelectric actuators 34 may be found at https://piezo.com/pages/piezo-electric-actuators.

Accordingly, a piezoelectric fiber 24 may include more than one type of piezoelectric actuator 34. For example, a piezoelectric fiber 24 may include a first type of actuator 34 that is configured to provide substantial pressure and may include a second type of actuator 34 that is configured to provide a vibration. Or, these different types of piezoelectric actuator 34 can be employed on separate or intertwined piezoelectric fibers 24. For example, a piezoelectric spiral-wrapped coaxial cable may be used as a sensor 32 or a pressure actuator 34, while a second type of actuator 34 may be configured to provide a vibration.

The sizes of the actuators 34 may depend on their intended function(s) and the size of the piezoelectric fibers 24 that support them. The actuators 34 may range from near nano scale to about 2 inches, or as long as the piezoelectric fiber 24 in embodiments where the fiber 24 is a continuous actuator 34 along the length of the fiber 24. If not continuous or constituting the actuator as well, the sensors 32 may be smaller than the actuators 34. The actuators 34 of the same type may be spaced apart by about the same distance as the transverse piezoelectric fibers 24, or they may be closer together or farther apart. Spacing (if not continuous) may range from about 0.4 inches to about 5 inches, depending on the intended application(s).

In one embodiment, large, spaced-apart piezoelectric fibers 24 may deflect as much as an inch for each node. So, for a complex shape, there is a lot of flexibility. Moreover, multiple layers of piezoelectric fibers 24 can achieve very high-resolution complex curves with some layers holding a shape and others sensing stimuli or delivering a response. Edges may be constrained to a frame and structural grid, which may be spaced as far apart as possible to not interfere with the complex shape. For an adaptive piezo electric mesh 26 of 6 feet wide for a bed and the structural members are every 2 feet, a curve could extend down or up as much as a foot in the middle. Smaller piezoelectric fibers 24 spaced more closely together may offer greater deflection capabilities and greater resolution (precision of deflection points).

The adaptive piezo electric mesh 26 may include or be covered with any suitable padding 64 that will increase the comfort of the user 22 while still permitting the piezoelectric structures 30 to achieve their desired functions. A relatively thin layer of memory or other foam type may be employed for the padding 64. In some embodiments, the padding 64 may include a gel such as an ultrasound friendly gel (which may be useful in association with vibrational actuators 34 employed for certain applications as later described.

The piezoelectric adaptive mesh 26 may constitute a separate device and act as independent layer or the piezoelectric adaptive mesh 26 may be built into or onto a piece of furniture as later discussed. Moreover, the piezoelectric adaptive mesh 26 may act independently of other systems, such as being superimposed on an adjustable bed, hospital bed, or a back-stretching mat. Or, the piezoelectric adaptive mesh 26 may be configured to integrate its functions with the functions of the underlying adjustable furniture.

The piezoelectric adaptive mesh system 20 may include or be attached to a controller 40 that may be configured to receive power from a power source 46 and may be configured to direct power from the power source 46 to the piezoelectric fibers 24 in general and, more particularly, to the piezoelectric structures 30 along the fibers 24. The controller 40 may also be configured to receive sensor input (such as electrical pulses) from the piezoelectric structures 30 and cooperate with a software processing system 48 (with or without assistance from an artificial intelligence (AI) system 50) to determine the location of the piezoelectric structures 30 sending the pulses. In embodiments that include piezoelectric structures 30 that can act either as sensors 32 or actuators 34, the AI system 50 can modify the location and distribution between sensors 32 and actuators 34 at any time. One will appreciate that wherever the software processing system 48 is discussed, the AI system 50 may be employed. Similarly, wherever the AI system 50 is discussed, the software processing system 48 may be employed to perform the task without use of the AI system 50.

The controller 40 may operatively communicate with a user interface 42 through a hardwired or wireless connection 44. Examples of a user interface 42 include a hardware user interface that include hardware controls or software interface, such as a graphical user interface on a smart phone or other electronic device (with or without a virtual assistant), or a virtual assistant interface, such as Alexa, Siri, or Google Assistant.

The piezoelectric adaptive mesh 26, the controller 40, and the user interface 42 may operatively communicate with a software processing system 48 that may include a trainable artificial intelligence (AI) system 50. The trainable AI system may comprise one or more of a neural network, a probabilistic technique such as Bayes or Markov algorithm, a kernel method (like SVM, decision trees/random forest, Gaussians, PCA . . . ), reinforcement learning that can have nothing to do with artificial neural networks, artificial reasoning a.k.a. "good old fashioned AI," many path-planning and intelligent control-systems methods that correspond to "classical AI" (not the same as GOFAI), Alife (swarms, cellular automata . . . ), agents and chaos systems, and/or any algorithm or group of algorithms that optimize a value function (reinforcement learning and linear dynamic programming).

The trainable AI system 50 is operable to interpret data from the sensors 32 and/or the controller 40 and to use the actuators 34 and/or controller 40 to make constant (as needed) adjustments in real time to provide increased comfort for a user 22 with or without user input. The user 22 can choose settings through the controller 40 and the trainable AI system 50 can readily respond to user movement, and in some cases provide predictive instructions to the piezoelectric adaptive mesh 26.

If the piezoelectric structures 30 are continuous (such as a long as the piezoelectric fiber 24), the piezoelectric adaptive mesh 26 may be constituted as an array of nodes. Regardless of whether the piezoelectric structures 30 are continuous or discrete, when a node acting as a sensor 32 is affected, such as by the weight of a user 22, then the software processing system 48 can determine the location of the affected node by how long it takes the signal to reach the controller 40. If the piezoelectric structures 30 are individually wired, then the location of the affected sensor 32 is known by the wire run. The sensors 32 may also be wireless such as through the use of Zigbee™-type system that may be continuously or periodically broadcast.

In an example of a thicker piezoelectric fiber 24, such as the previously mentioned piezoelectric tape-wrapped wire, with a spacing about an inch apart, the threshold might be an inch of deflection to register voltage. The primary spike may last about a millisecond. If there is a bounce due to springs, then there may be smaller spikes following. When the node flattens back out another spike might be created. The software processing system 48 may be configured to trigger on any spike event and be aware of spike direction to interpret, all while comparing to the spikes on all other nodes. There may be an ideal deformation mapping for a given user 22. So, when deformation varies, someone may be in pain, contracted, needing adjustment, involved in an activity, or holding a book to read. The patterns of the timing and sequence of node spikes can be assessed by the processing software to determine the situation and decide whether a preprogramed adjustment or AI extrapolated adjustment is warranted. The appropriate instructions can be conveyed from the software processing system 48 to the controller which activates the specified actuators in the desired manner. Thicker piezoelectric fibers might be useful for some low-cost applications that cover large areas but some resolution may be sacrificed. One may appreciate that a denser piezoelectric adaptive mesh 26 employing medium of thinner piezoelectric fibers 24 with structural grid members 60 may offer greater resolution.

The piezoelectric adaptive mesh system 20 may be implemented for a seat, a bed, a sofa, or any other furniture upon which a user 22 can sit, lie, or recline. The piezoelectric adaptive mesh 26 may form a surface layer of these items or form a near surface layer, such as beneath a sheet, a foam layer, or other cushioning. Examples of a seat include office chairs, wheelchairs, car seats, or child seats. Examples of a bed include a residential bed, an RV bed, a hotel bed, a hospital bed, or a camping mattress. The piezoelectric adaptive mesh 26 may also be implemented as a furniture cover, such as a seat cover or a mattress cover.

The piezoelectric adaptive mesh system 20 may be utilized to adjust firmness of the piezoelectric mesh 26 that is supporting the user 22. The user 22 may utilize the user interface 42 to initially choose from a variety of advanced level user selection criteria, such as firmness and resilience, as well as several pre-programmed firmness settings based on conventional firmness standards or sleep numbers.

Users 22 may want to determine whether or not they want to have resonance or not, or position change or not, for perceived pain pressure points. The users 22 may interact with a map of what an algorithm thinks are pressure points and choose what to resonance, or change position for each. The user 22 may also specify their desired firmness anywhere on their contact map. They may "up arrow" and "down arrow" or specify a sleep number.

Figure 4:
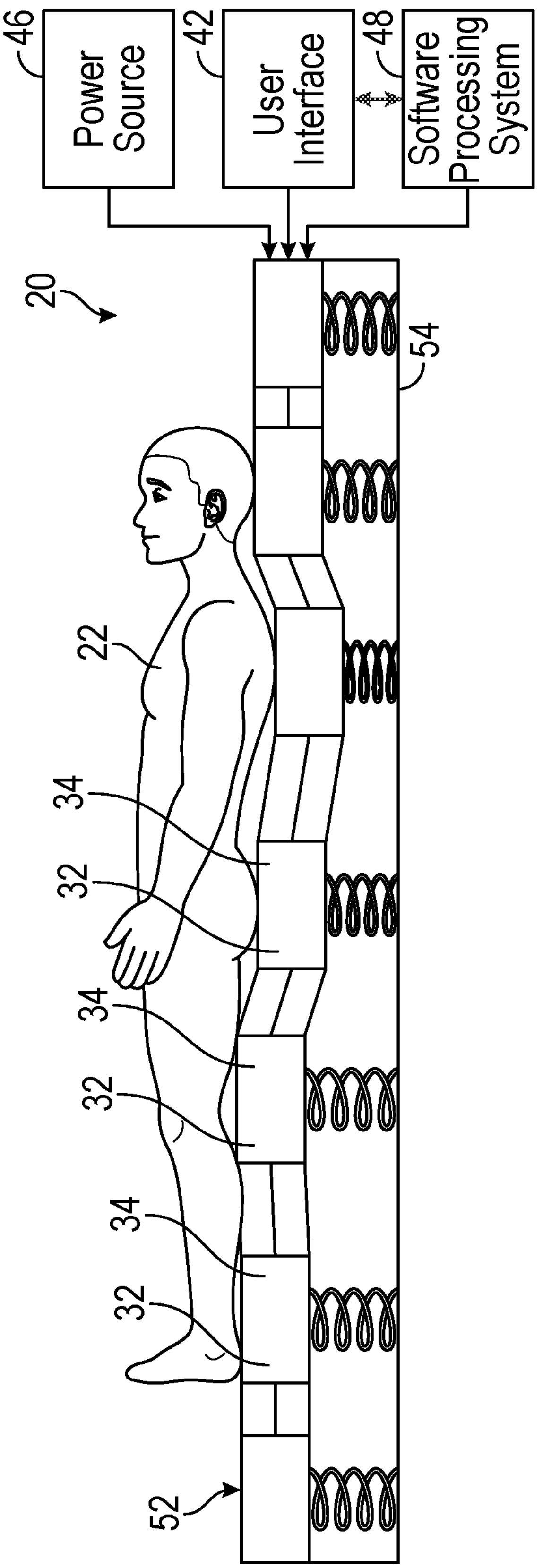
FIG. 4 illustrates an end view of an embodiment of piezoelectric adaptive mesh employing nodes or clusters of piezoelectric clusters.
Figure 5:
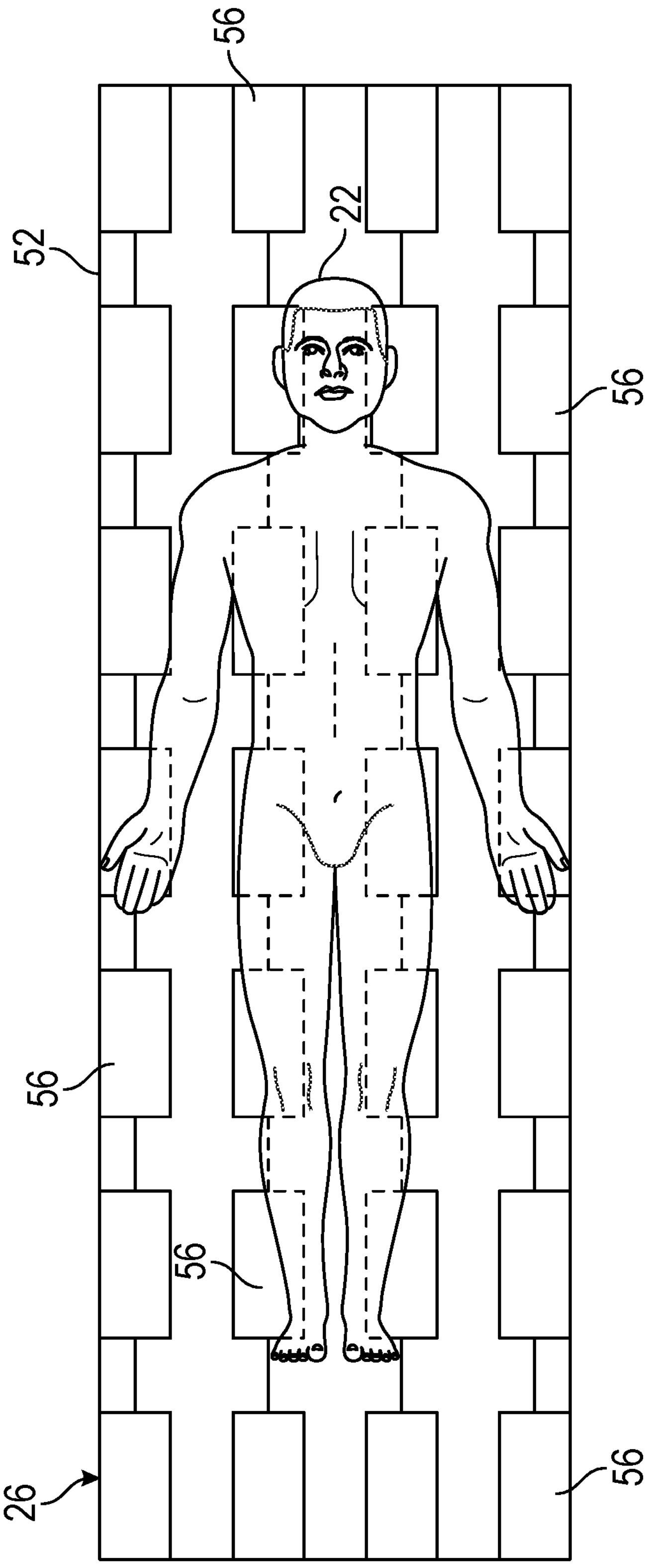
FIG. 5 illustrates a top view of an embodiment of the piezoelectric adaptive mesh of FIG. 4.

The sensors 32 may detect where the user 22 is positioned on the piezoelectric mesh 26. FIG. 4 illustrates an end view of an embodiment of piezoelectric adaptive mesh system 20 configured for use as a mattress pad 52 (or configured for integration with a mattress 54 or mattress top), and FIG. 5 illustrates a top view of the embodiment of FIG. 4, showing nodes 56 of individual piezoelectric structures 30 or clusters of piezoelectric structures 30. Each node whether individual piezoelectric structure 30 and/or cluster of piezoelectric structures 30) may be identified as a specific location such as an xy location by the software processing system 48. Moreover, one or more weights of different values can be placed sequentially at one or more positions with respect to the piezoelectric sensor(s) 32 each node to allow the software processing system 48 to confirm the location of each node and establish baseline data responses for different weights (forces applied) at the node locations.

Then test dummies of different sizes and weights can be placed sequentially at one or more orientation and their offsets on the piezoelectric mesh 26 so that the software processing system 48 has baseline data of how different humans and their body parts affect the piezoelectric structures 30 and the nodes 56. The dummies may also be placed in different anatomical positions at one or more orientations so that the software processing system 48 can determine the difference between right-side sleeping, left-side sleeping, back sleeping, stomach sleeping, and kneeling, etc. Similarly, test subjects may also perform or simulate a variety of movements including sexual activities and the transitions between the anatomical sleeping positions. The baseline data can be stored in one or more databases or look up tables. One will appreciate that this baseline data does not need to be established more than once as the software processing system 48 can readily customize the baseline data to the weight, size, and movements of particular users 22. One will also appreciate that much of the baseline data can be obtained directly from the users 22 without being predetermined with dummies or test subjects. One will further appreciate that that baseline data can also be established for non-human animals, such as dogs and cats, that typically sleep with humans. This animal baseline data may be useful for the software processing system 48 to discern and account for.

Accordingly, the software processing system 48 with or without an AI system 50 may determine where various parts of the user's body are positioned and may use this information to determine whether the user 22 is a right-side sleeper, a left-side sleeper, a back sleeper, or a stomach sleeper. Having this information, the software processing system 48 with the cooperation of the controller may activate the actuators 34 to adjust the firmness as initially selected by the user 22. The combination of sensors 22, actuators 34, controller 40, and the software processing system 48 may maintain a constant firmness as set by the user 22 regardless of how the user 22 moves or positions his or her (or their) body. In particular, the adaptive piezoelectric mesh system 20 may be adapted to apply a specified amount of force to specific mesh locations in proportional response to weight of the various body parts. The baseline data may be employed to assist the software processing system 48 determine a responsive action protocol for the controller 40 to cause specific piezoelectric actuators 34 (or specific groups piezoelectric actuators 34) to apply desired force at desired locations at desired times.

The sensors 32 with the cooperation of the software processing system 48 may determine the breathing pattern of the user 22 based on diaphragmatic movement of the chest. For example, user data can be compared to test dummy data. Moreover, the software processing system 48 can identify and differentiate different breathing patterns. The user 22 may select a sleep learning mode for firmness adjustment. The software processing system 48 may access a database of sleep-related breathing data to determine the state of breathing of the user 22. The sensors 32 may constantly or continuously monitor the breathing state of the user 22, and the actuators 34 may constantly or continuously make adjustments to the firmness or other characteristics of the piezoelectric mesh 26 at specific locations as determined by the software processing system 48 to alter the breathing state of the user 22 to bring the breathing state increasingly closer to a user breathing state that resembles a sleeping breathing state.

Possibly using the AI system 50, the software processing system 48 of the piezoelectric adaptive mesh 20 may readily learn to vary the responses of the actuators 34 at specific body locations to induce sleep (or induce more restful sleep). In particular, the software processing system 48 may learn a general optimum firmness and other characteristic settings for the beginning of the falling asleep process and adjust the actuators 34 accordingly. Moreover, the software processing system 48 may learn specific firmness and other characteristic settings for specific areas of the body to facilitate the falling asleep process and for maintaining restful sleep by adjusting the actuators 34 accordingly. Although the user 22 may choose initial settings for the controller 40 through the user interface 42, the trainable AI system 50 may readily respond to user movement, and even provide predictive instructions to the actuators 34 of the piezoelectric mesh 26.

Figure 6:
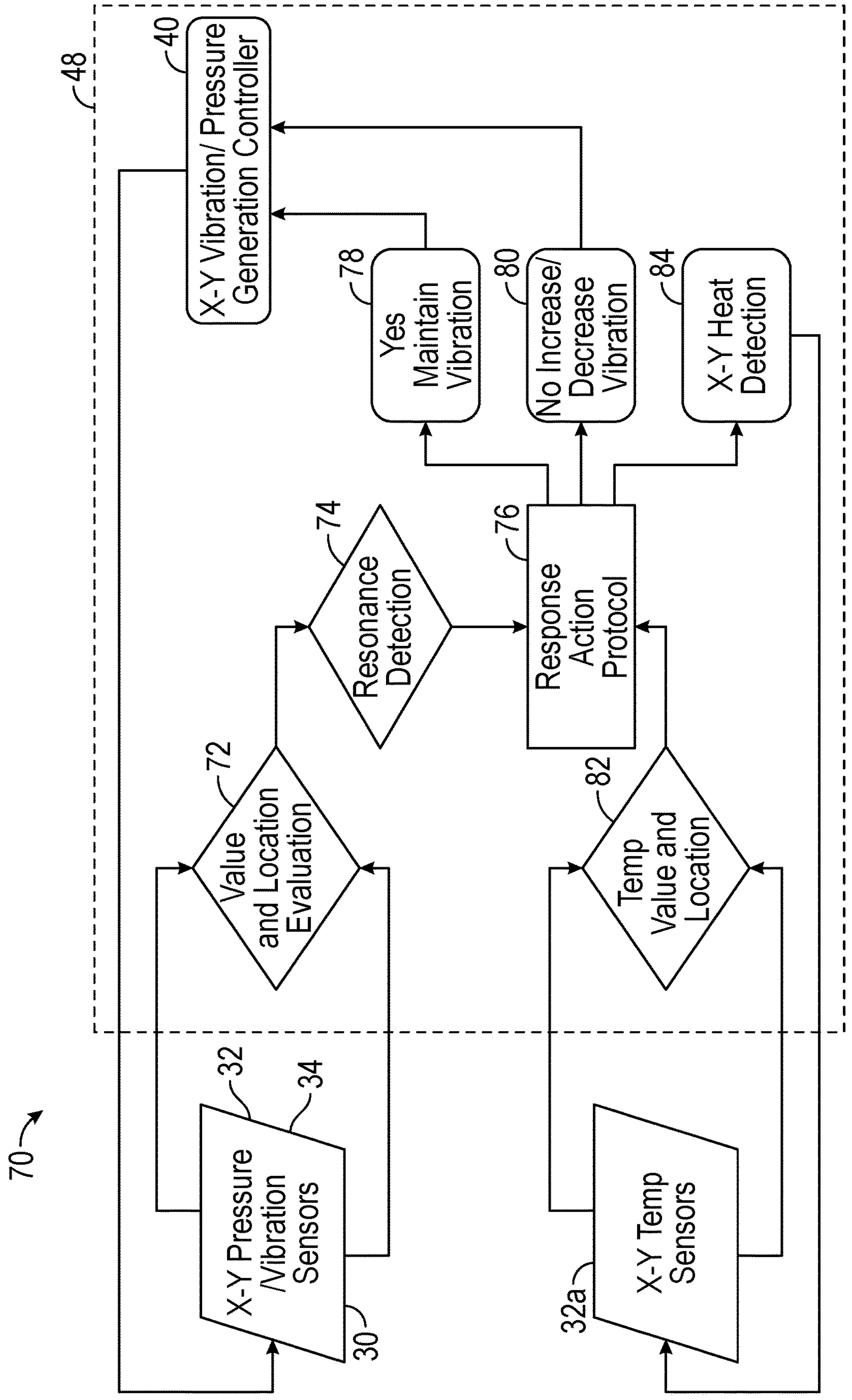
FIG. 6 illustrates a flow diagram showing an embodiment of a software feedback loop.

FIG. 6 illustrates a flow diagram showing an embodiment of a software feedback loop 70 that can determine whether a responsive action protocol has achieved resonance and/or is having a desired effect. With reference to FIGS. 1-6, the piezoelectric sensors 32 in the piezoelectric adaptive mesh 26 of the mattress cover 52 may detect pressure and vibration from contact of the body of a user 22 at each node 56. Logic 72 may evaluate the value and location of the pressure and vibration and convey resulting information to logic 74, which may determine whether resonance is achieved and relay the outcome information to logic 76. For example, the logic 74 may employ a fast Fourier transform (FFT) to find the resonant frequency.

Logic 76 determines a responsive action protocol. The responsive action protocol may be as simple as yes logic 78 and no logic 80. The yes logic may provide instructions to maintain the established vibration and appropriate instructions may then be provided to the pressure and vibration controller 40 to instruct the piezoelectric actuators 34 in the appropriate nodes 56. The no logic 80 may provide instructions to increase or decrease vibration frequency or amplitude and appropriate instructions may then be provided to the pressure and vibration controller 40 to instruct the piezoelectric actuators 34 in the appropriate nodes 56.

The logic 76, 78, or 80 or controller 40 may utilize a look up table to provide oscillation values. When initiating a resonance protocol, the controller 40 may start with a lower than calculated oscillation frequency value that can be increased based on the feedback information until resonance feedback is detected based on signal amplitude.

The human body can react automatically in known ways to certain vibrational stimulations or applied pressure at various locations, or the human body can be trained react in desirable ways to certain vibrational stimulations or applied pressure at various locations. One will appreciate that the software processing system 48, using variations of logic 72, 74, and 76, may also establish changes of the body position as previously described. When considering changes of body position, the logic 76 can subtract system noise and other discernable changes such as those caused by breathing patterns or pets. Alternatively, if breathing changes are the objective, the logic 76 can subtract body positional movements.

Logic 76 can determine whether the body position change (or breathing change) is desirable or undesirable with respect to sleep promotion or other goals, such as injury accommodation, and the logic 78 can instruct the controller whether to continue or stop the applied vibration or pressure as appropriate to the circumstances. Similarly, logic 76 can determine whether adjustments to the applied vibration or pressure may improve the desired effect, and the logic 80 can instruct the controller with changes to the applied vibration or pressure as appropriate to the circumstances.

The software feedback loop 70 may also be employed to identify and compensate for temperature changes. Temperature monitoring may be used to ensure that there is no excessive increase in body temperature at any resonant node 56. Temperature sensing can be accomplished as previously described with piezoelectric sensors 32 or optical fibers. One will appreciate that the same piezoelectric sensors 32 or auxiliary piezoelectric sensors 32*a* may be employed to sense temperature. The software processing system 48 can filter out all movement and vibration data and noise data so that the remaining amounts of sensed voltage changes may be attributable to temperature induced changes to the piezoelectric structures 30.

One will also appreciate that alternatively or additionally each sensor's location can be uniquely identified using a 1-wire bus approach, for example, so x and y coordinates may not be needed to establish location. (See https://www.analog.com/en/product-category/1wire-devices.html#:—:text=The%201%2DWire0%20bus, this%20single%201%2DWire%201ine) In such embodiments, one axis may be employed for sensing and a second axis may be employed for actuation. (See https://www.engineersgarage.com/what-is-the-1-wire-protocol/#:—:text=The%201%2DWire%20protocol%20is, distance%20serial%2Ddata%20communication%20protocol)

Although many of these embodiments are described herein by way of examples to a bed surface and sleeping, similar techniques can be used to apply to seat surfaces and comfort. Moreover, the use of an adaptive piezoelectric mesh system 20 in conjunction with a vehicle seat (generally horizontally and/or vertically oriented surfaces) may be employed to alleviate sensed discomfort in driver or passenger. The adaptive mesh system 20 may be employed to alleviate pinched nerves to prevent legs falling asleep. Moreover, the piezoelectric mesh 26 may be employed to detect and adjust to less optimal or poor seating posture, as later described; or, the piezoelectric actuators 34 can induce changes in seating position or remind the user 22 to change their sitting position. The piezoelectric mesh 26 may also be employed to detect whether the driver is falling asleep. Sleep data for seated positions may be acquired in a manner similar to those discussed with falling asleep on a piezoelectric mesh 26 serving as a mattress cover 52. In response, the adaptive mesh system 20 may be employed to apply pressure or vibrations to help keep a driver awake.

The piezoelectric adaptive mesh system 20 may accommodate multiple users 22 on a sofa or in a bed. Based on learned experience, the piezoelectric adaptive mesh system 20 may recognize different individuals regardless of their positions on the piezoelectric mesh 26 and adjust the appropriate actuators 34 to suit the needs of the specific individuals. Additionally, the software processing system 48 may direct the controller 40 to make adjustments based on sensor data regarding the combination of the individuals. For example, if two individuals are in close proximity, creating a gravitational well, the software processing system 48 may direct the actuators 34 to raise the low spot.

The piezoelectric adaptive mesh system 20 may also address problems associated with a downside arm or other downside appendage. These problems may include arm pain to the user 22 or numbness or discomfort to a sleeping partner who may be lying on top of the arm. For example, the software processing system 48 may instruct the actuators 34 surrounding the offending appendage to raise the piezoelectric mesh 26 around the appendage and/or instruct the actuators 34 beneath the offending appendage to lower the piezoelectric mesh 26 beneath the appendage, effectively creating a depression or trough for the appendage. Moreover, the constant feedback provided by the sensors 32 may be employed to move this depression as the appendage moves.

The piezoelectric adaptive mesh system 20 may be utilized to slowly rock a user 22 to sleep. The user 22 may utilize the user interface 42 to initially choose the side-to-side speed and/or force to be applied by the piezoelectric mesh 26. The user interface 42 may offer a variety of advanced level user selection criteria as well as several pre-programmed default rocking options. The sensors 32 can detect where the user 22 is positioned and start a wave-like motion over the appropriate area (in accordance with the sensor data) based on the user selection. Employing the breathing monitoring and analysis techniques previously described, the software processing system 48 can adjust the nature of the rocking motion via the actuators 34 to induce sleep and, in particular, the software processing system 48 can learn what rocking characteristics are most beneficial for relatively quickly inducing restful sleep.

In some embodiments, the piezoelectric adaptive mesh system 20 may be employed to simulate movement of a waterbed. Wave patterns caused from a variety of movements from a variety of body types on a variety of waterbeds can be measured. This data can be provided to the software processing system 48 which can reproduce these responses in the piezoelectric mesh 26 by sending the appropriate instructions to the controller 40 to activate the appropriate piezoelectric actuators 40 at the appropriate locations at the appropriate times. In a fashion similar to wave machines, the piezoelectric actuators 34 can be stimulated with a voltage to bend in a synchronized fashion. The resulting force/pressure can then build up as a resonance, either just with piezoelectric actuators 34, or the piezoelectric actuators 34 can in turn actuate more powerful force/pressure generating devices. (See https://wavepoolmag.com/the-big-list-of-companies-and-their-methods-of-making-waves/)

The software processing system 48 may be programed to recognize sexual activity based on detected movement patterns. Moreover, the software processing system 48 may also be employed to direct the piezoelectric actuators 34 to amplify or push against certain motions. The user interface 42 may also be employed to control or adjust the amplitude or timing of the desirable contribution from the piezoelectric mesh 26.

The piezoelectric adaptive mesh system 20 may also be utilized to move a user 22 to avoid bedsores. Patients need to be moved every two hours. (See https://www.nursinghomelawcenter.org/bedsore-prevention.html)

Specifics of the movement, such as a slow rocking of a user 22 a few degrees to one side and then to the other side, may be improved by sensor-derived knowledge of the weight of the user 22 and the amount of time any one body area has not been moved, for example. Moreover, the learning capabilities of the software processing system 48 can facilitate bedsore prevention for the specific individual. The software processing system 48 may be automated to provide one or more bedsore mode presets to rock continuously or at certain intervals, such as every two hours or every 15 minutes (or any amount of time in between), for predetermined intervals, such as 15 minutes or two minutes (or any amount of time in between), at different degree/wave settings. All of these variables may be user selected through the user interface 42. Alternatively or additionally, the software processing system 48 may continue to trigger rotation until a peak pressure point is reduced by at least 50 percent and/or another location now registers a larger peak. The software processing system 48 may be instructed to stop change might occur as early as 5 degrees rotation of the patient or may continue rotation until a complete position change of the patient has been detected by the sensors 32 in the adaptive mesh 26.

The piezoelectric adaptive mesh system 20 may be employed to provide safety enhancements for elderly users 22, young children, or users 22 who are drunk to help with balance. In particular, a user 22 may select a safety mode on the user interface 42. In response, the software processing system 48 can cause the actuators 34 to raise the edges of a bed or sofa and/or lower the center of a bed or sofa to lean the user toward the center of the piezoelectric mesh 26 as a default, so the user 22 doesn't fall out of bed or off the sofa. Conversely, a user 22 may select an ascend mode on the user interface 42. In response, the software processing system 48 can cause the actuators 34 to lower the edges of a bed or sofa and/or raise the center of a bed or sofa to assist the user 22 to become upright and get out of the bed or sofa. Similarly, the software processing system 48 can cause the actuators 34 to lower the edges of a wheelchair seat and/or raise the center of the wheelchair seat to assist the user 22 to become upright get out of the wheelchair. In some of these embodiments, pneumatic or hydraulic actuators 34 could be employed (instead of or in addition to piezoelectric actuators 34) to provide desirable amplitude capacity (desirable lifting height). (See https://www.sitnstand.com/products/smart-portable-lift-assist-device-mobility-aid-for-the-elderly/) The sensors 32 can inform the software processing system 48 to determine the nature of the support that is optimal.

The piezoelectric adaptive mesh system 20 may also be employed to detect whether a user 22 starts snoring or experiences apnea, and the software processing system 48 may cause the actuators 34 to raise the user's head or take other action as a remedy. The piezoelectric adaptive mesh system 20 may detect snoring, apnea, and/or other sleep disorders in several ways. The software processing system 48 may analyze changes in the diaphragmatic movement as sensed by the sensors 32, as previously discussed. The software processing system 48 may also communicate with an auditory sensor, which may be incorporated into the piezoelectric fibers 24 or the electronics of the controller 40, user interface 42, or AI system or may be associated with a stand-alone device, such as a cell phone microphone. The software processing system 48 in cooperation with the auditory sensor may be able to distinguish snoring or other sleep irregularities from the breathing sound of normal sleep. The software processing system 48 may communicate with an oxygen sensor, such as a thumb clamp oxygen sensor. For example, a ten percent raise in head height can raise oxygen utilization from low 80's % to high 90's % at home to ameliorate apnea or in a hospital. A feedback loop may be employed to ascertain whether a desired effect has been accomplished or whether additional piezoelectric adjustments are warranted. One will appreciate that any combination of these techniques may be employed.

The piezoelectric adaptive mesh system 20 may provide an adjustable massage mode. The user 22 may select from a variety of default massage settings on the user interface 42. The user 22 may also select specific areas of the body for particular attention. The software processing system 48 can identify parts of the body as previously described and may even be employed to discern whether they are tight or relaxed based on comparisons of current states to user baseline data. In response, the software processing system 48 can adjust states of pressure or states of vibration of the actuators 34.

The piezoelectric adaptive mesh system 20 may provide a physical therapy mode that can be used to provide deep heating to soft tissues. The piezoelectric actuators 34 can be directed by the software processing system 48 and/or the controller 40 to vibrate at a desired ultrasonic frequency at specific locations. Some embodiments that are configured to provide a physical therapy mode may employ a padding 64 that utilizes an ultrasonic gel.

A piezoelectric adaptive mesh system 20 configured for ultrasonic functionality may be employed to provide frequency in the 20 kHz to 30 kHz to function as a cavitation machine to melt fat at specific locations. These frequencies can dissolve the walls around fat cells so that the fat is released into the body of a user 22 and metabolized. The software processing system 48 can determine the appropriate body locations as previously described, such as machine-identified or user-selected, that are in contact with piezoelectric adaptive mesh 26 and apply the ultrasonic frequencies from the actuators 34 at the specific locations. The cavitation effects can be applied at any time, such as when a user 22 is seated in a chair or sleeping on a bed.

Fat may also be "melted" by causing the fat molecules to rub against each other, which causes them to discharge their stored molecules. This type of fat melting may be accomplished by employing a resonating layer held in optimum contact with a user's body. In this embodiment, the resonating frequency may be ultrasonic of another frequency that maximizes the rubbing together effect.

Ultrasonic and other sounds may be produced by circular diaphragms of piezoelectric speakers. The sounds may be in the human audible range, ultrasonic, or in the radio-wave spectrum. Examples of how these sounds are produced from electrostatic or piezo-electric speakers are described in https://www.sciencedirect.com/science/article/abs/pii/S0003682X17302712, https://www.americanpiezo.com/standard-products/buzzers.html, and https://www.edn.com/piezoelectric-driver-finds-buzzers-resonant-frequency/.

The piezoelectric adaptive mesh system 20 may be configured to administer transcutaneous electrical nerve stimulation (TENS) to reduce pain and/or relax muscles. Such piezoelectric adaptive mesh systems 20 may employ specialized padding 64 that can accommodate placement of suction cups or sticky pads (TENS pads) like those used for an ECG, EMG, or EKG. The TENS wiring may be included inside each TENS pad, and these TENS pads may also be configured to include gel to provide better electrical conductivity. The software processing system 48 may coordinate the TENS treatment with treatment by piezoelectric structures 30 configured for ultrasonic activity.

The software processing system 48 may also be configured to coordinate vibration or resonance with music that may be tweaked to resonate with the piezoelectric mesh 26. Moreover, the music may be selected to relax, thrill, or sadden the user 22. In some embodiments, voice coils may be used to provide music in addition to piezoelectric structures 30 and/or voice coils maybe used as well as actuate the mesh 26. One will appreciate that a device capable of providing a full audio range may provide better sound than a device limited to a single frequency or a very limited frequency range, provided the fuller range device performs with sufficient amplitude.

Guidelines for using TENS pads for a given stimulation may be found at https://omronhealthcare.com/2014/01/10-tips-for-tens-pad-placement/. The software processing system 48 may assist with the determination of TENS pad placement for optimal pain relief with TENS. The user 22 may indicate exactly where the pain is located by outlining the most concise and tender area of the pain, such as on a body map provided by the user interface 42. The software processing system 48 through the user interface 42 may identify (or help the user 22 identify) at least two locations where to connect the TENS pads on the padding 64 associated with the piezoelectric mesh 26.

Some criteria that the user 22 or the software processing system 48 may consider: the TENS pads may be placed in different orientations, including vertical, horizontal, and angled; the TENS pads should be at least an 1 inch apart but as the distance between the two TENS pads increases the effectiveness decreases; placement of TENS pads directly over a joint should be avoided because the TENS pads can more easily come loose; the TENS pads may be placed in vertical orientations above and below long stretches of pain; the TENS pads may be placed in horizontal orientations above and below pain focused over a smaller area; the TENS pads may be placed in a vertical and a horizontal orientation on muscle or soft tissue above and below a painful joint; and when the pain is wide (e.g. between shoulders below the neck), the TENS pads may be placed to the left and right side of the spine in a vertical direction, and if the pain extends out even further above or below the shoulder area, the TENS pads can be angulated to encompass the region of discomfort. When more than two or more TENS pads are used, the user 22 or the software processing system 48 may alter the flow of the electrical sensation by changing the distance between the TENS pads and/or the direction of flow between the TENS pads.

The piezoelectric adaptive mesh system 20 may be configured to accommodate magnetic functionality. Permanent magnets can be intermingled with piezoelectric structures 30, as long as the piezoelectric structures 30 are shielded or are far enough away. Electromagnets may alternatively or additionally be intermingled with piezoelectric structures 30, as long as the piezoelectric structures 30 are shielded or are far enough away. However, the piezoelectric structures 30 may be employed without shielding or distance if the electromagnets are controlled or pulsed so as not to interfere with sensing or actuation of the piezoelectric structures 30.

For example, the electromagnets may be used in turn with piezoelectric sensing and stimulation. In particular, during a first time window, the piezoelectric sensors 32 may be employed to sense body location and/or to detect a malady. During a second time window, the electromagnets or the piezoelectric actuators may be employed. During an optional time window, the other of the electromagnets or the piezoelectric actuators may be employed. During a subsequent first time window, the piezoelectric sensors 32 may search for resonant effects, resonance of organs, and/or interaction with other hardware, sensors 32, and/or actuators 34. During a subsequent second time window, the electromagnets or the piezoelectric actuators may be employed to enhance, suppress, and/or modulate resonances, amplitudes, frequencies, and/or phase delays. EMI/RFI shield material can be added to the areas that the user 22 would not want magnetized.

The piezoelectric adaptive mesh system 20 may also be employed to better accommodate more active interactions between users 22, helping them keep balanced and not tip over. For example, the piezoelectric adaptive mesh 26 may provide support to particular body parts based on movement, historical data, user preset preferences, and machine learning.

Moreover, the software processing system 48 may cause the actuators 34 of the piezoelectric adaptive mesh 26 to simulate the movement of a waterbed and may automatically adjust the characteristics of the wave based on the activity of the users 22 to enhance the activity between the users 22.

The piezoelectric adaptive mesh system 20 may also operate without a power source. As previously discussed, piezoelectric structures 30 can convert human movement to electrical energy which can be employed to activate specific actuators 34. The piezoelectric adaptive mesh 20 may also be configured to exhibit pyroelectricity, which is the ability to generate a voltage and charge following a change in temperature. As previously discussed, the piezoelectric actuators 34 may be employed to generate heat. Conversely, Me piezoelectric actuators may convert heat to electrical energy. So, the piezoelectric adaptive mesh 20 may capture human body heat and convert it to electrical energy which can be employed to activate specific actuators 34. This acquired electrical energy may be employed to perform any of the previously described functions of the piezoelectric adaptive mesh 20.

Similarly, the piezoelectric adaptive mesh 20 may function as a heating pad and even convert human movement to heat. Additionally, the piezoelectric adaptive mesh 20 may absorb heat from specific locations to cool them and to covert that heat to electricity that may be employed to heat other specific locations. For example, the piezoelectric adaptive mesh 20 may capture heat from a warmer person in one location and transfer it to a cooler person in another location.

Applications of the piezoelectric adaptive mesh system 20 are not limited to furniture applications or to use solely on humans. For example, the piezoelectric adaptive mesh system 20 may also be used as a blanket. It can provide heating and/or cooling as previously discussed. It can also provide ultrasonic and/or magnetic treatment as previously discussed. Magnetic blankets are already used for horses. These blankets may be enhanced by a piezoelectric adaptive mesh system 20. A piezoelectric mesh 26 may also be enhanced by an EMF layer to protect a user 22, such as a patient from WiFi signals in vulnerable body areas (brain, reproductive area).

Moreover, the piezoelectric adaptive mesh 26 does not have to lie in a flat plane, nor does it have to be horizontal. The piezoelectric adaptive mesh 26 may be configured and employed as an article of clothing, ranging from as small as a sock, belt, arm cuff, glove, neck wrap, head cover, or legging to a pair of shorts or a shirt, or to an entire body suit. For example, with a piezoelectric adaptive mesh 26 configured as a target garment, the fat "melting" embodiments may be more precisely applied.

One will appreciate that the piezoelectric adaptive mesh 26 may employ non-piezo-electric actuators instead of, or in addition to, piezoelectric actuators 34. In some embodiments, the piezoelectric actuators 34 may be employed to trigger larger-area movement non-piezo-electric actuators provided in the same layer or in a separate layer. Although any type of non-piezoelectric actuator may be employed, eccentric rotating mass vibration motors may be versatile for some applications of the piezoelectric adaptive mesh 26. Moreover, one will also appreciate that the piezoelectric adaptive mesh 26 may employ digital fibers instead of, or in addition to, piezoelectric sensors 32. Examples of digital fibers may be found in "Digital electronics in fibres enable fabric-based machine-learning inference" by Loke et al., 3 Jun. 2021, Nature Communications.

The piezoelectric adaptive mesh 26 or its padding 64 may interact in direct contact with the user 22 or at a distance. In some embodiments, a series of two or more layers of piezoelectric bending actuators 34 may be employed to achieve complex curves. Moreover, one layer may be employed to hold a shape (and optionally act as a sensor layer) while another layer may act to resonate. These complex curves may be used by the control algorithm to pinpoint site areas to gently modify actuator pressure or configuration and/or resonate at specific locations. As discussed previously, each piezoelectric actuator 34 may, depending on size, typically deform as much as an inch. The deflected shape of the total piezoelectric adaptive mesh 26 may therefore be more than adequate to fit the shapes of humans and other larger animals. The user 22 of the piezoelectric adaptive mesh 26 may be an animal, a human, a non-human animal, or any other living organism that may be stimulated via piezoelectric activation.

Figure 7:
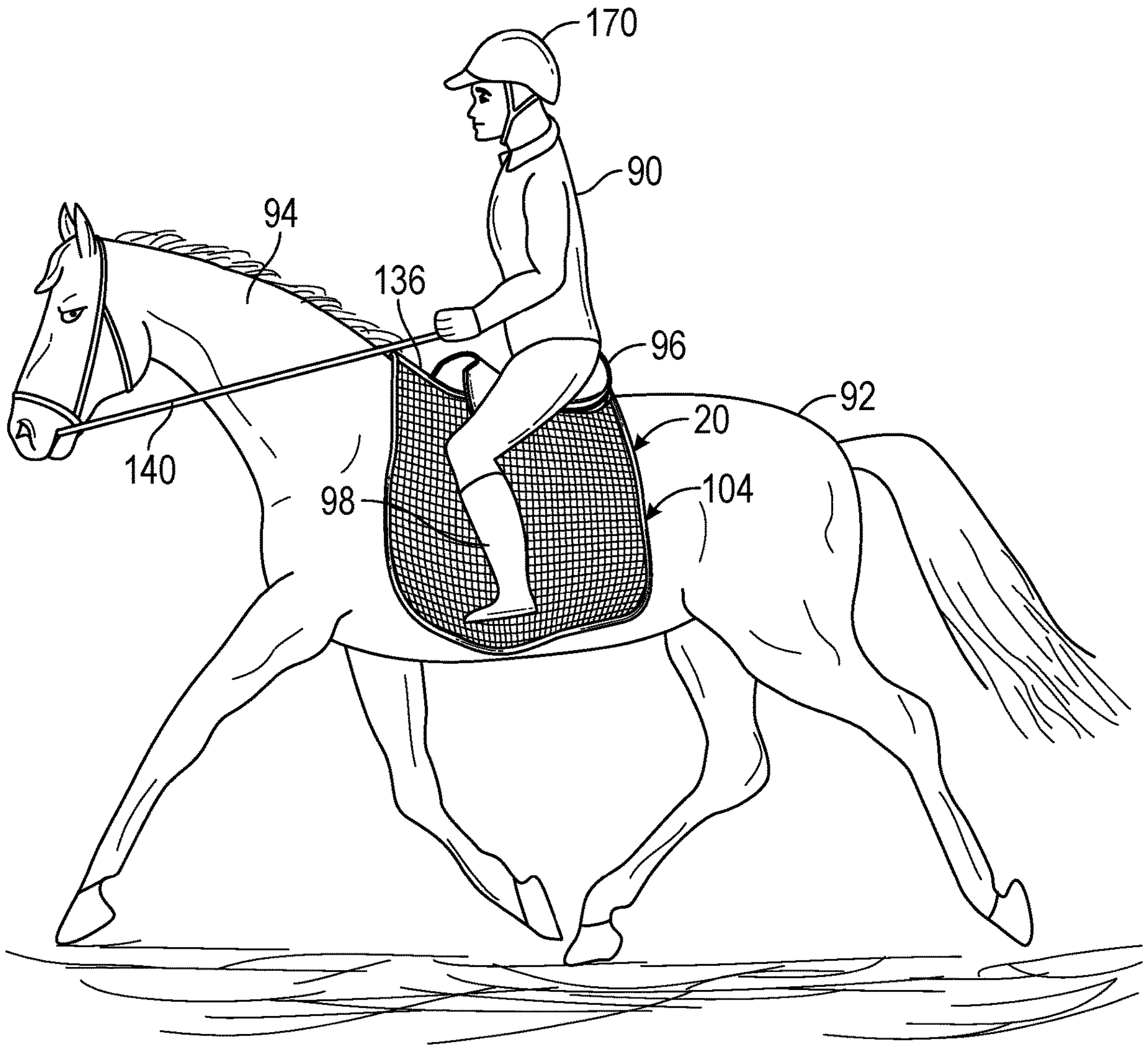
FIG. 7 illustrates a piezoelectric adaptive mesh system configured for use between a rider and an animal.

For example, FIG. 7 illustrates a piezoelectric adaptive mesh system 20 configured for use between a rider 90 and an animal 92, such as a horse 94. Humans can cause scoliosis in a horse 94 by riding that horse 94 in an unbalanced fashion. Humans may distribute their weight differently on any given day or as a long-term habit when riding a horse 94, regardless of whether they are riding in a saddle 96 or bareback. In particular, a rider 90 may habitually lean forward or backward or put more weight on one side or the other side. A horse chiropractor can readily tell when a rider 90 has applied asymmetric force, such as putting too much weight on one leg 98.

Historically, the saddle 96 may be stuffed with padding at desirable locations to help the horse 94 and human combination straighten their muscle balance, and therefore promote a properly elongated and healthier horse's spine. Unfortunately, such stuffing may cause the human rider 90 to develop an even more asymmetric habit instead of a more balanced manner. The padding placement and amount should be revisited often because the horse 94 and rider 90 change their muscle development and because different riders 90 may use the same saddle 96. However, restuffing a saddle 96 properly can be time consuming and require detailed knowledge of the horse 94 and rider 90 by an experienced professional. Restuffing can, therefore, be inconvenient and expensive and is often delayed at the expense of the horse's health.

Figure 8:
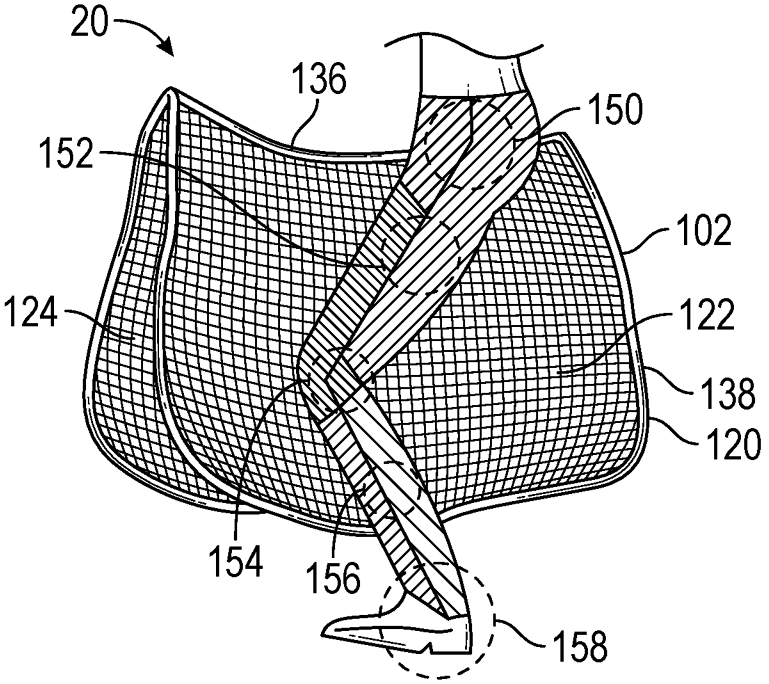
FIG. 8 illustrates a piezoelectric adaptive mesh system configured as a bareback pad for use between a rider and an animal.
Figure 9:
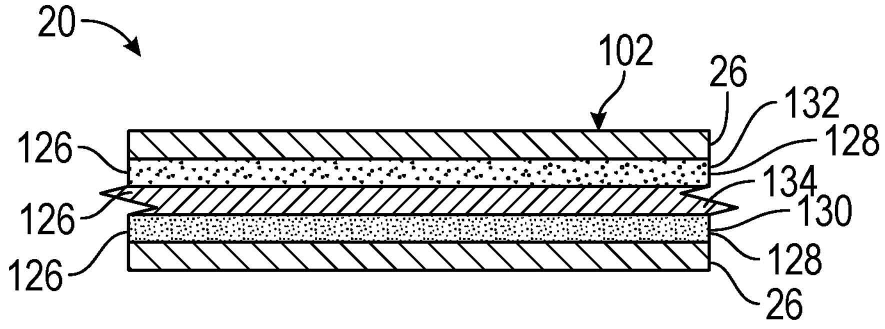
FIG. 9 illustrates a cross-sectional view of a piezoelectric adaptive mesh system configured as a bareback pad.
Figure 10:
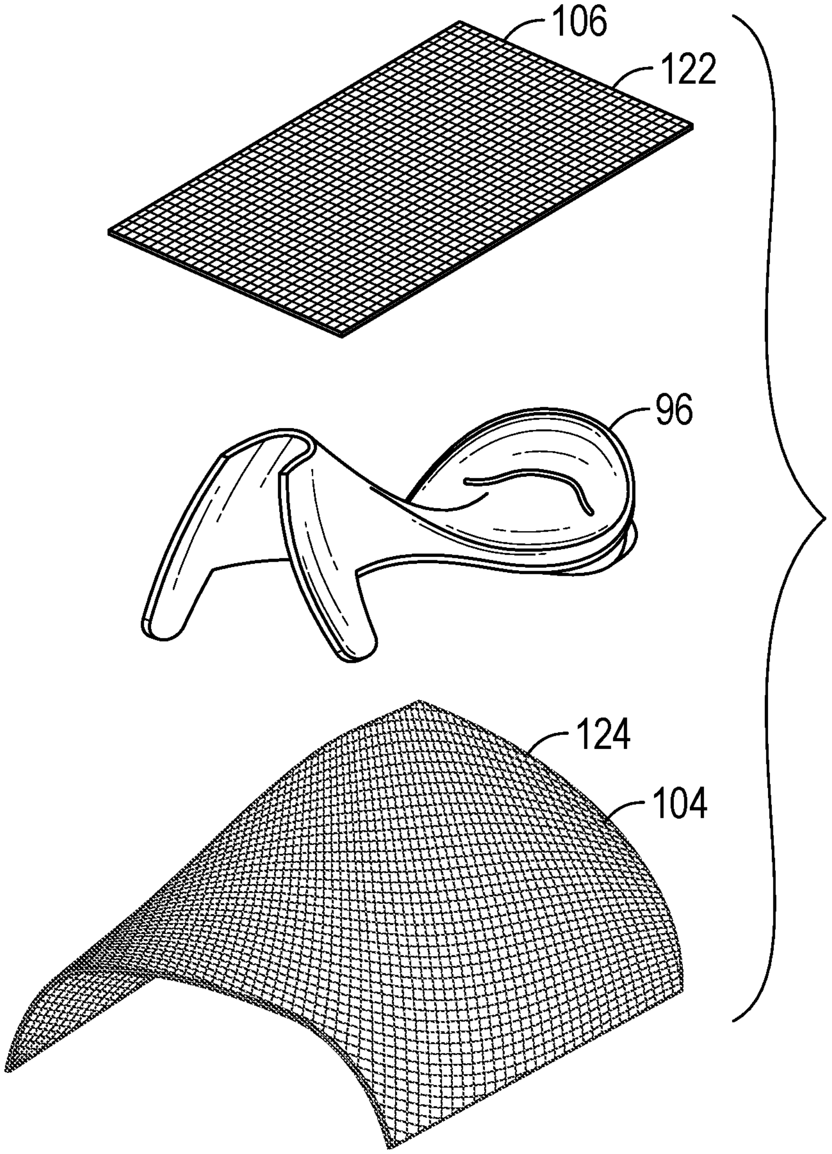
FIG. 10 illustrates an exploded view of a piezoelectric adaptive mesh system employing a rider-side mesh cover above a saddle and an animal-side mesh below the saddle.
Figure 11:
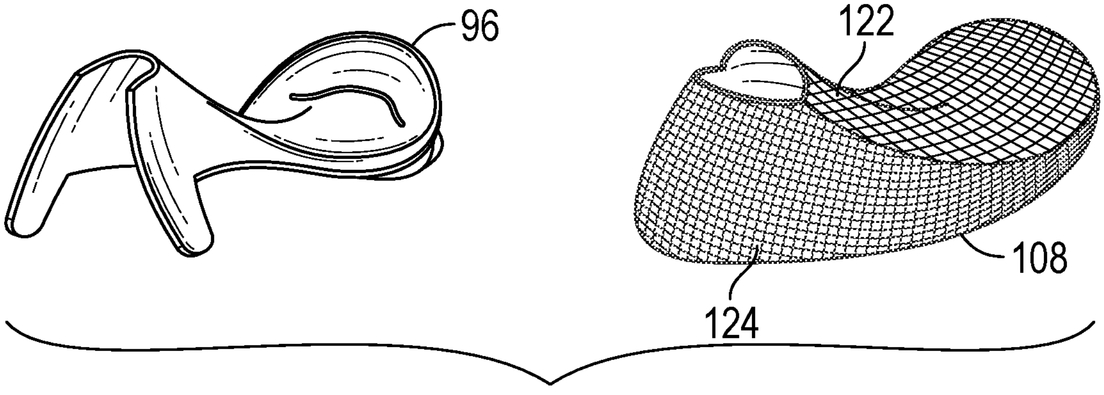
FIG. 11 illustrates a piezoelectric adaptive mesh system configured as a saddle case.
Figure 12:
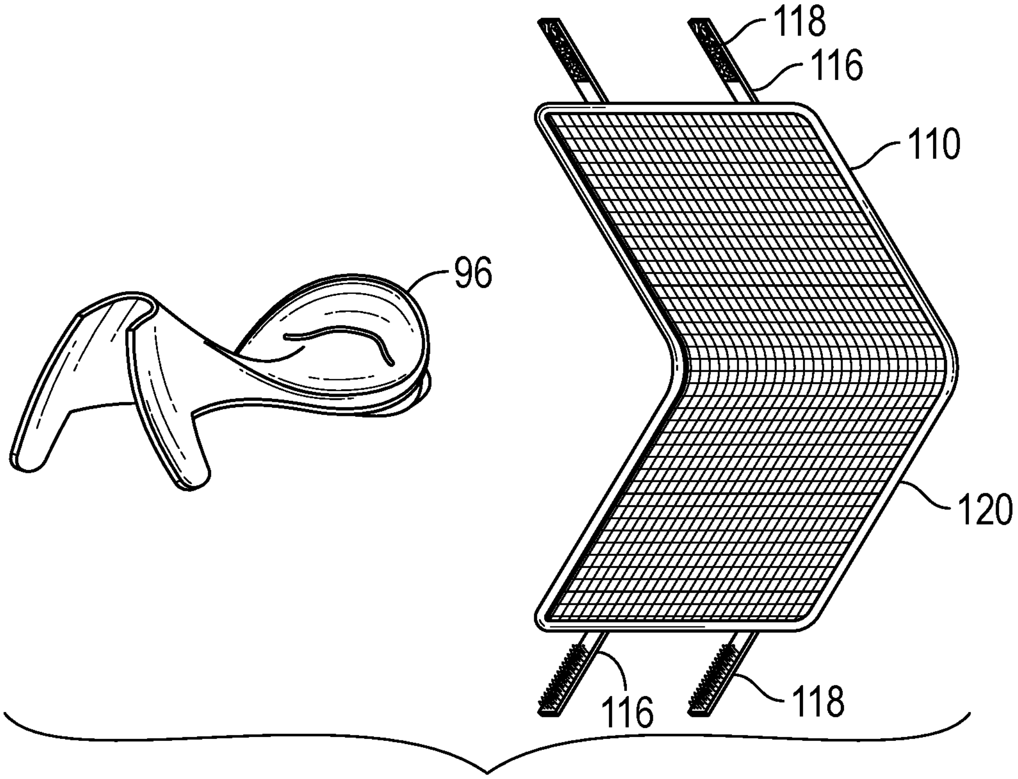
FIG. 12 illustrates a piezoelectric adaptive mesh system configured as a saddle wrap.
Figure 13:
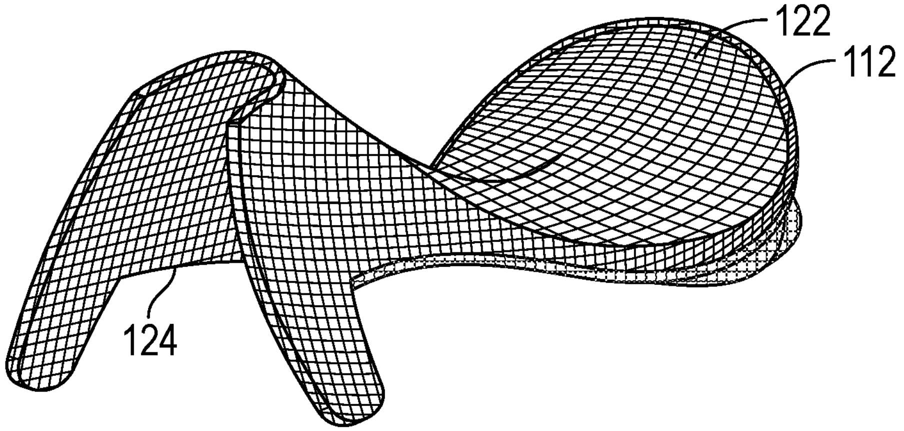
FIG. 13 illustrates a piezoelectric adaptive mesh system integrated with a saddle.

The piezoelectric adaptive mesh system 20 can be employed to address these issues and may configured to stimulate one or both of the horse 94 and rider 90 (which is typically human). The piezoelectric adaptive mesh system 20 for a horse 94 and rider 90 may utilize any of the previously mentioned components of the piezoelectric adaptive mesh 26, software processing system 48, and controller 40 and may be configured as one or more of a pad (such as a bareback pad 102), a horse blanket 104 (such as used between the saddle 96 and a horse 94), a saddle cover 106 (such as used on top of a saddle 96), a saddle case 108 (such as used to enclose or partly enclose the saddle 96, providing surfaces to contact both the horse 94 and the rider 90), a saddle wrap 110, and a mesh-integrated saddle 112. FIG. 8 illustrates a piezoelectric adaptive mesh system 20 configured as a bareback pad 102 for use between a rider 90 and an animal 92; FIG. 9 illustrates a cross-sectional view of a piezoelectric adaptive mesh system 20 configured as a bareback pad 102; FIG. 10 illustrates an exploded view of a piezoelectric adaptive mesh system 20 employing a rider-side mesh 122 above a saddle 96 and an animal-side mesh 124 below the saddle 96; FIG. 11 illustrates a piezoelectric adaptive mesh system 20 configured as a saddle case 108; FIG. 12 illustrates a piezoelectric adaptive mesh system 20 configured as a saddle wrap 110; and FIG. 13 illustrates a piezoelectric adaptive mesh system 20 integrated with a saddle 96.

The bareback pad 102 may be implemented with or without stirrups and may include a rider-side mesh 122 (or human-side mesh) and an animal-side mesh 124 (or horse-side mesh) with one or more intermediate layers 126 in between them. The rider-side mesh 122 and the animal-side mesh 124 may be effectively identical so that the bareback back pad 102 is reversible and facilitates quick placement on a horse 94 and is easy to swap out. Alternatively, the bareback pad 102 may employ a dedicated rider-side mesh 122 and a dedicated animal-side mesh 124 that are different. These differences may include different piezoelectric structures 30, such as different piezoelectric sensors 32 and/or different piezoelectric actuators 34. Moreover, these structures piezoelectric structures 30 may be spaced apart differently and/or connected differently, and/or these structures piezoelectric structures 30 may be subjected to different analytics by the software processing system 48.

The intermediate layers 126 may be electrically insulating between piezoelectric structures of the rider-side mesh 122 and the animal-side mesh 124 and may employ any type of padding material 128, such as a gel padding 130 or memory foam or fleece 132, with or without a core material 134 such as structural grid members 60, a flexible frame material 134, or a saddle tree. The intermediate layers 126 between the two meshes should not be too mushy like a waterbed but should still be able to absorb/filter out random friction generated movements and preferably provide comfort to both the rider 90 and the horse 94. The thickness, firmness, resilience, and compression strength of the fleece 132, foam, or gel 130 can be chosen to achieve these targets.

The intermediate layers 126 may be substantially homogeneous or may be configured to have different densities and resiliencies in proximity to (or facing) the rider-side mesh 122 or the animal-side mesh 124. There may be some benefits to employing fleece 132 adjacent to the rider-side mesh 122 and gel padding or memory foam adjacent to the animal-side mesh 124, especially if there is an intervening core material 134. Generally, the rider-side padding material 128 may have a thickness that is less than or equal to the thickness of the horse-side padding material 128. The rider-side padding material 128 may be less than or equal to 0.5 inch thick, and the horse-side padding material 128 may be less than or equal to 3 inches thick. One will appreciate that the padding material 128 may alternatively be positioned between the rider 90 and the rider-side mesh 122 and/or between the horse 94 and the animal-side mesh 124. One will also appreciate that only a single layer of padding material 128 may be employed, especially if there is no core material 134.

The software processing system 48 may map relative locations of the rider-side piezoelectric sensors 32 to relative locations the rider-side piezoelectric actuators 34, map relative locations of the animal-side piezoelectric sensors 32 to relative locations the animal-side piezoelectric actuators 34, may map relative locations of the rider-side piezoelectric sensors 32 to relative locations the animal-side piezoelectric actuators 34, and/or may map relative locations of the animal-side piezoelectric sensors 32 to relative locations the rider-side piezoelectric actuators 34.

The differentiation between horse 94 and rider 90 may be determined by relative deflection at each layer of the rider-side mesh 122 and the animal-side mesh 124. Moreover, the rider 90 and horse 94 will also be moving in reaction to each other so there will be pairing in the sensations received between the piezoelectric sensors 32 of the rider-side mesh 122 and the animal-side mesh 124. An ideal combination of deflections should be a smooth and small delay from one to the other. Synchrony should follow soon after a command is given. The horse 94 should not have to guess what the rider 90 wants until there is a synchrony. Actual commands can be enhanced by resonant/wave/repeated feedback, where random movements can be ignored. Once both are in synchrony, synchronization feedback commands may cease.

The wave front of deflections may share primary natural frequencies, at a slight delay in some cases, especially during gait transitions, and then be in perfect synch during steady state on the middle of a gait that is not changing. This steady state gate may be determined on a relatively perfectly level, smooth surface, with no injuries or stiffnesses to accommodate in either horse 94 or rider 90. Many stiffnesses can work their way out as muscles warm up, and on multiple trips around and arena, the horse 94 will learn a best path to avoid potholes. The software processing system 48 can note such changes and not try to fix what doesn't need to be fixed.

If the horse 94 and rider 90 are not properly synchronized, one will move at a measurable delay from the other with possible jerky motion and loss of balance as a result. The software processing system 48 can identify these irregularities perceived by piezoelectric sensors 32 of the rider-side mesh 122 and the animal-side mesh 124. The pressure cluster centers of motion (e.g., centers of mass) will oscillate about a center of frequency. If the natural frequencies align, with just a minor phase delay, the rider 90 and horse 94 are in synch and do not require adjustment. Differences in frequency are reduced by increasing or decreasing the frequency of a stimulus to coax one to slow down to or catch up the other, with a simple feedback control loop on the frequency that reduces the error over time. If the cluster centers of mass are not centered over the horse, or offset according to a desired command, then a stimulus is applied to coax a more balanced position.

A saddle blanket 104 (such as used between the saddle 96 and a horse 94) may employ only an animal-side mesh 124; and, a saddle cover 106 (such as used on top of a saddle 96) may employ only a rider-side mesh 122. These may be employed independently without a physical connection, or they may be configured for physical connection. Similarly, they may have their own independent software processing systems 48, or they may be in communication with a common software processing system 48.

A saddle case 108 may be configured to enclose both top and bottom surfaces of a saddle 96. One embodiment may fully enclose the saddle 96 like a zippered pillowcase does to a pillow. Another embodiment may partly enclose a saddle like a traditional pillowcase does to a pillow. Yet another embodiment, such as a saddle wrap 110 may fold over (and under) or wrap around a saddle 96 (without closed forward or rearward ends) and may employ one or more connectors 114 to connect the loose edges of the saddle wrap 110 along the open side. Connectors 114 may include straps 116 with buckles or Velcro™ ends 118. Alternatively, flat come along elastic straps 116 may be employed to rejoin the saddle wrap 110 at the other side, and the sensor network can process the relationship created from that connection, to use when attempting to map to rider-side mesh 122 and animal-side mesh 124 absolute references, such as spine and hips for both rider 90 and horse 94.

Regardless of the embodiment of the piezoelectric mesh 20 used between the rider 90 and the horse 94, the piezoelectric mesh 20 may be configured to include pockets, such as edge pockets 120, to accommodate batteries, the controller 40, the software processing system, and a communication system. The pockets may be attached to the rider-side mesh 128, the horse-side mesh, or both the rider-side mesh 128 and the horse-side. The pockets may be generically sized to accommodate all components, or the pockets may be differently sized to accommodate specific ones of the components.

The software processing system 48 can be configured to adapt to drift between the two meshes (or adapt to drift between either mesh and the rider 90 or between either mesh and the horse 94), especially if there is more than a gel pad 130 between the rider-side mesh 122 and the animal-side mesh 124, as it is not uncommon for saddles 96 and blankets to slowly move relative to each other during a ride (especially if they are not properly affixed to each other such as with Velcro™). The rider-side mesh 122 can also drift relative to the rider 90, and the animal-side mesh 124 can also drift relative to the horse 94. For example, the animal-side mesh 124 can slide back on the horse 94 if not held by a breast plate. The piezoelectric adaptive mesh system 20 may be configured to alert the rider 90 as to the drift. The saddle 96 and mesh also might not be a perfect fit, causing wrinkles or folds. These differences can be mapped and accommodated early in the ride, with or without predetermined absolute mapping between the piezoelectric sensors 32 of the rider-side mesh 122 and the animal-side mesh 124. Then session-specific and/or rider-specific reference points can be mapped between rider-side mesh 122 and the animal-side mesh 124, so that the comparisons can be made for feedback.

The saddle case 108 may have substantially identical rider-side mesh 122 and animal-side mesh 124 as previously discussed for rapid (and less attentive deployment), or the saddle case 108 may employ a dedicated rider-side mesh 122 and a dedicated animal-side mesh 124 as previously discussed, preferably sharing a software processing system 48 and a power source 46.

A piezoelectric mesh-integrated saddle 112 may have dedicated rider-side mesh 122 and animal-side mesh 124 integrated into the saddle 96 itself. The rider-side mesh 122 and animal-side mesh 124 may be identical to facilitate manufacturing, or they may be different as previously discussed (and later discussed), preferably sharing a software processing system 48 and a power source 46.

Regardless of the presence of a saddle 96 or intermediate layers 126 between them, the rider-side mesh 122 and the animal-side mesh 124 should be in proximity to each other, such as less than or equal to about 12 inches apart. In an integrated bareback pad 102, there may be no true distance or very little distance between the rider-side mesh 122 and the animal-side mesh 124. In many embodiments, the bareback pad 102 may have less than or equal to about 3 inches between the rider-side mesh 122 and the animal-side mesh 124. In embodiments having a saddle 96 between the rider-side mesh 122 and the animal-side mesh 124, the distance between these mesh layers will depend on the height of the saddle 96. In many embodiments, the shortest distance between these mesh layers may be less than or equal to 8 inches or less than or equal to 6 inches or less than or equal to 4 inches.

As previously discussed, the software processing system 48 may be configured to determine amounts of force applied to the piezoelectric sensors 32 at respective sensor locations along the first multiple piezoelectric fibers 24 based on sensor signals from respective sensors at the respective sensor locations in response to received force applied against the respective piezoelectric sensors 32. The software operating system may also be configured to formulate an exertion force for the piezoelectric actuators 34 at respective actuator locations along the second multiple piezoelectric fibers 24. The software processing system 48 may be configured to direct the controller 40 to apply actuator signals to the respective piezoelectric actuators 34 at the respective actuator locations in response to the received force applied against the respective piezoelectric sensors 32.

The locations (or relative locations) of active piezoelectric sensors 32 may be determined or derived in several ways. The piezoelectric sensors 32 send voltage when they experience an active deflection, so force can be inferred. A constant hold does not trigger or maintain a voltage. So, if the piezoelectric adaptive mesh 26 senses a deflection at x and at y edges, the software processing system 48 can infer deflection location close enough to where it occurred to respond to the deflection. Voltage generated along x and along y will help locate where the deflection is. With certain technologies, such as providing each piezoelectric actuator 30 with a specific map location address, the software processing system 48 can even pinpoint multiple deflections along the same axis.

In another example, each piezoelectric sensor 32 may be provided with a specific location address mapped on a rider-side mesh 122 and a horse-side mesh 124. For example, piezoelectric mesh 26 may have a central seam that may serve as the y axis and a rearward edge 138 that serves as the x axis. The x and y locations of a piezoelectric sensor 32 can be noted based on voltage data sent to the software processing system 48. A cluster number can be picked and a fuzzy C means clustering may be employed to pick the centers of mass of the raw data. (See https://en.wikipedia.org/wiki/Fuzzy_clustering.) As the raw data moves, the clusters should stay "faithful"=cluster 1 is still cluster 1, but fast changes might result in cluster 1 swapping with cluster 3. Filtering, such as Kalman filtering, may be employed to ignore the random jumps in cluster label. (See https://en.wikipedia.org/wiki/Kalman_filter.) A first pass that chooses a handful of cluster centers on each side (left and right) can be used to reference relevant pairing for each side, and can determine if there is a gross imbalance. A second pass, determining cluster centers at a higher resolution, can then determine the way a given contact area moves/shuffles over time. Frequencies of weight variation can be tracked at this level of resolution. A more thorough explanation of the use of clusters of pixels when tracking images can be found in U.S. Pat. No. 8,010,252 of Getman et al. These techniques can be adapted for use in the context of tracking pressure regions experienced by the rider-side mesh or the animal-side mesh 124.

One will appreciate that even if a horse 94 is simply standing still, both the horse 94 and the rider 90 will be breathing, and their hearts will be beating. They may also be digesting food. In utero, a human or horse fetus might also be flipping around. These frequencies can be recorded and used to determine comfort, stress, and or fatigue. However, for the purpose of balance feedback, these frequencies act as useful noise, so that weight values, which are larger values, can be identified after subtracting the smaller periodic movements. Every once in a while, a horse 94 or a rider 90 may scooch to find a more comfortable static position. From a balance feedback point of view, the software processing system 48 may ignore these comfort shifts but can store them for longer feedback loop-based suggestions for a best first static seat position.

Also, riding an animal 92, such as a horse 94, involves a great deal of repetitive vibration (with some variation in amplitude and location). By utilizing the sensed vibration, the software processing system 48 can map a piezoelectric adaptive mesh grid of piezoelectric sensors 32 with good resolution; and, the software processing system 48 can infer a constantly received force from the rider 90 by registering the vibration.

As previously discussed, piezoelectric structures 30 generate a voltage based upon the structure deflection and are used to sense applied mechanical pressure. The rider-side mesh 122 or the animal-side mesh 124 may be made up of an array of piezoelectric nodes 56 that have an x and y connection that provides location for a generated voltage at that node 56. Adjacent nodes 56 also provide a voltage/location. In response to the applied mechanical pressure. The signals may then be mapped by the controller 40 or software processing system 48 creating a pressure profile or map between the horse 94 and saddle 96 and/or between rider 90 and the saddle 96, for example. Because of the motion that is generated by constant horse and rider motion, this map may be under constant change, so the generated signals may be averaged for a specific rider and horse movement.

The software processing system can make a determination as to the correct positioning of the rider 90 on the horse 94 regardless of whether the adaptive mesh system 20 is on both sides of a core material 134. In some embodiments, feedback actuators 34 may be employed in a distinct secondary mesh to haptically provide feedback to the rider 90 to adjust their position.

To establish a pressure position, the array's mesh x and y positions may be sequentially scanned by the controller 40 (or other component associated with the software processing system 48) and recorded as a two-dimensional profile map. This determination may be accomplished by looking at one x row and then scanning sequentially the y rows or vice versa and recording the voltages. In some embodiments, scan rates could be every 50 msecs to provide an accurate map under variable riding actions—stationery to full gallop.

To read each piezoelectric structure 30 in a row, various serial buses such as 1 wire bus or I2C or SPI may be employed. For example, 1 wire bus may be the lowest cost and simplest approach and could be adopted for this application. (See a 1 wire-related video at https://www.google-.com/search?q=Single+wire+sensor+buses.)

The power source 46 for the piezoelectric mesh system 20 may be a rechargeable battery powered using Li-ion standard format cells, e.g. AAA. The data gathered by the controllers 40 and/or software processing system 48 may be offloaded to a user interface 42 such as a cell phone app using a WiFi link or Bluetooth link.

In some embodiments, sensing nodes 56 may have a major axis (or diameter) of greater than or equal to about 1 inch, and feedback (actuator) nodes 56 may have a major axis of about 4 inches. The nodes 56 may be single appropriately sized piezoelectric structures 30 or clusters of piezoelectric structures 30. In some embodiments, the sensing and feedback nodes 56 of the rider-side mesh 122 may have a major axis (or diameter) of greater than or equal to about 1 inch, and the sensing and feedback nodes 56 of the horse-side mesh 124 may have a major axis (or diameter) of greater than or equal to about 4 inches. Of course, the sensing nodes 56 and feedback nodes 56 may have major axis dimensions that are smaller or larger than listed for these embodiments. The frequencies employed may depend upon the size of the piezoelectric structures 30.

A two-dimensional pressure map can be established as previously discussed. The software processing system 48 can compare right side data to left side data and readjust the y axis to be along the center to compensate for imperfect positioning of the rider-side mesh 122 or the animal-side mesh 124. For example, vibration actuation location may be determined by the controller 40 based on repositioning feedback required to the rider 90. If a position shift is required, then a sequential activation of the actuators 34 from the rider's current location to the desired location may be initiated and repeated until the rider 90 has shifted their posture to the indicated location.

Figure 14:
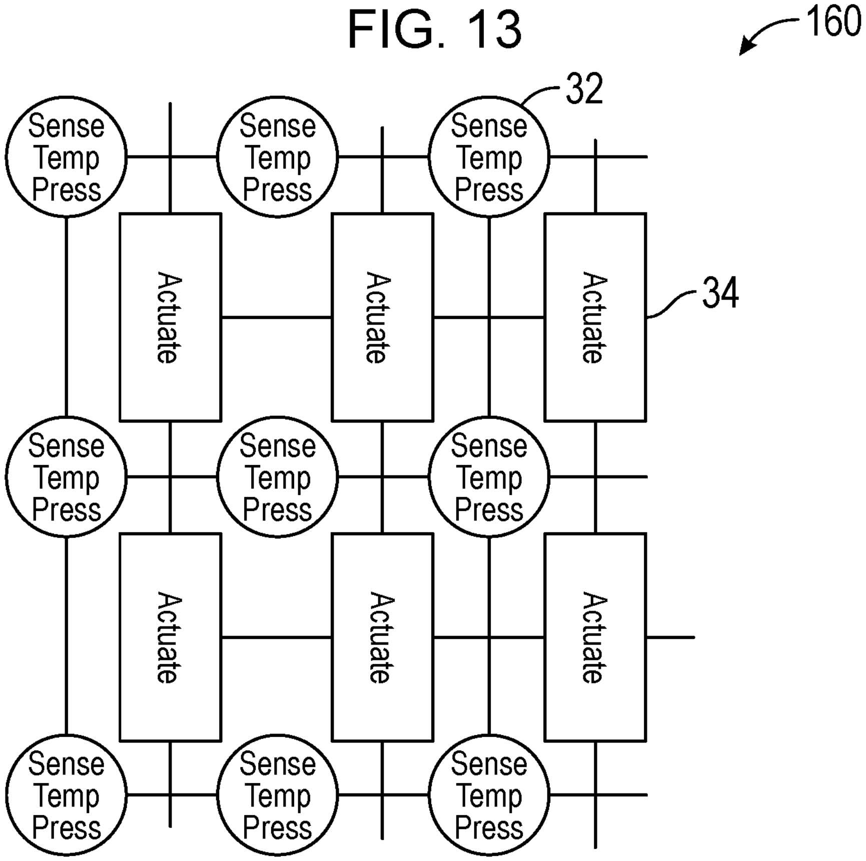
FIG. 14 illustrates a simplified mesh plan layout of another embodiment of the piezoelectric adaptive mesh system.
Figure 15:
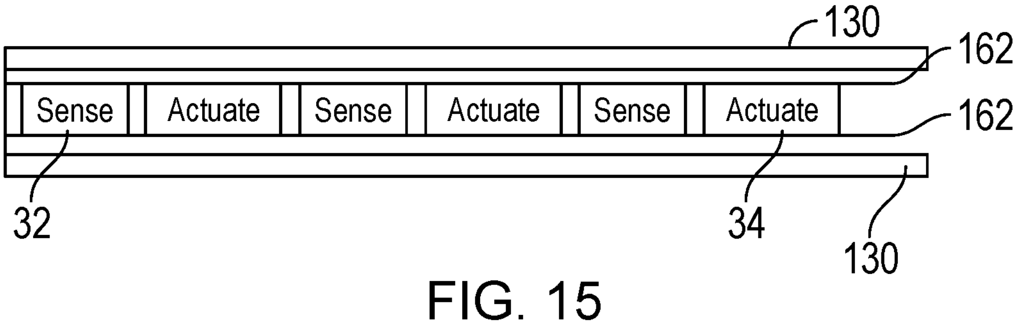
FIG. 15 illustrates a cross-sectional view of the simplified mesh plan layout of FIG. 14.

FIG. 14 illustrates a simplified mesh plan layout 160 of another embodiment of the piezoelectric adaptive mesh system 20, and FIG. 15 illustrates a cross-sectional view of the simplified mesh plan layout 160 of FIG. 14. The vibration actuators 34 may be located at the center point between each group of four piezoelectric sensors 32 (which may be configured to sense temperature as well as pressure, or other sensors 32 may be employed), and in the same plane (or different plane) as the piezoelectric sensors 32. Flexible circuit layers 162, such as Kapton, may be positioned either or both sides (such as upper and lower sides) of the layer(s) of sensors 32 and the actuators 34. The flexible circuit layers 162 may be covered by a layer of gel padding 130 (or memory foam 132). The vibration actuators 34 can be sequentially activated by addressing sequentially adjacent actuators 34 to provide directional feedback from any point on the adaptive mesh 26 to any other point.

In some embodiments, two types of actuators 34 may be employed. The piezoelectric actuators 34 as previously discussed have a fixed resonant frequency that depends on the material composition, shape, and volume of the piezoelectric structure 30. For example, a thicker piezoelectric structure 30 will have a lower resonant frequency than a thinner piezoelectric structure 30 of the same shape. However, voice coil (e.g., sugar cube speakers) actuators 34 have a variable frequency such as from 325 Hz to 20 KHz that may be set by an external oscillator. The voice coil optimum actuation frequency may be tuned for best results. Moreover, voice coils and cube speakers allow for frequency shifting to achieve resonance. Sequential activation (e.g., from one actuator 34 to an adjacent actuator 34) may be accomplished by controller addressing and may be limited to no more than 5 Hz to ensure the feeling of distinctive sequential actuation as a wave.

If the piezoelectric structures 30 or mesh 20 is attached to a stiffer mesh or stiffer core material 134, the piezoelectric structures 30 mesh 20 may be able to resonate more readily, making the actuations far easier for the horse 94 or rider 90 to feel. Moreover, if the actuator's edges are attached to a more rigid periphery, individual actuators 34 will transmit their actuation to a wider area, but the actuation oscillation may be dampened, similar to the working of a drum skin. Piezoelectric oscillation may also rely on an air gap between the oscillating surface and any piezo-support material above the surface. Air gaps may be calculated based on a piezo-electric structure's resonant frequency. The piezo-support material can be in the form of a ring made of metal or plastic. Material may be chosen based on its impact on vibration amplitude, flexibility, and comfort of the mesh. In one example, a ring with a fractional air gap (about 1 mm) may be positioned around the outer edge of a 1 or 4 inch round flat piezo actuator to allow for vibration.

The same sensor and actuator layout and construction may be applied to a simulated coil spring mattress. However, the size of the sensor and actuator elements may be changed to interact with a larger body mass or profile. An adjustable weight or a variety of body dummies of different sizes and may be used to simulate body pressure at the geometrical center of the array. Body temperature may be simulated using a hot air gun on the weights or body dummies. A variable frequency oscillation may be provided by the actuators 34 and detected by the piezoelectric sensors 32. Various frequency ranges may be applied to the actuators 34 to determine potential for resonance at the applied weight area, and temperature may be monitored at all 4 nodes. The software processing system 48 can accumulate and analyze the test data. If results are less than desirable through the applied range of oscillator frequencies, additional nodes can be added.

This embodiment may be integrated with an elastic horse surcingle, bareback pad 102, saddle blanket 104, saddle cover 106, saddle case 108, or saddle wrap 110. The surcingle without the rider 90 may emulate a leg command (stay to outside of round pen, accelerate) on one side upon sensing a certain medical state, like too low heartbeat), then issue a reins command to brake (using regular actuator) upon another state (like high temp).

Additionally, a weight, such as a motor with an unbalanced load on an arm that rotates slowly above it, can be added to the surcingle. The user interface 42 can convey commands to the motor to provide training stimuli and provide compensatory commands to the adaptive mesh 26 to induce the horse 94 to compensate such as by shuffling the rotated weight back to center, over withers, or butt.

Alternatively or additionally, a fiber optic mesh may be employed. Optical fibers take time to convey light out and back. As an optical fiber bends in response to an applied force, the amount of time the light travel changes. The deflection inherently provides the location along the optical where the stress is occurring. If the optical fiber is deflected in multiple places, these locations can be differentiated from reflections. When both optical fiber and piezoelectric sensors 32 are employed, the perceived applied forces and/or temperature changes from the two systems can be compared, and the software processing system 48 may utilize the data it determines is more accurate. For greater details on how a fiber optic mesh network can be implemented see https://en.wikipedia.org/wiki/Optical mesh network.

When both rider-side mesh 122 and animal-side mesh 124 are employed, the software processing system 48 can correlate positions between these layers. Initial deflections of the piezoelectric sensors 32 in the rider-side mesh 122 by the rider 90 may be mapped upon mounting, and this data may be recorded by the software processing system 48. Initial deflections of the piezoelectric sensors 32 in the animal-side mesh 124 may also be mapped before and after mounting, and this data may be recorded by the software processing system 48. Deflections of the piezoelectric sensors 32 in the rider-side mesh 122 and/or the animal-side mesh 124 at the start of a given gait can also be established by the software processing system 48. The software processing system 48 can determine differences between the baseline mount deflections and the gait deflections. The software processing system 48 can make additional assessments. The software processing system 48 may employ adaptive frequency filtering techniques to separate vibrations and random noise and motions from commands and balance locations. See also U.S. Pat. No. 5,761,626 and https://sonobat.com/understanding-aliasing which show that as long as an alias is consistent, it can be captured and compared to the alias in another mapping system, such that a simple feedback control could be applied to minimize the difference.

In some embodiments, each x and y row of the adaptive mesh 26 may be tied into a MUX device that can be connected to a low-cost micro controller 40 such as a Rasberry Pi, Auduino, or equivalent that can control the sequential reading of each x-y node, creating 2D maps of the data of both sides of a bare back pad 102 saddle blanket 104. One will appreciate that a series of higher cost but still inexpensive micro controllers 40 such as STM 32000 series 32 bit that could be employed. Based on the mapping data, the software processing system 40 may provide actuator feedback alerting the rider 90 to adjust their position on the bare back pad 102, saddle blanket 104, saddle cover 106, saddle case 108, saddle wrap 110, or mesh integrated saddle 112 to achieve an optimum riding position posture.

For example, with respect to a rider 90 having an unbalanced seating pattern, the piezoelectric adaptive mesh 26 can sense whether the rider 90 is applying more weight (too much weight) in on the right or left side of the rider-side mesh 122 or derive whether the rider 90 is applying more weight (too much weight) in the right or left stirrup. For example, if the rider 90 has a pattern of putting more (or too much) weight in the right stirrup, the rider's hips (pelvis) may twist toward the toward the right (clockwise), applying greater new or renewing force against the piezoelectric sensors 32 at perceived or derived sensor locations on the right side of the rider-side mesh 122.

In response, the software processing system 48 may instruct the controller 40 to cause the piezoelectric actuators 34 at respective actuator locations in the rider-side mesh 122 at or near the perceived sensor locations in the rider-side mesh 122 to vibrate, reminding the rider 90 to adjust their (his, her, or nongender) position, such as by rotating or shifting their pelvis to the left or by simply applying more downward pressure on the left or less downward pressure on the right. The software processing system 48 of the piezoelectric adaptive mesh system 20 may learn the pressure signature of a given rider 90 from the rider-side mesh 122 fairly quickly, and therefore may stimulate relative to the pressure signature position to encourage an optimal pelvis or buttock rotation. A rider 90 will instinctively turn/twist toward a stimulation that is to one side and not symmetrical. Repeated stimuli of vibration may coax and/or train the rider 90 into a position where weight is balanced on the rider-side mesh 122 and in both stirrups.

Alternatively or additionally, the software processing system 48 may instruct the controller 40 to cause the piezoelectric actuators 34 at respective actuator locations in the rider-side mesh 122 at or near the perceived sensor locations in the rider-side mesh 122 to apply an effective upward pressure to directly compensate for perceived differences in weight distribution between the rider's left and right sides.

Alternatively or additionally, the software processing system 48 may instruct the controller 40 to cause the piezoelectric actuators 34 at respective actuator locations in the animal-side mesh 124 corresponding to the perceived sensor locations in the rider-side mesh 122 to apply an effective pressure to the horse 94 to directly compensate for perceived differences in weight distribution between the rider's left and right sides. For example, if the rider's right side is heavier on the rider-side mesh 122, then the left side of the animal-side mesh 124 may provide an equalizing (such as the difference between the right side pressure and the left side pressure) downward pressure to the horse 94 to directly compensate for perceived differences in weight distribution; or, if the rider's left side is heavier on the rider-side mesh 122, then the right side of the animal-side mesh 124 may provide an equalizing downward pressure to the horse 94 to directly compensate for perceived differences in weight distribution. This alternative or additional option may be useful to safeguard the spine of the horse 94 from an inexperienced or infrequent rider 90 (who may not be interested in improving their technique).

Another rider balance issue is a tendency to drift forward or toward a fetal position. Weight too far forward results in two major issues. The horse 94 tends to increase speed and shift too much weight onto their forelegs. The ideal circumstance is a horse 94 that is "collected," where weight distribution is as close as possible to 50/50 front to rear. Similar to detecting side to side variations in weight distribution, the piezoelectric sensors 32 of the rider-side mesh 122 can sense whether the rider 90 is applying more weight toward the front or the back of the horse 94.

A rider 90 having a pattern of putting more weight toward the front of the horse 94, thereby applies greater new or renewing force against the piezoelectric sensors 32 at perceived or derived sensor locations at the front of the rider-side mesh 122. Moreover, a forward lean would result in a lot less weight on the rider-side mesh 122 toward the back of the horse 94 or saddle 96. Thus, there would be fewer clusters there to track, and the sensing clusters would have shifted forward. (In such instance, the position of the rider 90 might resemble more of a jockey racing a horse 94, leaning forward and pulling hard on the reins 140 resulting in a horse 94 moving faster to compensate. See https://myequestrianstyle.com/poor-posture/.

If the software processing system 48 detects such imbalance, one solution would be to coax the upper body of the rider 90 into better vertical alignment by using the piezoelectric actuators 34 of the rider-side mesh 122 to vibrate the back of the rider's buttocks or pelvic sitz bones where they contact the rider-side mesh 122. This vibration may tend to scooch the buttocks of the rider 90 forward as the upper body instinctively leans toward the vibration, reminding the rider 90 to pull their shoulders back. The resulting adjustment of the rider's front to back position on the horse 94, vertical alignment, and weight distribution may not only shift the horse's weight backward but may also slow the horse 94 down because the horse 94 would no longer be imbalanced and running away from the imbalance caused by the rider 90.

One could send a wave of vibration front to back to remind the rider 90 to sit further back in the seat. The vibration could additionally flash flash (or provide some other signal), with greater or maximum magnitude, at the best location to center the most weight.

Alternatively or additionally, the software processing system 48 may direct the controller 40 to cause the piezoelectric actuators 34 of the rider-side mesh 122 to push upward at the front of the rider pelvis to partly or fully compensate against the imbalanced downward force from the rider 90. Alternatively or additionally, the software processing system 48 may direct the controller 40 to cause the piezoelectric actuators 34 of the animal-side mesh 124 to push downward against the horse 94 at locations at or near the rear of the rider's sitz bones to partly or fully compensate against the imbalance of the forward and downward force from the rider 90. One will appreciate that if the software processing system 48 detects that a rider 90 leans too far backward, the response of the piezoelectric adaptive mesh system 20 may be reversed.

Alternatively or additionally, a two-step correction may be implemented. The rider 90 can sit (or be instructed to sit) in the correct spot with most weight in that spot. Then, the rider 90 can be convinced to pull their shoulders back. To differentiate the signal instead of a straight back vibration wave across the actuator grid, one can curve the wave outward on the way back. This effect will indicate an overall body shift, and not just a shuffle of the body in direct contact. The relative location of detection grid and activation grid can be a simple slight offset. Detection may also alternate with activation, so that activation is not detected. The exact sample rate for each may be determined via experimentation for a given set of sensors 32, actuators 34, and materials used.

Many rider-to-horse commands involve leg and/or knee position change, rider balance change, pelvis/buttocks shuffling, and command pressure location and frequency. These commands involve one or more human muscles or groups of muscles whose amounts of contraction and relaxation are sensed by the horse 94; or, by the horse 94 and the piezoelectric adaptive mesh system 20 when one is employed. FIG. 8 shows where some of these muscle groups may be positioned with respect to locations on the piezoelectric mesh 26. These pressure sense areas may include one or more rider pelvis/hip areas 150, thigh areas 152, knee areas 154, calf areas 156, and ankle/foot areas 158. The ankle/foot movement commands may be conveyed by stirrups (not shown) to the rider-side mesh 122 or the horse-side mesh 124. One will appreciate that the piezoelectric adaptive mesh system 20 for use between a rider 90 and a horse 94 may be configured to have piezoelectric structures 30 mostly in, or only in, areas that are most likely to receive applied force and/or to apply force. Alternatively or additionally, these areas may be configured to have greater concentrations of the piezoelectric structures 30.

The horse command-related human muscles or groups of muscles include, but are not limited to, transverse abdominus, obliques, psoas, iliacus, piriformis, glutes (e.g. gluteus maximus and gluteus medius), and quadratus lumborum. The transverse abdominus helps stabilize between the hips, ribs, and pelvis. This muscle acts as a stabilizer for the entire lower back. A weak transverse muscle is often one of the many reasons people may experience lower back pain when riding. The obliques are the turning muscles and are important for keeping the rider 90 evenly stacked upon the horse 94. Weak oblique muscles may cause the rider 90 to tip to one side whilst riding, causing an imbalance and compensatory issues for the horse 94 and the rider 90.

The psoas is one of the most important hip flexor muscles involved during riding. It functions is flex and laterally rotate the pelvis. The psoas also has a role in flexing the spine sideways as well as extending and rotating it. The prime function of the psoas during riding is to stabilize the forward and backward movement of the pelvis, any restriction or tightness will prevent the pelvis and lumbar region from shock absorbing any movement from the horse 94. The iliacus is another hip flexor muscle working in partnership with the psoas, the iliacus helps release the movement of the horse 94 below the rider 90.

The piriformis attaches to the front of the sacrum and to the top of the femur. Together with the psoas the piriformis helps rotate and extend the hips as well as internally rotates and flexes the pelvis. Tight or restricted piriformis muscles will result in an imbalance in the saddle 96 or a tipping to one side. Usually, riders 90 will have a tighter piriformis on one side. The gluteus maximus and gluteus medius muscles help control the balance of the pelvis. When they are tight, these muscles can inhibit the horse's balance. When they are weak, these muscles can affect the rider's balance within the saddle 96. If these muscles are weak or not controlled, horse movements such as sitting trot will be difficult and will cause tension and engagement to the adductor muscles in an attempt to stabilize the rider 90. The quadratus lumborum attaches to the bottom rib and to lumbar vertebrae as well as the back of the pelvis. As a lateral flexor, this muscle has the control of whether the rider 90 tips or rocks to one side in the saddle 96.

A canter is an example of a horse maneuver that employs some of these rider muscles to communicate rider commands. A canter is an asymmetrical three-beat gait with a moment of suspension. A good canter is rhythmical, balanced, energetic, and powerful. Riding exercises in canter helps to improve strength, elasticity, balance, expression, and mobility of the musculoskeletal system. The canter is the only gait where the horse's abdominal muscles on both the left and the right sides contract at the same time within the stride cycle. The canter is the only gait where the horse 94 rocks from the hindquarters to the forehand. This rocking movement helps to strengthen the thoracic sling muscles, which are important for supporting the forehand between the front legs. To give the horse 94 a more complete abdominal workout and to encourage more movement and greater symmetry at the lumbosacral junction, the rider 90 may vary the speed and stride length in both true canter and counter canter. A canter left lead is counterclockwise around a circle, with the left front hoof being the last hoof to land during a canter stride. A counter canter left lead is clockwise around a circle, with the left front hoof again being the last hoof to land during a canter stride. The counter canter is far more difficult for a horse 94 to maintain, especially around a tight turn.

To maintain a canter, the rider's hip angle (the angle between trunk and femur) should be opening and closing instead of staying rigid. The transverse abs and obliques are engaged to achieve the opening and closing motion in this angle for a following canter seat. The gluteus med muscles are important for activating and relaxing the leg during the canter and keeping the rider 90 stable in the saddle 96. (A rider 90 who uses their abdominal six pack and hip flexors for stabilization in the canter will get pushed out of the saddle 96 and end up bouncing on the horse's back.) The piezoelectric sensors 32 of the rider-side mesh 122 can sense the movements of these muscles or groups of muscles from the rider 90, and then software processing system 48 can compare the sensed rider's muscular actions with the same actions of an experienced rider 90 or more effective command actions for a particular horse 94.

A basic tutorial concerning some of the rider commands can be found at https://www.wikihow.com/Sit-the-Canter-Properly. A step-by-step video of a canter can be found at https://www.horsesinsideout.com/post/understanding-assessing-your-horse-s-movement-part-3-the-biomechanics-of-canter. This video shows first just the horse 94, and then shows the horse 94 and rider 90.

Before starting step-by-step commands for the canter, the rider 90 first establishes that the horse 94 is balanced and collected at the trot. One can test collection by trotting the perimeter of a 20-meter diameter circle. A collected horse 94 will continue around that circle even if one of the reins is completely loose (generally more prudent to attempt by dropping the outside rein). The rider 90 shortens the inside rein just enough to see the horse's eye and nostril yet maintains an ounce of contact with the outside rein.

The actual canter command begins with a brief half halt to the outside rein, then the rider 90 slides their inside hip (the side pointing to the inside of the circle) forward and their outside hip backward. At the same time, the rider 90 squeezes with their inside leg and slides the outside leg back.

(In a half halt from a steady state one-ounce contact with the bit, the rider 90 briefly "slides" their hand inward toward their abdomen as if rotating a wine glass across an imaginary table, then immediately returns their hand to the original position. While the rider 90 might not shift significantly in weight during a half halt, the horse 94 should shift their weight several percent from the front legs to the back legs.)

Concise cantor commands may involve: preparing the horse 94 for the canter transition with a preparatory outside half-halt; slightly weighting and bringing forward the rider's inside sitz bone and, at the same time, applying the rider's inside leg at the girth and swishing their outside leg 4-6 inches backward; and, as the horse 94 transitions into the canter, letting the riders seat and arms follow. A series of half halts can be performed to re-balance the canter.

The piezoelectric sensors 32 of the rider-side mesh 122 can sense the balance and muscular actions from the rider 90, and the software processing system 48 can differentiate the sensed actions from more effective positioning actions and more effective command actions. The software processing system 48 may look up from a database and formulate a responsive action protocol to send to the controller(s) 40 to direct the piezoelectric actuators 34 of the rider-side mesh 122 to remind the rider 90 to adjust their positions or commands and/or directly offset for the deficiencies of the rider 90. The responsive action protocol may additionally or alternatively be formulated to direct the piezoelectric actuators 34 of the animal-side mesh 124 to remind the horse 94 to perform movements associated with the commands and/or directly offset force applied to the horse 94 to compensate for the deficiencies of the rider 90.

In another example, a horse 94 is currently trotting, and the rider 90 wants to transition to a left lead canter. First the rider 90 confirms that the horse 94 and rider 90 and properly balanced and collected at trot before even attempting the canter. The rider 90 might have been posting (rising and sitting with each stride), but now needs to sit the trot before the canter transition, if only briefly. Pressure for all parts of their body should have been equal left to right everywhere, save for a slight turn of the horse's nose inward toward the center of the arena, which might be reflected as left side pressures located slightly rearward or right side pressures in the pressure map for the rider 90 and horse 94. Next, the rider 90 prepares for the canter by ensuring that the horse 94 is properly collected. This term means that the horse 94, instead of a typical natural 60% of their weight on the front legs and 40% on the rear legs, has its weight shifted rearward to more closely approximate 50% both front and rear.

Once the horse 94 is well balanced and collected, the rider 90 shifts their lower right leg and hip back, and squeezes the left leg in the normal position, while maintaining pressure with the right leg in the further back position. The rider 90 also lifts upward slightly on the left rein. These movements encourage the horse 94 to free up the left front leg to raise up and extend forward, followed by the pair of both right front and left rear. Then finally, the rider 90 releases the pressure for the right rear leg of the horse 94 to leave the ground.

It is desirable, as the horse 94 rocks like a rocking horse 94, that the rider's buttocks match that rocking motion by sliding forward. The combined result should look to the casual observer as if the rider 90 is not moving at all, when, in fact, the rider 90 is actively wiping the saddle seat from back to front with their buttocks.

The software processing system 48 can run the analytics for this sequence of rider commands (or actions) and horse responses (or actions), or any other sequences of commands and responses, that are perceived by the piezoelectric sensors 32 of the rider-side mesh 122 or the animal-side mesh 124.

A "normal" (balanced and collected) baseline state may be stored for both static and dynamic imprints from both the animal-side mesh 124 and the rider-side mesh 122. Summed pressures side to side, and human versus horse 94, should substantially match horse 94 and rider 90, and side to side, with brief "mirror" activity also noted as normal. The cyclical frequency of both horse and rider rocking motion should be compared, plus phase delay between them.

Data can be gathered and adapted to address nonideal conditions. Given that the horse 94 and rider 90 might be travelling over uneven ground, the math may consider both an overall average and a cycle-to-cycle average at a given fixed location at the course being ridden. Depending on whether or not the horse 94 and the rider 90 are training or competing, repetition over the same spot might or might not be available to adapt commands.

Feedback can be tuned to the needs of the moment and can be programmed to prioritize based on a ranked list. One example would be to balance the rider 90 front to back first, in case they have drifted toward an undesirable fetal position, which tends to cause the horse 94 to increase speed to try to rebalance the weight of the rider 90. Balancing side to side (right to left) may be done second, keeping in mind that brief transitions allow for brief imbalance. Finally, feedback could focus on keeping knees out, lower legs in, and/or heels down/toes up.

The types of feedback to the rider 90 can take on different forms. Certain feedback pulses, vibrations, or changes in elevation may cause automatic reactions in the body of a rider 90. However, one will appreciate that most humans can easily differentiate between eight types of haptic/vibration signals. So, these pulses that are different may be employed to signify different types of desirable adjustments. Moreover, different frequencies (or magnitudes) may be employed to indicate a desirable increase or decrease of a command/adjustment, and/or may be employed to indicate earlier versus later for a command/adjustment. Alternatively or additionally, the magnitude of the feedback can be adjusted to compensate for variables, such as the type or thickness of the clothing being worn, the sensitivity of the rider 90 or horse 94 to feedback pulses, and/or the body locations where the feedback is expressed if a given individual (horse 94 or rider 90) has fewer or greater nerve density in a given body location and/or is more muscled or emaciated in the given body location, changing their ability to sense or react to feedback. With a typical closed loop feedback system, the grains (such as proportional, integral, and derivative) can be adjusted until timely and consistent responses are given to feedback.

Another potential issue is a rider 90 slamming their buttocks down on the back of the horse 94 (or saddle 96) when the horse 94 is landing from jumps, potentially causing bone spurs in the back of the horse 94. The ideal movement of the rider 90 during a jump is to move with the horse 94 with very little phase delay, not getting yanked up behind. Riders 90 can achieve this result by always holding mane, but this act reduces flexibility in steering control. Many riders 90 press their arms into the sides of their horse's neck while balancing in the stirrups in the 2-point position, and then they allow their hands to slide forward slightly as needed as the horse 94 stretches over the jump. Any lack of synchrony will tend to yank the horse 94 in the mouth and then the horse 94 will start refusing jumps.

The piezoelectric sensors 32 in the rider-side mesh 122 may be employed to track the position and clamping angles of the rider's legs. Clamping angles can be determined from relative pressures perceived by the piezoelectric sensors 32 in the rider-side mesh 122. A properly balanced rider 90 will not wildly swing their legs around as the horse 94 jumps, such rider 90 will only pivot slightly to move with the horse 94. Acceptable swinging motion will be at a frequency compatible with (if not identical to) the jumping motion of the horse 94. The software processing system 48 (with or without the assistance of a learning AI system) can be trained to detect the jumping and landing actions of a horse 94 and/or its rider-based on data collected from the piezoelectric sensors 32 in the animal-side mesh 124 and/or the rider-side mesh 122.

After general jumping sensor data has been established, especially including data indicative of landings, the software processing system 48 may be able to determine based on sensor data from the piezoelectric sensors 32 of the rider-side mesh 122 how much force the rider 90 is putting on the horse 94 during a jump and especially at the time of landing. The software processing system 48 may respond by directing the controller 40 to instruct the piezoelectric actuators 34 of the rider-side mesh 122 to vibrate in a location of where the human buttocks are sensed to remind the rider 90 (or provide some other feedback) to continue to stay up in the two point position (buttocks not touching saddle 96) longer before landing on the horse's back, even if the rider 90 needs to hold the horse's mane until the rider 90 builds more muscle strength.

Alternatively or additionally, the software processing system 48 may anticipate landings and direct the piezoelectric actuators 34 of the rider-side mesh 122 to be raised as the horse jump is initiated and gradually lowered to dampen the force from the rider 90 as their buttocks descends toward the horse 94.

The software processing system 48 may also initiate commands to the piezoelectric actuators 34 of the animal-side mesh 124 that can help the horse 94 better time its launch over a jump (versus too early or too late) and/or remind the horse 94 to throw its back legs father to the side to avoid touching a rail on the way down. For example, as the horse 94 rises from the ground, the piezoelectric actuators 34 of the animal-side mesh 124 can flash flash to remind the horse 94 to kick up just a little higher in the rear.

With respect to horse behavior, horses 94 may have a tendency to under stride or over stride or to tense up or get distracted (relax too much and not pay attention). A trotting horse 94 that overstrides will strike the foreleg on the back swing while the rear leg is on its front swing. The horse 94 then toes out for the rear legs to avoid striking the front legs. This motion that is non-parallel to the movement of the front of the horse 94 can be captured by tracking the pressure cluster centers. Also, tense muscles will result in higher pressure by the sensor grid versus a baseline and/or versus muscles elsewhere on the horse 94.

A human rider 90 can speed up or slow down a trot by purposedly slightly speeding up or slowing down their posting. Posting is when the rider 90 stands up in the stirrups and then sits down again with every trot stride. A rider 90 can half halt with the reins (pull slightly then release on just one side) and also lean back, to shorten the stride of a horse 94. The rider 90 can also half loosen the rein and slightly lean forward to lengthen the stride of the trot or canter. These rider motions can be perceived by the piezoelectric sensors 32 of the rider-side mesh 122 and recorded by the software processing system 48.

In response, the software processing system 48 may instruct the controller 40 to direct the piezoelectric actuators 34 of the rider-side mesh 122 to instruct the rider 90 to perform the desirable commands, and/or the software processing system 48 may instruct the controller 40 to direct the piezoelectric actuators 34 of the animal-side mesh 124 to simulated the rider 90 commands directly to the horse 94, such as by stimulating along the horse's sides in a forward stimulation wave or a backward stimulation wave. The piezoelectric actuators 34 of the animal-side mesh 124 may alternatively or additionally apply appropriate stimuli, such as vibration or massage, in one spot or area or as a wave to cause the horse 94 to exhibit more activity to one side, relax more one side, or step further on one side at a certain moment. For example, smoother, slower waves will tend to relax muscles, while fast cycled jabbing waves will tighten muscles.

Some horses 94 may have injuries and/or soreness, causing their gait to be irregular or asymmetrical. A horse 94 that is sore on one side will have a shorter stride and will tend to step further under themselves. If sore on the right hock, halfway down the right leg, right turns will be easy, and left turns will be more difficult. The horse 94 will also tend to stay "high" in the right near, not "banking" as well into turns. These horses 94 may experience more pain when they tense one or more particular muscles. The software processing system 48 may instruct the controller 40 to direct the piezoelectric actuators 34 of the animal-side mesh 124 to apply a massage type stimulus to anatomically beneficial areas while the horse 94 is simply standing at a halt or walking.

Haptic commands from the software processing system 48 to the piezoelectric actuators 34 of the animal-side mesh 124 may also be employed to encourage an appropriate set of a horse's muscles to contract during a piaffe. A piaffe looks like a trot in place, but it is more like an alternating diagonal pushup in practice. For instance, at one moment in time, the right rear and left front legs will stay in place, while the left rear and right front legs will lift up at the same time, all while maintain the balance of the rider 90 on top. The piezoelectric sensors 32 of the animal-side mesh 124 will quickly send voltages with high magnitude from the far corners of left rear and right front at the same time. A trained software processing system 48 and a refined controller 40 might instruct the piezoelectric actuators 34 to provide a gentle stimulus to relax the two standing legs and tighten the two lifting legs just before the next lift. When the animal-side mesh 124 is not in close contact with the desired muscles to be stimulated, the horse 94 can be trained to react to specified stimuli from mesh-contacting areas.

Similarly, during a pirouette (which is a canter in the tightest possible circle with one rear hoof not moving from its spot), haptic commands from the software processing system 48 to the piezoelectric actuators 34 of the animal-side mesh 124 may be employed to remind the horse 94 to balance backward (collect) more if necessary, and at just the right moment(s). For a pirouette, the canter commands are given, but the rider 90 maintains more contact on the reins to not allow the horse 94 to move forward. Training for a pirouette begins with a very collected canter around a tight turn, half halting back until there is all turn and no forward movement. Except for this difference, the software processing system 48 may employ the same steps previously described with respect to the canter.

Many horses 94 learn to synchronize their movements to the music in dressage freestyle. Haptic commands from the software processing system 48 to the piezoelectric actuators 34 of the animal-side mesh 124 may also be employed to help a horse 94 know exactly what to do at that moment. Such commands may be as simple as a vibration in a particular location just prior to when the music hits a particular note. The entire animal-side mesh 124 (or specific areas of it) can provide a general vibration to warn an experienced horse 94 to change their gait or rhythm at a certain exact moment, wowing the judges. This prompting would be in addition to the regular commands. Just as a rider 90 can post (rise up and down from the saddle 96) faster or slower to influence the horse 94 to change their gait to match, haptics can use pulses or repeated waves to coax the horse 94 to change their strides.

Another option is for the software processing system 48 to determine based on sensor data from the piezoelectric sensors 32 of the animal-side mesh 124 when the horse movements have become out of sync with the music. The software processing system 48 may identify sequences of received forces against the piezoelectric sensors 32 of the animal-side mesh 124 as specific horse movements. Alternatively, the software processing system 48 may analyze sequences of received forces against the piezoelectric sensors 32 of the animal-side mesh 124 and the received command forces applied by the rider 90 to the piezoelectric sensors 32 of the rider-side mesh 122 to determine specific horse movements. In circumstances when the software processing system 48 has determined when the movements and music are not synchronized, the timing of the synchronizing commands may be briefly slowed or sped up to help the horse 94 to get back in phase. For example, a forward wave at slowly increasing frequency from the piezoelectric actuators 34 of the animal-side mesh 124 may be employed speed the horse 94 up to catch up to the music. A reverse wave at slowly decreasing frequency may be employed to slow the horse 94 down to allow the music to catch up to the horse 94.

The rider-side mesh 122 and/or the animal-side mesh 124 of an adaptive piezoelectric mesh system 20 can additionally be employed as a sophisticated training tool for either of, or both of, the rider 90 or the horse 94. Common instructions given to students include moving their shoulders back, sitting on the back of their buttocks, opening their knees, moving not only their heels down but moving their toes up (different muscles), making sure that their heels are in line with their shoulders, using only one ounce of contact with the horse's mouth and allowing the horse 94 freedom to move their nose around inside of an invisible box, never pulling pull back on the rein past the student's body unless they are doing an emergency stop pulling the horse's head around to their hip, and rising to the rear and always turning the horse's head if the horse 94 starts to lower their head to buck. All of these instructions result in relatively distinct sequences of balance changes in the seat and legs that can be sensed by the piezoelectric sensors 32 of the rider-side mesh 122.

Expert riders 90 tend adjust their weight ever so slightly during certain horse maneuvers because these experienced riders 90 know a best rhythm to apply commands. Just as a race car prefers a banked track to better maintain a constant acceleration around a turn, the rider 90 can shift their balance to allow a horse 94 freer movement while changing gaits or swapping leads executing flying lead changes. (See https://www.horseforum.com/threads/flying-lead-changes-help.33788) In order to signal a performance horse 94 for a flying lead change at the canter, the rider 90 should to shift their weight to the opposite direction of the lead that the rider 90 wants the horse 94 to switch. For example, if the horse 94 is tracking right at the canter and the rider 90 wants to switch the horse 94 to the left lead, the rider 90 should shift their weight to the right. A western example can be found at https://www.aqha.com/-/correct-rollback-position-part-1 by scrolling down to "What to Do When Riding Spins and Rollbacks."

A horse 94 is not unlike an automobile, in that the car does not instantly accelerate to 60 mph the moment the driver presses the accelerator. There is a delay. An experienced rider 90 knows when to initiate a command so that the change in gait occurs exactly at the letter on the fence, or exactly at the base of the jump.

The software processing system 48 can record the force received by the piezoelectric sensors 32 of the rider-side mesh 122 and/or the animal-side mesh 124 in response to an experienced rider's weight shifting during given maneuvers (or a whole session of maneuvers) with a given horse 94. If there is only an animal-side mesh 124, the horse 94 may experience the rider's weight shifts directly, or if there is only a rider-side mesh 122, the horse 94 may experience the rider's weight shifts directly. However, if there is both an animal-side mesh 124 and a rider-side mesh 122, the weight shifting experienced by the piezoelectric sensors 32 rider-side mesh 122 may be conveyed by the software processing system 48 to the piezoelectric actuators 34 of the animal-side mesh 124.

One will appreciate that even with an intermediate layer, there may still be some perception of the horse's motion on the human side, for instance. The software processing system 48 may not only determine absolute pairing between animal-side mesh 124 and rider-side mesh 122 but may also subtract pressures experienced by both. The software processing system 48 can then take advantage of the knowledge of the pressure differences, slight orientation changes, and delays to understand the exact physical relationship between the two meshes.

The recorded ride (maneuvers or session) may be expressed to the horse 94 by the piezoelectric actuators 34 of the animal-side mesh 124 and the horse 94 may then execute the commands as if the experienced rider 90 were giving them. So, a student can be placed on top of that same horse 94 and then experience how the horse 94 reacts to the same recorded ride (maneuvers or session) as expressed to the horse 94 by the piezoelectric actuators 34 of the animal-side mesh 124. The student can learn how the horse 94 is supposed to react to rider commands for different maneuvers and terrain, regardless of whether the path is straight, curved, weaves through cones or other barriers, or include ramps, ditches, or jumps.

Similarly, the software processing system 48 may additionally employ the piezoelectric actuators 34 of the rider-side mesh 122 to convey to the student rider 90 how and when to make the weight shifts. These stimuli may directly cause the body of the student to react automatically, or these stimuli may be prompts to remind the student to adjust weight or perform certain commands. An instructor, holding a wireless human machine interface device, can use a slider, dial, or other input mechanism to speed up or slow down the piezoelectric actuators 34. The piezoelectric mesh system 20 may also be configured to accommodate two riders 90 at once, possibly stimulating the front rider 90 to balance like the back one.

One will also appreciate that the software processing system 48 can sync recorded expert rider weight shifting and commands to particular cadence, harmony, melody, or rhythm in a piece of music. Recordings are already sped up or slowed down to pair best with a horse 94 and rider 90 for the Grand Prix Special in dressage. Algorithms are already available that can be adapted to automatically do this pairing of songs to the recordings of the piezoelectric sensors 32 during a routine. The pairing of a music pacing algorithm with a piezoelectric adaptive mesh system 20 can make efficient a music to horse movement synchronization process that used to be done by repeated trial and error.

Moreover, the AI or software processing system 48 can be trained to recognize which sequences of commands work better for a given horse 94 based on recordings of horse's reactions to the commands. The software processing system 48 can compare the rhythms from an entire database of recordings. The total time for a given section of the horse's movement performance can be matched to that same time section across every song in the database. Best matches can then be ranked for listening and watching in parallel to a video of the movement practice round used.

A breeder will appreciate that an animal-side mesh 124 can be placed on a scared or reluctant mare when confronted with an unfamiliar stallion, and the software processing system 48 may utilize the piezoelectric actuators 34 of the animal-side mesh 124 to encourage the mare to engage with the stallion. A more relaxed set of muscles results in far less resistance during the breeding act. One could outfit the mare with a flat pad that also extends up and over her withers, doubling to protect her from stallions who tend to bite the back of her neck. Waves of sequentially slower actuations or the piezoelectric actuators 34 in the animal-side mesh 124 can calm and relax the mare.

Saddles 96 may slowly slide backwards on the horse 94 during a ride until stopped by hip or by breast plate in front. The software processing system 48 may be configured to recognize when the sensor pressure cluster centers drift forward as items drift backward on the horse. The software processing system 48 can make appropriate compensations in its instruction processing and/or provide warning to the rider 90.

The software processing system may also be configured to address circumstances concerning roach back horses 94 and those with smaller bumps in their back. Saddles 96 are often stuffed or have extra padding stuffed between saddle blanket 104 and saddle 96 to provide extra comfort for a horse 94 with roach backs or various bumps (from injuries, low concern tumors, scar tissue, etc.). The extra padding may interrupt flow patterns expected with smooth backed, conformationally ideal horses 94, so mapping and controls may be adjusted to obtain balanced riding.

The software processing system may also be configured to address saddles 96 that pinch. A saddle 96 that fits a young horse 94 can pinch as they gain weight. A saddle 96 that pinches will affect the movement of the horse 94, resulting in tensed muscles, restricted movement, and resistance to certain gait changes. The software processing system 48 can recognize these changes. The rider 90 can be warned and/or actuators 34 in the horse-side mesh 124 underneath the saddle 96 can be selectively actuated to elevate portions of the saddle 96 to alleviate pinching.

One will also appreciate that the saddle 96 or pad can shuffle side to side during a trot and in a rocking motion during canter. The interpolated mapping is assigned an xyz coordinate system zero. A cross correlation to a new mapping will indicate the shift in the coordinate system. An approach for extending the mapping to the z axis, especially useful for 2+sensor layers, can be found at https://gis.stackexchange.com/questions/339851/interpolating-z-values-from-xyz-point-dataset-to-alternative-xy-coordinates-in-q.

A rider 90 at canter (where the horse's back noticeably rocks like a rocking horse) may perform a compensatory mirrored reverse rocking slide to look like the rider 90 is not moving to the casual observer. The cluster centers should execute an opposite direction mirrored movement at a similar frequency and a slight phase delay. Properly synchronized opposing rocking motions are comfortable for both the rider 90 and the animal 92, and are very pleasant to judge, as it looks like the rider 90 has barely moved at all. Any lack of synchrony will be sensed by clusters tracking the oppositely moving piezoelectric signals, which will then attempt to incrementally synchronize the rider 90 and the animal 92. https://youtu.be/6WyLMQ6OgM0 as part of https://www.horseclass.com/blog/riding-the-canter-its-a-swing-not-a-scoop/

Horses 94 will heat up and get sweaty. The software processing system 48 may reference look up tables to compensate for piezoelectric performance changes due to temperature measured by thermocouples.

Cooling can be accomplished as previously described but the piezoelectric mesh 20 may alternatively or additionally be equipped with pockets to accommodate cooling pads that can be activated by the software processing system 48, with or without using piezoelectric actuators 30. The cooling packets may be rechargeable or replaceable.

The animal-side mesh 124 is preferably waterproof. In some embodiments, it may be coated with a waterproof coating or sleeved into a waterproof cover. However, humidity may be part of measurement compensation if not the mesh 26 is not encapsulated. The piezoelectric output voltage of the device in a humid environment is lower than that in dry air ambience. See https://www.researchgate.net/publication/273706945 Enhanced_piezo-humidity_sensing-_of_Cd-ZnO_nanowires_nanogenerator_as_self-powere-dactive_gas_sensor_by_coupling_the_piezoelectric_screening_effect_and_dopant_displa cement_mechanism?tp=eyJjb250ZXh0Ijp7ImZpcnNOUGFnZSI6I19kaXJ1Y3QiLCJwYWdlIjoiX2RpcmVjdCJ9fQ #pf4. The software processing system 48 may reference look up tables based on ambient humidity to compensate.

If the adaptive mesh 26 is waterproof, the horse 94 and rider 90 can ride in wet conditions or through high streams. See IP68 ingress pressure guidelines at https://www.pocket-lint.com/ip-ratings-what-do-they-actually-mean/https://en.wikipedia.org/wiki/IPcode.

The actuators can be any type of piezoelectric actuator 34 as previously discussed. However, the actuators can also be other types of actuators, such as combustion-powered actuators, such as those described a thttps://www.science.org/doi/10.1126/science.adg5067. Similarly, mini speakers such as sugar-cube type speakers provide a significant vibration for their size and offer an alternative solution to provide haptic and audio feedback. The sugar cube name describes their physical size although most of this is the sound box. Example of suitable speakers may be SBS4DCC "sugar cube" speaker 10×20 mm 8-ohm 2-watt w/sound chamber and SBS4DCC "sugar cube" speaker 10×20 mm w/side-by-side twin coupled sound chamber. Other examples of sugar cube speakers can be found at http://www.sbs4dcc.com/sugarcubespeakers.html. A brief description of feedback generators can be found at https://medium.com/@guerrix/haptic-feedback-generators-1aa86371246e.

A power source 46 can be provided to run the piezoelectric structures 30, processing software system(s) 48, vibration elements, and/or other optional features. The power source 46 can be a battery, such as one that employs a lithium polymer, and the battery may be rechargeable. Battery recharging may employ traditional plug-in charging methods, such as via a wall plug or a USB connection, Charging may also be accomplished or supplemented through piezoelectric structures 30 utilizing, the movement of rider 90 and horse 94 to generate electrical charge. Depending on the design(s) of the rider-side mesh 122 and the animal-side mesh 124, there may be piezoelectric structures 30 not sensing or applying force against the rider 90 or the horse 94. These piezoelectric structures 30 may be dedicated to charging. Alternatively, a thermoelectric generator might be possible using the body heat from the horse 94. A mounting location for any of these battery options could be in or associated with saddle flaps or integrated with or attached to the animal-side mesh 124 or the rider-side mesh 122.

Areas of the rider-side mesh 122 (or animal-side mesh 124) may be tucked, wrapped, or folded so that they overlap. The software processing system 48 can identify these areas of overlap and subtract or ignore their data. A computer-based mapping of the sensor readings may be created by interpolating with nearest neighbors. A discontinuity in the values may be indicative of non-uniform mesh pressure at folds and/or wrinkles.

One will appreciate that the software processing system 48 may receive data from a piezoelectric mesh 20 configured for use in boots, riding breeches, or riding pants This data can be analyzed alongside data concerning the rider-side mesh 122 or animal-side mesh 124 and may affect instructions sent to the controller(s) 40 for the piezoelectric actuators 34 in the rider-side mesh 122 or animal-side mesh 124. Moreover, data from the rider-side mesh 122 or animal-side mesh 124 may be used to activate the piezoelectric actuators 34 in these auxiliary items.

Piezoelectric structures 30 may trigger movement in the boots/breeches magnetically/by electrical field. If any important part of the breeches or boots do not interact physically with a piezoelectric embedded object, but their position is useful (such as during a fast spin, a near fall, or a planned/unplanned buck/rear), magnetic field distance can indicate a relative position for approximate gross balance correction using encoders (linear https://www.baumer.com/us/en/product-overview/distance-measurement/linear-magnetic-encoders/c/293 or rotary https://www.dynapar.com/knowledge/applications/encoder-linear-measurement/, with higher precision using el ectromagnons https://phys.org/news/2013-11-electromagnon-effect-couples-electricity-magnetism.html, which are also temperature sensitive).

In another embodiment, rider helmet 170 may be configured to operatively communicate with the software processing system 48, such as by WiFi or Bluetooth. The rider helmet 170 may employ sensors to detect rider characteristics or environmental conditions. Sensors may include one or more of optical sensors, GPS sensors, gyroscopic sensors, or accelerometers, etc.

Rider characteristics may include rider head position in relation to specific locations on the rider-side mesh 122 or the animal-side mesh 124 and/or head position relationships to rider contacts with the rider-side mesh 122 or with horse contacts with the animal-side mesh 124. Environmental conditions may include weather-related conditions, path-related conditions such as puddles or obstructions (such as tree branches), or vehicle related conditions such as traffic or approaching vehicles. Rider helmet data concerning these rider characteristics or environmental conditions may be relayed to the software processing system 48.

The software processing system 48 may utilize the rider helmet data to develop a helmet responsive action protocol that can then be implemented by directing power to rider-side actuators 34 at specific ones of rider-side actuator locations at specific times and/or by directing power to animal-side actuators 34 at specific ones of animal-side actuator locations at specific times to modify the relative interaction between the rider 90 and the horse 94. The helmet responsive action protocol may entail any intended beneficial action by the rider-side mesh 122 or the animal-side mesh 124 such as a warning to the rider 90 and/or horse 94, such as a command directly to the rider 90 and/or horse 94, or such as a compensation adjustment for the rider 90 and/or horse 94.

One will appreciate that the piezoelectric mesh system 20 may be employed on each of a team of animals 92, such as horses 94, dogs, or oxen, to convey simultaneous commands or individual instructions to synchronize maneuvers. Moreover, wagons, sleds, or other equipment may be provided with sensors, like those discussed with respect to the rider helmet 170, to provide data to the software processing system 48 to be assessed with data acquired from the rider 90 or animal 92.

One will appreciate that animals 92 in addition to a horse 94 may be ridden. The animal 92 may be any animal 92 that has been domesticated for riding by a human. For example, the animal 92 may be one of a caribou, a camel, a large cat, a large cat, a cow, a large dog, a donkey, an elephant, an elk, a mule, an ox, or a zebra. Moreover, the adaptive piezoelectric mesh system 20 can be employed to provide command-oriented stimuli to service animals such as dogs, especially in the context of training them. One will also appreciate that the rider 90 need not be a human. For example, the rider 90 may be a primate, a monkey, a chimpanzee, a cat, or a dog.

Returning to other embodiments not involving human-animal interactions, with stimulation under control of the software processing system, a user 22 with unsteady walking and/or fear of falling may be provided with sufficient compensatory stimulation by a piezoelectric adaptive mesh 26 to provide the confidence to walk. This embodiment may be implemented with piezoelectric mesh socks, optionally including a stretching resilient material, or with braces utilizing a more rigid mesh material. Similarly, users 22 who have been bedridden and are just walking again may employ this type of embodiment to stimulate muscles for a faster recovery. This piezoelectric adaptive mesh 26 may be used in concert with leg braces until sufficient strength is achieved to remove the braces.

Socks, braces, or other piezoelectric mesh bearing walking aid may be configured to be in communication with a drone, such as a drone described in U.S. patent application Ser. No. 17/585,266, which is herein incorporated by reference. In particular, the software processing system 48 may receive sensor data from the drone data and may develop a drone responsive action protocol for the piezoelectric mesh 26 to stimulate, tighten, or relax muscles. Additionally or alternatively, the software processing system may develop a responsive drone action protocol for the drone to provide balance assistance to the person wearing or using the piezoelectric mesh 26. The software processing system 48 may track the center of balance of the user 22. If that balance tips too far in a given direction, a lookup table determines the muscles that must be stimulated to tense up, and/or limb that need to rise or lower to return the center of balance. This control will be akin to incrementally balancing an inverted pendulum for each individual corrective muscle stimulation/support attempt. See https://www.slideshare.net/katrinalittlel/matlab-simulink-inverted-pendulum-on-a-moving-cart https://youtu.be/pOOndKlXvx8. The drone can be equipped with one or more T arms to press with and/or a U arm, such as to contain a side-to-side fall.

This process can also be used to correct a rider's upper body position and/or help keep the rider 90 from falling off. For example, if the adaptive mesh system 20 detects a difference in pressure from one side to the other (or the drone detects a tilt from one side to the other) that is beyond a threshold, the drone can use its tools or appendages, such as the T or U arms, to facilitate a correction or prevent a fall. The drone may perch on the back of a saddle 96 (or fly nearby) to provide a very quick reaction time. If balance detection is borderline, near the threshold, the blades can start up if the drone is not already airborne or the drone can move close enough to be ready to react for assisitance.

In another embodiment, the piezoelectric adaptive mesh 26 in the form of a wearable item may act as a result of direct commands by the user 22, by movements of the user, in concert with a control algorithm, via interaction with a furniture-based piezoelectric adaptive mesh 26, via interaction with a virtual reality simulation, and/or via interaction with another user 22 with a similar interface. Heat, odor, sound, motion, or other indicators may be sensed, and in turn stimulated at a distance and/or in contact. An example of a medical system that can interact with the piezoelectric adaptive mesh 26 such as a wearable or furniture pad can be found in U.S. patent application Ser. No. 16/836,704, filed Mar. 31, 2020 for Portable Scanning Device and Processing System, which is hereby incorporated by reference herein. In particular, the piezoelectric adaptive mesh 26 may perform many of the sensing functions and/or treatment functions of the portable scanning device, or the piezoelectric adaptive mesh 26 may perform many of the treatment functions that may be indicated by the portable scanning device.

In another embodiment, a garment of piezoelectric adaptive mesh 26 may be provided to a user 22 with Parkinson's disease. Perhaps the user's hands shake at between 8.5 and 9 Hz in the morning, but they shake faster later in the day and even more so in the evening. A piezoelectric adaptive mesh 26 in the form of a glove, perhaps with a gel layer may be used to sense the frequency of the vibrations in real time. In one example, the glove may be a fingerless glove with the sensors and actuators of the piezoelectric mesh 26 positioned on the back-of-the-hand side of the glove.

The piezoelectric actuators 34 may be employed to provide cancelation vibrations (180 degrees out of phase) and/or provide ultrasonic vibrations to relax the nerves and muscles, which might also stop the shaking. In another example, the shaking may originate higher up the arm such as in the upper arm, so an armband or cuff of piezoelectric mesh may be employed. The sensors 32 and the actuators 34 may be weaved together, or one half of the circle of the armband may include the sensors 32 and the other half of the circle may include the actuators 34. Alternatively, one half of the width of the armband may include the sensors 32 and the other half of the width may include the actuators 34. In an additional example, an armband with piezoelectric mesh 26 and a glove with piezoelectric mesh 26 may cooperate to work together, with one of them having the sensors 32 and the other having the actuators 34. A similar leg band or leg cuff may be employed to address restless leg syndrome.

In an alternative to piezoelectric actuators 34, the gloves may be configured to work with linear resonant drives in the form of voice coils, such as used in smart watches. Unfortunately, such voice coils currently have fixed frequencies, the lowest being 175 Hz. However, they may be modified to have a variable output based around the 8.5 to 9 Hz.

Depending on the magnitude of stimulation needed, some piezoelectric actuators 34 may be sealed to withstand perspiration and washing, while others may benefit from a hole on the side facing away from the user 22 in order to allow a proper stimulation magnitude to be achieved. If the piezoelectric structures 30 are configured to be removed from the piezoelectric adaptive mesh 26, such as a garment, before it is washed, the achieved. If the piezoelectric structures 30 are configured to be removed from the piezoelectric adaptive mesh 26 may have reinforced holes or slits throughout, such as in a grid. In some embodiments, the piezoelectric actuators 34 may be press fit inserted, screwed into, snapped into, or molded into piezoelectrically-active suction cups or pads that may then be fit back through these holes or slits after the piezoelectric adaptive mesh 26 has been washed. The piezoelectrically-active suction cups or pads may be loose or all tied together in linear strings and/or form a grid-like net. These piezoelectrically-active suction cups or pads may optionally be filled with the same gel that the piezoelectric adaptive mesh 26 may optionally be filled with to optimize the transfer of ultrasonic stimulation. In other embodiments, there may be a waterproof barrier between the electronics and the user 22, so the electronics don't have to be washed. If all electronics are placed inside of the gel pad, and the gel pad in inside of a clothing sleeve, the clothing sleeve may be washed.

In a private setting, the piezoelectrically-active suction cups and netting may be worn directly on the user's skin without the padding 64, or the piezoelectrically-active suction cups and netting may be covered loosely by a lightweight or thin-fabric garment, such as a muumuu. This embodiment may be useful for very hot and humid conditions or for applications that involve personal entertainment. The piezoelectrically-active suction cups may be easy to clean with a baby wipe or disinfectant cloth.

The piezoelectrically-active suction cups do not need to actually achieve suction in order to work, especially if contacting a clothed user 22, or a user 22 with hair or fur, but gentle adhesion capabilities may enhance performance. The user interface 42 may provide the user 22 with information of this type so the user 22 may choose to spritz the piezoelectrically-active suction cups with water (or similar fluid) and then apply the piezoelectrically-active suction cups to their skin.

Determination of the level of stimulation may vary. Deflection of a piezoelectric bending element may be independent of frequency and proportional to the operating voltage. As resonant frequency is approached, deflection may rise rapidly to a multiple of its non-resonant value. Once a resonant mode is exceeded, deflection decreases steadily with the square of the frequency. Extended application of a resonant mode may degrade the piezoelectric structure 30 if applied continuously, so pulsed application to attain an overall resonance across the piezoelectric adaptive mesh 26 may extend its life. The software processing system 48 may employ pulsed operation instead of continuous operation based on predictive assessments.

In particular, some piezoelectric actuators 34 may act more strongly and durably in compression than tension, such as those that are piezoceramic, so the software processing system 48 may utilize knowledge of the particular types of the piezoelectric structures 30 to address longer time intervals of activation to avoid damage and degraded performance.

Moreover, if the piezoelectric adaptive mesh 26 is acting as a form fit for comfort and holding its position, its piezoelectric actuators may be controlled to act below their fundamental resonance. The actuator 34 may then be treated as a capacitive load, and its control circuit may supply charge to cause a motion, then withdraw charge to cause a retraction, because charge applied to the actuator 34 does not bleed off internally. While holding a position, each piezoelectric actuator 34 will typically draw much less than a microamp.

If the piezoelectric adaptive mesh 26 is acting as a form fit for comfort holding its position, such a piezoelectric actuator 34 may be readily powered by solar cells or hand crank powered, as changes in form may only be made periodically, as the user 22 changes their position, or due to the possibility of bed sores, changes to fit are controlled based on a schedule.

The capacitive load of each piezoelectric actuator 34 may be generally equal to its transducer capacitance with a (typically 10-100 ohm) resistor in parallel. In order to avoid damage to the piezoelectric actuator 34 from sudden voltage and amperage spikes or dips, a protection resistor may to be placed in series with the actuator 34.

Piezoelectric materials vary with temperature, so a temperature measurement, typically with a thermocouple may facilitate proper modelling and control. Also, the electrodes of each piezoelectric actuator 34 may benefit from periodic short circuiting to cool down to avoid generating an excessive electric field. The more that piezoelectric actuators 34 are stimulated, the more heat they produce, so they can be used to soothe sore muscles where applied.

Piezoelectric operation may be adapted to interact with the user 22 at a frequency that the user prefers, as determined directly by user input, or indirectly via sensor observation of user movements that indicate irritation, relaxation, or pleasure. Users 22 may be irritated, relaxed, and/or pleasured by the piezoelectric actuators 34 via touch, temperature, or sound. Once a given the threshold is determined by the control software, a threshold can be set to avoid crossing it again. Users 22 may vary substantially in their hearing and vibration resonance thresholds. If the user 22 moves sufficiently, and all other energy needs are met, excess piezoelectric generated voltage may be directed to charge the user's electronic devices such as their cell phone.

In another embodiment, the piezoelectric mesh system 20 may be employed in one or more rungs of a roll-up fire escape ladder to transmit a signal to an emergency call center or to a parent's cell phone when weight compresses the piezoelectric sensors 32 in the rungs, thwarting a sneak out.

One will appreciate that while many of the embodiments and examples described herein are directed to an adaptive mesh system 20 employing piezoelectric sensors 32 and piezoelectric actuators 34, the adaptive mesh system 20 may employ an adaptive mesh 26 that employs nonpiezoelectric sensors 32 and/or nonpiezoelectric actuators 34. Examples of some of these nonpiezoelectric sensors 32 and nonpiezoelectric actuators 34 are discussed herein. These nonpiezoelectric sensors 32 and nonpiezoelectric actuators 34 or any commercially available sensors 32 and actuators 34 may be substituted for the piezoelectric sensors 32 and/or piezoelectric actuators 34 where such substitution would be beneficial.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A method for employing an adaptive mesh system for modifying relative interaction between a rider and an animal, comprising:

employing a rider-side mesh having rider-side sensors positioned to detect force received from the rider, and wherein the rider-side mesh includes rider-side actuators positioned to apply force to the rider;

employing an animal-side mesh in proximity to the rider-side mesh, wherein the animal-side mesh has animal-side sensors positioned to detect force received from the animal, and wherein the animal-side mesh includes animal-side actuators positioned to apply force to the animal;

employing a software processing system to determine rider sensor data including amounts and timing of changes perceived by the rider-side sensors at respective rider-side sensor locations based on rider-side sensor signals from the respective rider-side sensors at the respective rider-side sensor locations in response to changes perceived by the respective rider-side sensors;

employing the software processing system to determine animal sensor data including amounts and timing of changes perceived by the animal-side sensors at respective animal-side sensor locations based on animal-side sensor signals from the respective animal-side sensors at the respective animal-side sensor locations in response to changes perceived by the respective animal-side sensors;

employing the software processing system to determine a responsive action protocol in response to the rider sensor data or the animal sensor data, wherein the responsive action protocol includes respective timing and amounts of force for respective rider-side actuators to apply toward the rider at specific ones of rider-side actuator locations or determine respective timing and amounts of force for respective animal-side actuators to apply toward the animal at specific ones of animal-side actuator locations; and employing a controller responsive to the software processing system to implement the responsive action protocol by directing power to rider-side actuators at specific ones of rider-side actuator locations at specific times or directing power to animal-side actuators at specific ones of animal-side actuator locations at specific times to modify the relative interaction between the rider and the animal.

2. The method of claim 1, wherein the software processing system determines whether the rider-sensor data is indicative of a weight-imbalanced rider, and wherein software processing system implements the responsive action protocol to facilitate balance correction of the rider.

3. The method of claim 1, wherein the software processing system determines whether the rider-sensor data is indicative of a rider command for an animal maneuver.

4. The method of claim 1, wherein the software processing system determines whether the animal-sensor data is indicative of an animal response to a rider command.

5. The method of claim 1, wherein the software processing system correlates the animal-side actuator locations relative to the rider-side sensor locations.

6. The method of claim 1, wherein the software processing system provides a responsive action protocol to the controller that instructs the animal-side actuators to exert force toward the animal that correlates with detected force received from the rider-side sensors.

7. The method of claim 1, wherein the software processing system determines a responsive action protocol to instruct the controller to direct the animal-side actuators to exert force toward the animal that correlates with detected force perceived from the rider-side sensors, wherein the software processing system determines that the rider-sensor data is indicative of a weight-imbalanced rider, and wherein software processing system adjusts the responsive action protocol to correct for imbalanced weight of the rider and to instruct the controller to direct the animal-side actuators to exert corrected force toward the animal correlating with force perceived by the rider-side sensors corrected for weight imbalance of the rider.

8. The method of claim 1, wherein the rider-side actuators include rider-side piezoelectric actuators and/or the animal-side actuators include animal-side piezoelectric actuators.

9. The method of claim 1, wherein the rider-side sensors include rider-side piezoelectric sensors and/or the animal-side sensors include animal-side piezoelectric sensors.

10. The method of claim 1, wherein the rider-side sensors are configured to perform as the rider-side actuators and/or the animal-side sensors are configured to perform as the animal-side actuators.

11. The method of claim 1, wherein the rider-side actuators or the animal-side actuators comprise eccentric rotating mass vibration motors.

12. The method of claim 1, wherein the rider-side actuators are rider-side piezoelectric actuators and/or the animal-side actuators are animal-side piezoelectric actuators, and wherein the rider-side actuators and/or the animal-side actuators are configured to trigger eccentric rotating mass vibration motors.

13. The method of claim 1, wherein the rider-side actuators and the animal-side actuators have different characteristics.

14. The method of claim 1, wherein the rider-side actuators have a rider-actuator major axis, wherein the animal-side actuators have an animal-actuator major axis, and wherein the animal-actuator major axis is greater than or equal to the rider-actuator major axis.

15. The method of claim 1, wherein the software processing system is configured to establish a rider-specific profile of rider-side sensor data for multiple ones of rider commands executed by an identified rider and/or the software processing system is configured to establish a rider-specific profile of animal-side sensor data for multiple ones of rider commands executed by an identified rider.

16. The method of claim 1, wherein the software processing system is configured to establish an animal-specific profile of animal-side sensor data for responses to multiple ones of rider commands executed by an individual rider.

17. The method of claim 1, wherein the adaptive mesh system is configured is configured to alert the rider to a rider issue and/or the adaptive mesh system is configured to alert the rider to an animal issue.

18. The method of claim 1, wherein the adaptive mesh system employs one or more of carbon fibers, fleece, gel padding, or memory foam.

19. The method of claim 1, wherein the adaptive mesh system employs voice coils, optical fibers, or piezoelectric disks.

20. The method of claim 1, wherein the software processing system is configured to convey to an animal, without a rider, a rider-specific profile of rider-side sensor data for multiple ones of rider commands executed by an identified rider and/or a rider-specific profile of animal-side sensor data for multiple ones of rider commands executed by the identified rider.

21. The method of claim 1, wherein the software processing system is configured to convey to an animal, having a first identified rider, a rider-specific profile of rider-side sensor data for multiple ones of rider commands executed by a second identified rider and/or a rider-specific profile of animal-side sensor data for multiple ones of rider commands executed by the second identified rider.

22. The method of claim 1, wherein the software processing system employs different respective responsive action protocols associated with respective animal maneuvers to cause the animal-side actuators to exert force toward the animal that correlates with the respective animal maneuvers, and wherein the software processing system synchronizes one or more of the respective responsive action protocols to aspects of a musical composition.

23. The method of claim 1, wherein the software processing system is configured for facilitating a music-maneuver routine including multiple respective responsive action protocols to cause the animal-side actuators to exert respective forces toward the animal that correlate with the respective animal maneuvers, wherein the music-maneuver routine synchronizes the respective responsive animal maneuvers to a sequence of aspects of a musical composition.

24. The method of claim 1, wherein the software processing system is configured for facilitating a team-maneuver routine including multiple respective responsive action protocols to cause the animal-side actuators to exert respective forces toward the animal that correlate with the respective animal maneuvers, wherein the team-maneuver routine is synchronized with a second software processing system of a second adaptive mesh system on a second animal such that the multiple respective responsive action protocols of the team-maneuver routine are executed substantially simultaneously by the adaptive mesh system on the animal and the second adaptive mesh system on second animal.

25. The method of claim 1, further comprising:

employing a rider garment having garment devices that are configured to interact with the adaptive mesh system.

26. The method of claim 1, further comprising:

employing a rider helmet that operatively communicates with the software processing system;

employing helmet sensors to detect rider characteristics or environmental conditions;

conveying rider helmet data concerning rider characteristics or environmental conditions to the software processing system;

determining a helmet responsive action protocol; and implementing the responsive action protocol by directing power to rider-side actuators at specific ones of rider-side actuator locations at specific times or directing power to animal-side actuators at specific ones of animal-side actuator locations at specific times to modify the relative interaction between the rider and the animal.

27. The method of claim 1, wherein the rider-side mesh and animal-side mesh are configured together as a bareback pad, are configured to form part of a saddle or are configured for employment with a saddle, or are configured as a saddle case or as a saddle wrap.

28. The method of claim 1, wherein the animal-side mesh is configured as an animal riding blanket.

29. The method of claim 1, wherein the animal is one of a caribou, a camel, a large cat, a cow, a large dog, a donkey, a horse, an elephant, an elk, a mule, an ox, or a zebra.

30. A method for employing an adaptive piezoelectric mesh system for modifying relative interaction between a rider and an animal, comprising:

employing a rider-side mesh having rider-side piezoelectric structures, wherein the rider-side piezoelectric structures are configured to operate at rider-side piezoelectric sensors positioned to detect changes perceived by the rider-side piezoelectric structures caused by the rider, and wherein the rider-side mesh includes rider-side actuators positioned to apply force to the rider;

employing an animal-side mesh in proximity to the rider-side mesh, wherein the animal-side mesh has animal-side piezoelectric structures that are configured to operate as animal-side piezoelectric sensors positioned to detect changes perceived by the animal-side piezoelectric structures caused by the animal, and wherein the animal-side mesh includes animal-side actuators positioned to apply force to the animal;

employing a software processing system to determine rider-sensor data including amounts and timing of changes perceived by the rider-side piezoelectric sensors at respective rider-side sensor locations based on rider-side sensor signals from the respective rider-side piezoelectric sensors at the respective rider-side sensor locations in response to changes perceived by the respective rider-side sensors;

employing the software processing system to determine animal-sensor data including amounts and timing of changes perceived by the animal-side piezoelectric sensors at respective animal-side sensor locations based on animal-side sensor signals from the respective animal-side piezoelectric sensors at the respective animal-side sensor locations in response to changes perceived by the respective animal-side sensors;

employing the software processing system to determine a responsive action protocol in response to the rider sensor data or the animal sensor data, wherein the responsive action protocol includes respective timing and amounts of force for respective rider-side actuators to apply toward the rider at specific ones of rider-side actuator locations or determine respective timing and amounts of force for respective animal-side actuators to apply toward the animal at specific ones of animal-side actuator locations; and employing a controller responsive to the software processing system to implement the responsive action protocol by directing power to rider-side actuators at specific ones of rider-side actuator locations at specific times or directing power to animal-side actuators at specific ones of animal-side actuator locations at specific times to modify the relative interaction between the rider and the animal.

31. An adaptive mesh system for modifying relative interaction between a rider and an animal, comprising:

a rider-side mesh having rider-side sensors positioned to detect force received from the rider, and wherein the rider-side mesh includes rider-side actuators positioned to apply force to the rider;

an animal-side mesh positioned in proximity to the rider-side sensors, wherein the animal-side mesh has animal-side sensors positioned to detect force received from the animal, and wherein the animal-side mesh includes animal-side actuators positioned to apply force to the animal;

a software processing system configured to determine rider sensor data including amounts and timing of changes perceived by the rider-side sensors at respective rider-side sensor locations based on rider-side sensor signals from the respective rider-side sensors at the respective rider-side sensor locations in response to force received by the respective rider-side sensors, wherein the software processing system is configured to determine animal sensor data including amounts and timing of changes perceived by the animal-side sensors at respective animal-side sensor locations based on animal side sensor signals from the respective animal-side sensors at the respective animal-side sensor locations in response to changes perceived by the respective animal-side sensors, and wherein the software processing system, in response to rider sensor data or animal sensor data, is configured to determine respective timing and amounts of force for respective rider-side actuators to apply toward the rider at specific ones of rider-side actuator locations or determine respective timing and amounts of force for respective animal-side actuators to apply toward the animal at specific ones of animal-side actuator locations; and a controller configured to be responsive to the software processing system to direct power to rider-side actuators at specific ones of rider-side actuator locations at specific times or direct power to animal-side actuators at specific ones of animal-side actuator locations at specific times to modify the relative interaction between the rider and the animal.

* * * * *